(12) United States Patent
Ricotta

(10) Patent No.: US 10,465,492 B2
(45) Date of Patent: Nov. 5, 2019

(54) SYSTEM AND METHOD FOR OIL AND CONDENSATE PROCESSING

(71) Applicant: KATA Systems LLC, Golden, CO (US)

(72) Inventor: Joseph A. Ricotta, Golden, CO (US)

(73) Assignee: KATA SYSTEMS LLC, Golden, CO (US)

( * ) Notice: Subject to any disclaimer, the term of this patent is extended or adjusted under 35 U.S.C. 154(b) by 0 days.

(21) Appl. No.: 15/989,581

(22) Filed: May 25, 2018

(65) Prior Publication Data
US 2018/0274347 A1 Sep. 27, 2018

Related U.S. Application Data

(63) Continuation-in-part of application No. 14/717,670, filed on May 20, 2015, now Pat. No. 9,982,516.
(Continued)

(51) Int. Cl.
*E21B 43/34* (2006.01)
*B01D 17/02* (2006.01)
(Continued)

(52) U.S. Cl.
CPC .............. *E21B 43/34* (2013.01); *B01D 3/143* (2013.01); *B01D 3/42* (2013.01); *B01D 17/02* (2013.01);
(Continued)

(58) Field of Classification Search
CPC .......... E21B 43/16; E21B 43/20; E21B 43/34; C02F 1/04; C02F 1/40; B01D 17/02; B01D 17/04
See application file for complete search history.

(56) References Cited

U.S. PATENT DOCUMENTS 2,872,165 A 2/1959 Wennerberg
3,031,105 A 4/1962 Walker
(Continued)

OTHER PUBLICATIONS

"Coriolis Flow Meters," Emerson Electric Co., © 2017-18, 5 pages [retrieved online May 23, 2018 from: www.emerson.com/en-us/automation/measurement-instrumentation/flow-measurement/coriolis-flow-meters].
(Continued)

*Primary Examiner* — Renee Robinson
(74) *Attorney, Agent, or Firm* — Sheridan Ross PC

(57) ABSTRACT

A system and method for the on-site separating and treating of a hydrocarbon liquid stream at an oil and gas production site is disclosed. The system comprises an oil and condensate distillation unit and a vapor recovery unit. In one embodiment, the oil and condensate distillation unit operates at low pressure or vacuum conditions to reduce the vapor pressure above the column of oil within a distillation column, thereby increasing the production of oil and condensate and capturing entrained natural gas otherwise lost or burned off. In another embodiment, oil from the distillation column can be measured by a flow meter and then transferred to one or more of an oil tank, a mobile tank, and an oil pipeline. Optionally, produced water at the production site can be run through the oil and condensate distillation unit to reduce the volume of produced water. The system further functions to improve the quality and volume of recovered natural gas and to decrease air pollution, in addition to increasing oil and condensate production at the well site.

20 Claims, 42 Drawing Sheets

Related U.S. Application Data

(60) Provisional application No. 62/000,728, filed on May 20, 2014.

(51) Int. Cl.

| | | |
|---|---|---|
| *E21B 43/20* | (2006.01) | |
| *C10L 3/10* | (2006.01) | |
| *C10G 33/06* | (2006.01) | |
| *B01D 3/14* | (2006.01) | |
| *B01D 3/42* | (2006.01) | |
| *C10L 3/06* | (2006.01) | |

(52) U.S. Cl.
CPC ..... *B01D 17/0202* (2013.01); *B01D 17/0214* (2013.01); *C10G 33/06* (2013.01); *C10L 3/06* (2013.01); *C10L 3/101* (2013.01); *E21B 43/20* (2013.01); *B01D 2257/702* (2013.01); *C10L 2290/543* (2013.01)

(56) References Cited

U.S. PATENT DOCUMENTS

| | | | |
|---|---|---|---|
| 3,295,371 | A | 1/1967 | Smith |
| 3,971,719 | A | 7/1976 | Peters |
| 4,002,201 | A | 1/1977 | Donaldson |
| 4,124,496 | A | 11/1978 | Cummings |
| 4,209,364 | A * | 6/1980 | Rothschild ............... B01D 3/10 203/11 |
| 4,948,393 | A | 8/1990 | Hodson et al. |
| 5,064,448 | A | 11/1991 | Choi |
| 7,020,586 | B2 | 3/2006 | Snevely |
| 7,147,788 | B2 | 12/2006 | Tveiten |
| 7,525,207 | B2 | 4/2009 | Clidaras et al. |
| 7,551,971 | B2 | 6/2009 | Hillis |
| 7,560,831 | B2 | 6/2009 | Whitted et al. |
| 7,724,513 | B2 | 5/2010 | Coglitore et al. |
| 7,725,559 | B2 | 5/2010 | Landis et al. |
| 7,742,830 | B1 | 6/2010 | Botes |
| 7,743,821 | B2 | 6/2010 | Bunker et al. |
| 7,961,463 | B2 | 6/2011 | Belady et al. |
| 7,990,710 | B2 | 8/2011 | Hellriegel et al. |
| 7,992,014 | B2 | 8/2011 | Langgood et al. |
| 8,001,403 | B2 | 8/2011 | Hamilton et al. |
| 8,047,904 | B2 | 11/2011 | Yates et al. |
| 8,160,063 | B2 | 4/2012 | Maltz et al. |
| 8,213,336 | B2 | 7/2012 | Smith et al. |
| 8,285,681 | B2 | 10/2012 | Prahlad et al. |
| 8,805,951 | B1 | 8/2014 | Faibish et al. |
| 8,992,838 | B1 | 3/2015 | Mueller |
| 9,565,783 | B1 | 2/2017 | Whitted et al. |
| 9,982,516 | B2 | 5/2018 | Ricotta |
| 2003/0193777 | A1 | 10/2003 | Friedrich et al. |
| 2006/0082263 | A1 | 4/2006 | Rimler et al. |
| 2009/0295167 | A1 | 12/2009 | Clidaras et al. |
| 2010/0211810 | A1 | 8/2010 | Zacho |
| 2010/0325199 | A1 | 12/2010 | Park et al. |
| 2011/0089013 | A1 * | 4/2011 | Sakurai ............... B01D 17/0205 201/2 |
| 2012/0048715 | A1 * | 3/2012 | James .................. B01D 1/0082 203/14 |
| 2012/0179874 | A1 | 7/2012 | Chang et al. |
| 2012/0221789 | A1 | 8/2012 | Felter |
| 2013/0213085 | A1 | 8/2013 | Ward |
| 2013/0311597 | A1 | 11/2013 | Arrouye et al. |
| 2014/0122866 | A1 | 5/2014 | Haeger et al. |
| 2014/0190817 | A1 * | 7/2014 | Mays ....................... C02F 1/04 203/11 |
| 2016/0273840 | A1 | 9/2016 | El Hajal et al. |
| 2017/0342812 | A1 * | 11/2017 | Kuhn .................. B01D 17/042 |
| 2018/0059692 | A1 | 3/2018 | Swan |

OTHER PUBLICATIONS

Official Action for U.S. Appl. No. 14/717,670, dated Mar. 7, 2017 8 pages Restriction Requirement.

Official Action for U.S. Appl. No. 14/717,670, dated Jun. 2, 2017 13 pages.

Notice of Allowance for U.S. Appl. No. 14/717,670, dated Oct. 5, 2017 11 pages.

* cited by examiner

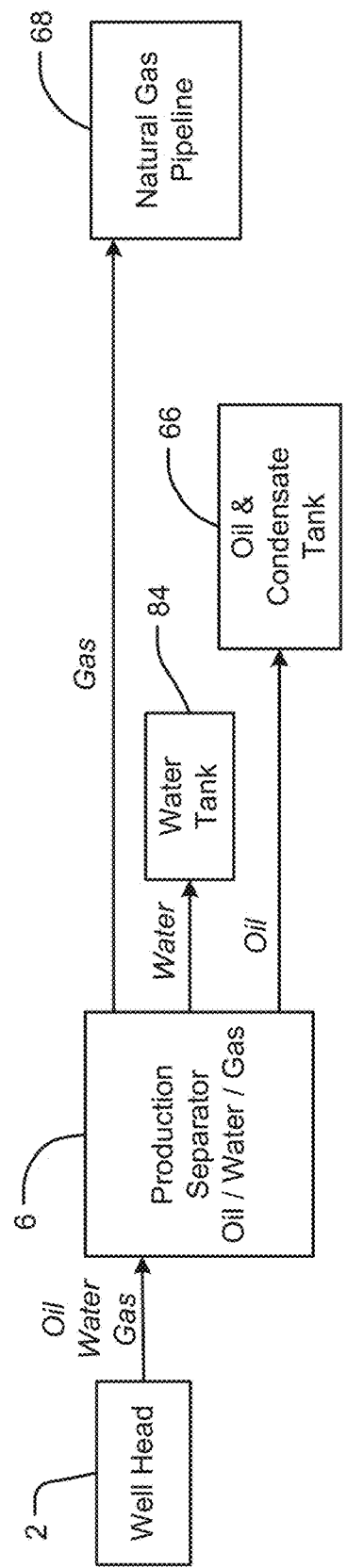
FIG. 1: Prior Art

Volatile Organic Compound Emission Calculation for Flashing

Vasquez – Beggs Solution Gas-Oil Ratio Correlation Method (For Estimating VOC Flashing Emissions, Using Stock Tank Gas-Oil Ratios)

INPUTS:

| | |
|---|---|
| Stock Tank API Gravity | 30 |
| Distillation Column Pressure (psia) | 35 |
| Distillation Column Temperature (°F) | 250 |
| Distillation Column Gas Gravity at Initial Conditions | 0.9 |
| Barrels of Oil per day (BOPD) | 1000 |
| Gas Molecular Weight | 40 |
| Percent VOC (CO₂ of Stock Tank Gas | 0.6 |
| Atmospheric Pressure (psia) | 12.1 |

$SG_S$ = Dissolved gas gravity at 100 psig = $SG[1.0 + 0.00005912 \cdot API \cdot Tf \cdot Log(P/114.7)]$ $SG_S$ = 0.36

$$Rs = (C1 * SGx * Pi^{\wedge}C2) \exp((C3 * API) / (Ti + 460))$$

WHERE:
| Rs | GAS/OIL RATIO OF LIQUID AT PRESSURE OF INTEREST |
|---|---|
| SGx | DISSOLVED GAS GRAVITY AT 100 PSIG |
| Pi | PRESSURE OF INITIAL CONDITION (PSIA) |
| API | API GRAVITY OF LIQUID HYDROCARBON AT FINAL CONDITION |
| Ti | TEMPERATURE OF INITIAL CONDITION (F) |

CONSTANTS

| | °API GRAVITY | | |
|---|---|---|---|
| °API → | < 30 | >= 30 | GIVEN °API |
| C1 | 0.0362 | 0.0178 | 0.0178 |
| C2 | 1.0937 | 1.187 | 1.187 |
| C3 | 25.724 | 23.931 | 23.931 |

| Rs = | 0.27 | scf/bbl | FOR P + Patm = | 8.5 |

$$THC = Rs * Q * MW * 1/385 \text{ scf/lb-mole} * 365 \text{ D/YR} * 1 \text{ TON}/2000 \text{ lb.s}$$

| THC | TOTAL HYDROCARBON (TONS/YEAR) |
|---|---|
| Rs | SOLUTION GAS/OIL RATIO (scf/STB) |
| Q | OIL PRODUCTION RATE (bbl/day) |
| MW | MOLECULAR WEIGHT OF STOCK TANK GAS (lb/lb-mole) |
| 385 | VOLUME OF 1 lb-mole OF GAS AT 14.7 PSIA AND 68 F (WAQS&R STD COND) |

| THC = | 6.3 | TPY |

VOC = THC * FRAC. OF C3+ IN THE STOCK TANK VAPOR

| VOC | 5.06 | TPY | FROM "FLASHING" OF OIL FROM DISTILLATION COLUMN TO TRANK PRESS |

FIG.8B

REDUCTION OF VOC FLASH BELOW 6TPY

| Oil Flow | Vacuum as PSI (VOC Flashed as TPY) | | |
|---|---|---|---|
| bbl/day | Min | Optimal | Max |
| 100 | ATM(1.6) | 1.8(1.3) | -3.6(<1.0) |
| 500 | -2.5(5.9) | -7.5(2.1) | -9.4(<1.0) |
| 1000 | -6.1(5.9) | -9.1(2.8) | -10.4(<1.0) |
| 1500 | -7.7(5.8) | -9.8(2.3) | -10.8(<1.0) |
| 2000 | -8.5(5.8) | -10.3(2.2) | -11.0(<1.0) |
| 2500 | -9.0(5.8) | -10.5(2.2) | -11.2(<1.0) |

*Table 1: Reduction of VOC Flash below 6 TPY*

Fig. 10

REDUCTION OF VOC FLASH BY 95%

| Oil Flow | Vacuum as PSI (VOC Flashed as TPY) | | | Potential to Emit based on (250psi Sep) | | |
|---|---|---|---|---|---|---|
| bbl/day | Min 98% | Optimal 98.7 | Max 99% | Potential Emissions | 95% Target | 99% Target |
| 100 | ATM(1.6) | -1.8(1.3) | -3.6(0.9) | 101 | 5.05 | 1.01 |
| 500 | ATM(8.1) | -1.8(6.5) | -3.6(4.9) | 505 | 25.25 | 5.05 |
| 1000 | ATM(16.2) | -1.8(12.9) | -3.6(9.9) | 1,011 | 50.55 | 10.11 |
| 1500 | ATM(24.3) | -1.8(19.6) | -3.6(15.1) | 1,517 | 75.85 | 15.17 |
| 2000 | ATM(32.4) | -1.8(26.2) | -3.6(20.1) | 2,022 | 101.1 | 20.22 |
| 2500 | ATM(40.5) | -1.8(32.4) | -3.6(25.1) | 2,528 | 126.4 | 25.28 |

*Table 2: Reduction of VOC Flash by 95%*

Fig. 11

Assumptions for Tables 1 and 2:
- Stock Tank API Gravity: 36 API
- Distillation Column Pressure: Varies (ATM to -12PSI)
- Distillation Column Temperature: 150F Embodiment A, 170F Embodiment B, 250F Embodiment C
- Distillation Column Gas Gravity: 0.9 SG
- Barrels Oil/Day: Varies from 100-2500 Q
- Gas Molecular Weight: 49 MW
- Fraction VOC of Tank Gas: 0.8 VOC
- Atmospheric Pressure: 12.1 Patm (assuming average Colorado plains elevation)

*VOC Flashed as TPY: The remaining not captured "flash vapor," measured in tons per year, from oil in tanks after dropping the oil pressure in the distillation column to within the indicated ranges.*

Fig. 12

CAPTURE GAIN OVER PRIOR ART "WARD"
Assuming 1,000 bbl/day production site.

| Technology | Processing pressure PSI | 150F | 250F | Capture % @ 150F | Capture % @ 250F |
|---|---|---|---|---|---|
| "Ward" | Min Pressure | 35 | 103.7 | 77.02 | 89.7% | 92.4% |
|  | Max Pressure | 125 | 430.9 | 358.9 | 57.4% | 64.5% |
| Proposed | Max Vacuum | -3.8 | 9.9 | 5.1 | 99.0% | 99.5% |
| Invention | Min Vacuum | ATM | 16.2 | 9.3 | 98.4% | 99.1% |

Total Efficiency Gains: Min  9.3%   7.1% Gain over Prior Art
                       Max 41.0%  34.6% Gain over Prior Art
                       Embd. A   Embd. C Remaining VOCs in Tanks = The Natural gas vapors not captured by the technology to be flashed off at tanks.
Capture % = Remaining VOCs in Tanks / Potential VOC Emmisions)
Potential Emmisions = VOCs sent to tanks under normal separator pressure and temp without vapor recovery technology.
    Potential VOC Emmisions 150F, 250PSI, 1,000bbl/day    1,011 tons per year

*Table 3: Entrained Gas Capture Gain over Prior Art of Ward*

Fig. 13

| Tubing Pressure (PSI) | Sales Line Pressure (PSI) | | | | | | | |
|---|---|---|---|---|---|---|---|---|
| | 5 | 10 | 15 | 30 | 50 | 100 | 150 | 300 |
| 250 | x | x | x | x | x | x | x | 29 |
| 200 | x | x | x | x | x | x | x | 36 |
| 150 | x | x | x | x | x | x | x | 46 |
| 100 | x | x | x | x | x | x | 35 | 66 |
| 50 | x | x | x | x | x | 43 | 62 | 115 |
| 25 | x | x | x | 28 | 40 | 70 | 100 | 147 |
| 1 | 31 | 38 | 46 | 69 | 100 | 141 | 169 | 216 |
| 0 (ATM) | 33 | 41 | 49 | 86 | 107 | 146 | 175 | 222 |
| -3 | 41 | 51 | 62 | 93 | 123 | 164 | 193 | 240 |
| -4 | 45 | 56 | 67 | 101 | 129 | 171 | 199 | 246 |
| -5 | 50 | 62 | 74 | 112 | 135 | 180 | 206 | 255 |
| -10 | 102 | 120 | 131 | 161 | 194 | 231 | 261 | 325 |
| -14.7 | 243 | 262 | 279 | 319 | 361 | 437 | 493 | 612 |

Brake Horsepower = 22 * (ratio/stage) * (Number of Stages) * (MMSCFD) * (F)
where F = 1.0 for a single stage, 1.08 for a two-stage and 1.1 for a three-stage.
Gas Processors Suppliers Association Engineering Data Book Eleventh Edition, FPS Version, 1998, eq 13-4
eq 13-4 developed for large slow speed (300-450 RPM) compressors with SG = 0.65 and having CR > 2.50
Assuming a site producing 1.0 MMCFD (1,000,000 cubic feet) of Natural Gas per day, 24hr compressor run.

Table 4: *Horsepower Requirement - Vapor Recovery and or Sales Compressor*

Fig. 14

Table 5: Fuel Gas Consumption - Vapor Recovery and or Sales Compressor

| Tubing Pressure (PSI) | Sales Line Pressure (PSI) | | | | | | | |
|---|---|---|---|---|---|---|---|---|
| | 5 | 10 | 15 | 30 | 50 | 100 | 150 | 300 |
| 250 | x | x | x | x | x | x | x | 6,960 |
| 200 | x | x | x | x | x | x | x | 8,640 |
| 150 | x | x | x | x | x | x | x | 11,040 |
| 100 | x | x | x | x | x | x | 8,400 | 15,840 |
| 50 | x | x | x | x | x | 10,320 | 14,880 | 27,600 |
| 25 | x | x | x | 6,720 | 9,600 | 16,800 | 24,000 | 35,280 |
| 1 | 7,440 | 9,120 | 11,040 | 16,560 | 24,000 | 33,840 | 40,560 | 51,840 |
| 0 (ATM) | 7,920 | 9,840 | 11,760 | 15,840 | 25,680 | 35,040 | 42,000 | 53,280 |
| -3 | 9,840 | 12,240 | 14,880 | 22,320 | 29,520 | 39,380 | 46,320 | 57,600 |
| -5 | 10,800 | 13,440 | 16,080 | 24,240 | 30,960 | 41,040 | 47,760 | 59,040 |
| -7 | 12,000 | 14,880 | 17,760 | 26,880 | 32,400 | 43,200 | 49,440 | 61,200 |
| -10 | 24,480 | 28,800 | 31,440 | 38,640 | 46,560 | 55,440 | 62,640 | 78,000 |
| -14.7 | 58,320 | 62,880 | 66,960 | 76,560 | 86,640 | 104,880 | 118,320 | 146,880 |

*Pipeline Rules of Thumb Handbook, Eighth Edition: A Manual of Quick, Accurate Solutions to Everyday Pipeline Engineering...* by E.W. McAllister (Oct 8, 2013)
Fuel Gas = Horsepower x 10 CFH x 24 hr
Assuming a site producing 1.0 MMCFD (1,000,000 cubic feet) of Natural Gas per day, 24hr compressor run. 10 CFH per Horsepower

Fig. 15

| Oil Production (bbl/day) | Power (hp) | Fuel Gas (cfd) |
|---|---|---|
| 100 | 27 | 6,550 |
| 250 | 68 | 16,374 |
| 500 | 136 | 32,749 |
| 1000 | 273 | 65,497 |
| 1500 | 409 | 98,246 |
| 2000 | 546 | 130,994 |

Horse Power = (Crude Oil bbl/day x 42 gal/bbl x Max Pressure / CF) / (eff x SG)
Fuel Gas (cfd) = Horse Power x 10 CFH per Horsepower)

42 gal/bbl
5 psi
1710 CF
0.5 eff
0.9 SG

Assume 24hr running pumps

*Table 6: Horse Power Requirements - Oil Pump*

| Water Production (bbl/day) | Power (hp) | Fuel Gas (cfd) |
|---|---|---|
| 1 | 0.2 | 59 |
| 3 | 0.8 | 196 |
| 5 | 1.4 | 327 |
| 10 | 2.7 | 655 |
| 15 | 4.1 | 982 |
| 20 | 5.5 | 1,310 |

42 gal/bbl
5 psi
1710 CF
0.5 eff
1 SG

*Table 7: Horse Power Requirements - Water Pump*

Fig. 16

Horse Power (hp) per Subsystem

| Oil Production (bbl/day) | Compressor | Oil Pump | Water Pump | Total hp Required |
|---|---|---|---|---|
| 100 | 222 | 27 | 0.2 | 250 |
| 250 | No Data | 68 | 0.8 | 69 |
| 500 | No Data | 136 | 1.4 | 138 |
| 1000 | No Data | 273 | 2.7 | 276 |
| 1500 | No Data | 409 | 4.1 | 413 |
| 2000 | No Data | 546 | 5.5 | 551 |

*1 MMCFD Nat Gas Production, ATM Distillation Column, 300psi Dsch Press
Total hp Required = Compressor hp + Oil Pump hp + Water Pump hp
Assume 24hr running of equipment

Fig. 17

*Table 8: Total Horsepower Required - Oil Distillation Unit (Compressor/Oil Pump/Water Pump)*

| Oil Production (bbl/day) | Total Fuel Gas Required per Subsystem | | | Tot Fuel As BTUs | Tot Fuel As Rtv (bbl oil) | Tot Fuel As bbl of oil Rtv 10hr/day (bbl oil) |
|---|---|---|---|---|---|---|
| | Compressor/Oil Pump | Water Pump | Total SCFD | | | |
| 100 | 53,280 | 59 | 53,889 | 5.33E+07 | 9.2 | 4.3 |
| 250 | No Data | 196 | 16,571 | 1.66E+07 | 2.9 | |
| 500 | No Data | 327 | 33,076 | 3.31E+07 | 5.7 | |
| 1000 | No Data | 655 | 66,152 | 6.62E+07 | 11.4 | |
| 1500 | No Data | 982 | 99,228 | 9.92E+07 | 17.1 | |
| 2000 | No Data | 1,310 | 132,304 | 1.32E+08 | 22.8 | |

Assume 1 MMCFD Nat Gas Production, ATM Distillation Column, 300psi Dsch Press
Total SCFD = Compressor SCFD + Oil Pump SCFD + Water Pump SCFD
BTUs Fuel = Total SCFD x BTU/CF of Natural Gas
Rtv bbl oil = (BTUs Fuel) / (BTU/bbl of oil)
5,800,000 BTU/bbl of oil
1,000 BTU/CF of Natural Gas

Fig. 18

Table 9: Total Fuel Gas Required - Oil Processing Unit (Compressor/Oil Pump/Water Pump)

Table 10: Increasing Oil Column Head After Reduction of Vapor Pressure Above Oil Column

SYSTEM AND METHOD FOR OIL AND CONDENSATE PROCESSING

CROSS REFERENCE TO RELATED APPLICATIONS

This application is a continuation-in-part and claims the benefit and priority of U.S. patent application Ser. No. 14/717,670 entitled "System and Method for Oil and Condensate Processing" which was filed on May 20, 2015, now U.S. Pat. No. 9,982,516, and which claimed priority to and the benefit of U.S. Provisional Patent Application No. 62/000,728, entitled "System and Method for Oil and Condensate Processing" filed on May 20, 2014, the entire disclosure of each of which is incorporated by reference herein in their entirety.

FIELD

Embodiments of the present invention are generally related to a system and method for on-site processing of oil, condensate, and water at an oil and gas production site and in particular, to a system and method for on-site processing of oil and condensate or water at low pressure or at a vacuum.

BACKGROUND

At a typical oil and gas production site, a crude mixture from a well is brought to the surface and then separated into oil, gas and water in a three phase separator vessel. After separation, normally the oil goes to an oil storage tank, the water to a water tank and the natural gas to a natural gas pipeline.

Conventional separation systems leave a significant amount of natural gas entrained in the oil which flash vaporizes in the oil storage tanks. The natural gas that flash vaporizes in the storage tanks is contaminated by ambient air which decreases its economic value. This low value natural gas that has been contaminated is typically burned off at a combustion flare or vented directly to the atmosphere. Direct tank venting, fugitive emissions (gas leaks) from tanks, and exhaust from combustion flares significantly increases air pollution and greenhouse gasses, and wastes natural gas that could be recovered and sold.

Conventional approaches to processing hydrocarbon mixtures are inefficient at recovery of natural gas vapors and burn-off significant quantities of natural gas vapors. Some efforts have been made to reduce the burn-off or combustion flaring of natural gas vapors, such as U.S. Pat. Publ. No. 2013/0213085 to Ward ("Ward"). Ward discloses systems and methods for processing a hydrocarbon mixture wherein heat is generated from compression of recovered natural gas vapors and used to provide a heating medium for a heat exchanger. While some recovery efficiencies are realized through Ward's application of heat, the improvements are modest and not as effective as the method and system disclosed herein in which oil and condensate are processed on-site at low pressure or in a vacuum. Ward is incorporated herein by reference in its entirety.

U.S. Pat. No. 8,992,838 to Mueller ("Mueller") discloses a method and system to reduce oxygen from flash vapor captured from storage tanks wherein the flash vapor is compressed and then refined in an oxygen reduction subsystem and sent to a sales line. While some oxygen is removed through Mueller's application of his subsystem, the effectiveness is modest in that oxygen is not entirely removed from the gas stream. In addition to modest oxygen reduction, byproducts are generated such as $CO_2$ and $H_2O$ which are not economically viable products while the former is a greenhouse gas and the latter promotes corrosion in gas sales pipelines. In addition to byproducts, Mueller's system and method realizes poor efficiency due to $H_2S$ contamination which damages the catalyst bed. The method and system herein processes oil and condensate prior to the storage tanks, eliminating oxygen contamination by ambient air and eliminating the need for a specialized catalyst that can be damaged by $H_2S$. Mueller is incorporated herein by reference in its entirety.

A system and method for oil and condensate on-site processing at an oil and gas production site is disclosed. The system comprises an oil and condensate distillation unit and a vapor recovery unit. In one embodiment, the oil and condensate distillation unit operates at low pressure or vacuum conditions to reduce the vapor pressure above the column of oil within the tubing, thereby increasing the production of oil and condensate and capturing entrained natural gas otherwise lost or burned off. In another embodiment, the oil and condensate distillation unit includes a Lease Automatic Custody Transfer unit. Benefits include improved quality and volume of recovered natural gas and decreased air pollution, in addition to increased oil and condensate production at the well site.

SUMMARY

A system and method for oil and condensate processing at an oil and gas production site that improves oil production rates and the capture of entrained natural gas otherwise lost in a conventional system is disclosed. The system and method works within the typical framework of an oil and gas production site, and is designed to be installed between a conventional three phase separator and oil storage tanks or, in some embodiments, as a replacement for or in conjunction with a 3-phase separator. By installing the system prior to the oil storage tanks, oil and condensation production rates may be improved, and any natural gas contamination by ambient air is completely eliminated, improving the quality and volume of natural gas entering the sales pipeline and decreasing air pollution.

In one embodiment, a method of processing a produced oil and natural gas mixture from a well head at an on-site production facility is disclosed, the method comprising: (1) receiving the produced oil and natural gas mixture comprising oil, water, and natural gas from the well head at a first pressure; (2) reducing the oil, natural gas, and water mixture to a second pressure; (3) separating the water from the oil and natural gas; (4) separating the oil and natural gas mixture into natural gas and a stream of oil; and (5) distilling the natural gas to separate natural gas condensate from the natural gas.

In another embodiment, a system for processing a produced hydrocarbon fluid from a wellbore comprising a first stream including oil, natural gas and water at an on-site production facility to eliminate flaring is disclosed, the system comprising: (1) a separator to separate the oil, natural gas and water in the first stream at a first pressure; (2) a distillation unit configured to receive the oil at a first pressure and reduce the pressure to a second pressure which is less than the first pressure, the distillation unit operating at a range between approximately atmospheric pressure and −14 psig and further configured to separate natural gas from the oil; and (3) a vapor recovery unit configured to receive the separated natural gas and scrub the separated natural gas to remove condensate liquid.

In yet another embodiment, a method of processing a produced well stream comprising natural gas, water and an oil/condensate mixture from a wellbore at an on-site production facility to substantially reduce energy loss is disclosed, the method comprising: (1) receiving the produced well stream at a first pressure; (2) separating the water, natural gas and oil with a three phase separator; (3) reducing the pressure of the oil to a second pressure, the second pressure lower than the first pressure and at or below atmospheric pressure; (4) separating the oil stream to flash natural gas; (5) distilling the natural gas to form natural gas condensate and natural gas vapors; and (6) scrubbing the distilled natural gas vapors to remove excess liquids. In one embodiment, the wellhead pressure is controlled downstream of the three phase separator.

One aspect of the present invention is a method of processing a produced hydrocarbon fluid including oil, water, and natural gas from a well head at an on-site production facility to reduce flaring. The method generally includes, but is not limited to, one or more of: (1) receiving the hydrocarbon fluid comprising oil, water, and natural gas from the well head at a first pressure; (2) separating the oil, natural gas, and water in a three-phase separator; (3) receiving the oil in a distillation unit downstream from the three-phase separator; (4) reducing the pressure below atmospheric pressure in the distillation unit, wherein the distillation unit is configured to separate natural gas from the oil; (5) transferring oil from the distillation unit to an oil storage tank by a first conduit; and (6) receiving the separated natural gas in a vapor recovery unit located downstream from the distillation unit. In one embodiment, the distillation unit operates between approximately 0 psig and −14 psig. Optionally, the vapor recovery unit receives the separated natural gas from the distillation unit by a second conduit. In one embodiment, the method further comprises scrubbing the natural gas to remove excess liquids. In another embodiment, the oil in the oil storage tank comprises less than about 5% entrained natural gas.

It is another aspect of the present invention to provide a system for processing a produced hydrocarbon fluid including oil, natural gas and water from a wellbore at an on-site production system. The system provides many benefits including the reduction, or elimination, of flaring. The system generally comprises, but is not limited to, one or more of: (1) a separator to separate the oil, natural gas and water at a first pressure; (2) a distillation unit configured to receive the oil downstream from the separator and reduce the pressure below atmospheric pressure, the distillation unit configured to separate natural gas from the oil; (3) a first conduit to transfer oil from the distillation unit to an oil storage tank; and (4) a vapor recovery unit downstream from the distillation unit to receive the separated natural gas.

In one embodiment, the distillation unit operates at between approximately 0 psig and −14 psig. Optionally, the first pressure in the separator is controlled by a valve positioned between the separator and the distillation unit. In another embodiment, the pressure in the distillation unit is controlled by a valve positioned downstream from the distillation unit. In one embodiment, the vapor recovery unit creates a vacuum which is applied to the distillation unit. In another embodiment, a compressor downstream from the distillation unit creates a vacuum applied to the distillation unit.

In one embodiment, the pressure of the distillation unit is determined based on a hydrocarbon constituency of natural gas to be captured. Optionally, the hydrocarbon constituency of natural gas to be captured comprises at least one of methane, ethane, propane, butane, pentane, hexane, heptane, and octane.

In one embodiment, natural gas from the vapor recovery unit is provided to at least one of an inlet to a compressor and a natural gas pipeline. Optionally, the oil in the oil storage tank comprises less than about 5% entrained natural gas. In another embodiment, flashing of light end hydrocarbons can be controlled based on at least one of the pressure of the distillation unit and the first pressure of the separator.

Additionally, or alternatively, the system may further comprise a second conduit to transfer the separated natural gas from the distillation unit to the vapor recovery unit. Optionally, the system can include a heat exchanger to provide heat energy to the oil upstream from the distillation unit.

It is another aspect of the present invention to provide a method of processing a produced hydrocarbon fluid comprising natural gas, water and an oil/condensate mixture from a wellbore at an on-site production facility. One benefit of the method includes the reduction, or elimination, of flaring. The method generally comprises: (1) receiving the hydrocarbon fluid at a first pressure; (2) separating the water, natural gas and oil with a three phase separator; (3) receiving the oil in a distillation unit positioned downstream from the three phase separator; (4) reducing the pressure of the oil in the distillation unit below atmospheric pressure; (5) separating natural gas from the oil within the distillation unit; (6) transferring oil from the distillation unit to an oil storage tank by a first conduit; and (7) receiving the separated natural gas in a vapor recovery unit positioned downstream from the distillation unit. The method may optionally include providing the natural gas to at least one of a sales line compressor and a natural gas pipeline.

Another aspect of the present invention is to provide a method of processing a produced hydrocarbon fluid including oil, water, and natural gas from a well head at an on-site production facility operated by a first entity. The method comprises: (1) receiving the hydrocarbon fluid comprising oil, water, and natural gas from the well head at a first pressure; (2) separating the oil, natural gas, and water in a three-phase separator; (3) receiving the oil in a distillation unit downstream from the separator; (4) reducing the pressure below atmospheric pressure in the distillation unit; (5) transferring oil from the distillation unit by a first conduit; (6) measuring the volume of oil transferred through the first conduit at a lease automatic custody transfer (LACT) unit; and (7) transferring title of the oil downstream of the LACT unit to a second entity. In one embodiment, wherein the distillation unit operates in a vacuum at between about 0 psig and −14 psig. Optionally, the distillation unit is configured to separate natural gas vapor from the oil, the natural gas vapor captured by a vapor recovery unit downstream from the distillation unit.

Additionally, or alternatively, the method may further comprise routing the oil, downstream of the LACT unit, from the first conduit to one or more of an oil storage tank, a mobile tank, and an oil pipeline. In one embodiment, the method includes directing vapor from the distillation unit to a reflux drum. Optionally, liquid that condenses in the reflux drum can be directed back to the distillation unit.

It is another aspect of the present invention to provide a system for processing a produced hydrocarbon fluid from a wellbore at an on-site production system, the hydrocarbon fluid including oil, natural gas and water. The system includes, but is not limited to: (1) a separator to separate the oil, natural gas and water at a first pressure; (2) a distillation unit configured to receive the oil downstream from the separator and reduce the pressure, the distillation unit configured to separate natural gas from the oil; (3) a first conduit to transfer oil from the distillation unit; and (4) a lease automatic custody transfer (LACT) unit to measure a volume of oil transferred through the first conduit and transfer title of the oil from a first entity to a second entity. In one embodiment, the distillation unit operates in a vacuum at between approximately 0 psig and −14 psig. In another embodiment, the pressure in the distillation unit is controlled by a valve positioned downstream from the distillation unit. Optionally, the first pressure in the separator is controlled by a valve positioned between the separator and the distillation unit. In one embodiment, the LACT unit includes a pump and a flow meter.

The system may optionally include a second conduit to transfer the separated natural gas from the distillation unit to a generator which converts the natural gas into electricity. Additionally, or alternatively, the system may include a vapor recovery unit downstream from the distillation unit to receive natural gas separated from the oil. The system optionally includes a second conduit to transfer the separated natural gas from the distillation unit to the vapor recovery unit.

In one embodiment, the first conduit transfers the oil to a mobile tank. Alternatively, the first conduit transfers the oil to an oil pipeline. In another embodiment, the oil is routed, downstream of the LACT unit, from the first conduit to one or more of an oil storage tank, a mobile tank, and an oil pipeline.

The system includes, in one optional embodiment, a reflux drum to receive vapor from the distillation unit. Liquid that condenses in the reflux drum may optionally flow through a second conduit to the distillation unit. In one embodiment, the system includes a second conduit to inject one or more of natural gas, fuel gas, and compressed vapor into the distillation unit.

In one embodiment, the system further comprises a heat exchanger to provide heat energy to the oil upstream from the distillation unit. The heat exchanger recovers waste heat from sources at the on-site production system. The sources may include electric motors or internal combustion motors. In another embodiment, the source of waste heat includes one or more of a compressor, a generator, and a pump.

Yet another aspect of the present invention is a system for processing a fluid received from a wellbore at an on-site production system. The system generally includes, but is not limited to, one or more of: (1) a separator to separate oil, natural gas, and water from the fluid; and (2) a distillation unit downstream from the separator, the distillation unit configured to receive water from the separator and boil the water to reduce the volume of water, wherein water vapor is discharged from the distillation unit through a valve and water and residue are transferred from the distillation unit by a first conduit to a water storage tank. In one embodiment, the distillation unit heats the water to at least approximately 212° F. In another embodiment, the distillation unit heats the water to between about 150° F. to about 250° F. In one embodiment, the distillation unit operates at approximately atmospheric pressure or a vacuum, such as between approximately 0 psig and −14 psig.

In one embodiment, the system includes a second conduit interconnected to the valve to direct the water vapor to the atmosphere or to a combustion flare. Optionally, the system may include a lease automatic custody transfer (LACT) unit to measure the volume of water transferred through the first conduit and transfer title of the water from a first entity to a second entity.

Another aspect of the present invention is a method of providing electricity to a data center. The method generally includes, but is not limited to: (1) receiving a hydrocarbon fluid comprising oil, water, and natural gas from a well head at a first pressure; (2) separating the oil, natural gas, and water in a three-phase separator; (3) receiving the oil in a distillation unit downstream from the separator; (4) reducing the pressure below atmospheric pressure in the distillation unit; (5) transferring oil from the distillation unit by a first conduit; (6) transferring the separated natural gas from the distillation unit to a generator, wherein the generator converts the natural gas into electricity; and (7) transferring the electricity to the data center.

In one embodiment, the data center includes a controller, an automatic transfer switch, an uninterruptable power supply, a computer server, and a communication system. Optionally, the controller is configured to control the automatic transfer switch. In one embodiment, the data center is interconnected to an alternate electricity source. Accordingly, the method may further include switching, by the controller, the data center from electricity from the generator to electricity from the alternate electricity source.

Another aspect of the present invention is a data center. The data center generally includes, but is not limited to, one or more of: (1) a transfer switch; (2) an uninterruptable power supply; (3) a computer server; (4) a communication system; and (5) a source of electricity. The source of electricity may include a generator and an alternate electricity source. In one embodiment, the generator is configured to run on natural gas. The generator may receive natural gas from one or more of: a production separator, a vapor recovery unit, an oil and condensate distillation unit, and an oil storage tank. In one embodiment, the data center is mobile.

In one embodiment, the data center further includes a controller. The controller is configured to monitor electricity use of the data center. In one embodiment, the controller may determine which source of electricity is used to power the data center. Optionally, the controller is interconnected to the automatic transfer switch.

In one embodiment, the data center includes a cooling system. In another embodiment, waste head from the cooling system is transferred to a heat exchanger. The heat exchanger may optionally be associated with the oil and condensate distillation unit.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

As used herein, the term "ATM" means a standard atmosphere of pressure, aka standard atmospheric pressure, while the term "vacuum" means a pressure less than ATM, such as up to about −14 psig.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

A "communication channel" refers to an analog and/or digital physical transmission medium such as cable (twisted-pair wire, cable, and fiber-optic cable) and/or other wireline transmission medium, and/or a logical and/or virtual connection over a multiplexed medium, such microwave, satellite, radio, infrared, or other wireless transmission medium. A communication channel is used to convey an information signal, for example a digital bit stream, from one or several senders (or transmitters) to one or several receivers. A communication channel has a certain capacity for transmitting information, often measured by its bandwidth in Hz or its data rate in bits per second. Communication channel performance measures that can be employed in determining a quality or grade of service of a selected channel include spectral bandwidth in Hertz, symbol rate in baud, pulses/s or symbols/s, digital bandwidth bit/s measures (e.g., gross bit rate (signaling rate), net bit rate (information rate), channel capacity, and maximum throughput), channel utilization, link spectral efficiency, signal-to-noise ratio measures (e.g., signal-to-interference ratio, Eb/No, and carrier-to-interference ratio in decibel), bit-error rate (BER), packet-error rate (PER), latency in seconds, propagation time, transmission time, and delay jitter.

The terms "communication device," "smartphone," and "mobile device," and variations thereof, as used herein, are used interchangeably and include any type of device capable of communicating with one or more of another device and/or across a communications network, via a communications protocol, and the like. Exemplary communication devices may include but are not limited to smartphones, handheld computers, laptops, netbooks, notebook computers, subnotebooks, tablet computers, scanners, portable gaming devices, phones, pagers, GPS modules, portable music players, and other Internet-enabled and/or network-connected devices.

The term "communication system" or "communication network" and variations thereof, as used herein, refers to a collection of communication components capable of one or more of transmission, relay, interconnect, control, or otherwise manipulate information or data from at least one transmitter to at least one receiver. As such, the communication may include a range of systems supporting point-to-point to broadcasting of the information or data. A communication system may refer to the collection individual communication hardware as well as the interconnects associated with and connecting the individual communication hardware. Communication hardware may refer to dedicated communication hardware or may refer a processor coupled with a communication means (i.e., an antenna) and running software capable of using the communication means to send a signal within the communication system. Interconnect refers some type of wired or wireless communication link that connects various components, such as communication hardware, within a communication system. A communication network may refer to a specific setup of a communication system with the collection of individual communication hardware and interconnects having some definable network topography. A communication network may include wired and/or wireless network having a pre-set to an ad hoc network structure.

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The term "display" refers to a portion of a screen used to display the output of a computer to a user.

The terms "determine", "calculate" and "compute," and variations thereof, as used herein, are used interchangeably and include any type of methodology, process, mathematical operation or technique.

The term "light ends" means one or more of the volatile products of a hydrocarbon, comprising methane, ethane, propane, butane, pentane, hexane, heptanes, octane and gasoline.

The term "in communication with," as used herein, refers to any coupling, connection, or interaction using electrical signals to exchange information or data, using any system, hardware, software, protocol, or format, regardless of whether the exchange occurs wirelessly or over a wired connection.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "screen," "touch screen," or "touchscreen" refers to a physical structure that enables the user to interact with the computer by touching areas on the screen and provides information to a user through a display. The touch screen may sense user contact in a number of different ways, such as by a change in an electrical parameter (e.g., resistance or capacitance), acoustic wave variations, infrared radiation proximity detection, light variation detection, and the like. In a resistive touch screen, for example, normally separated conductive and resistive metallic layers in the screen pass an electrical current. When a user touches the screen, the two layers make contact in the contacted location, whereby a change in electrical field is noted and the coordinates of the contacted location calculated. In a capacitive touch screen, a capacitive layer stores electrical charge, which is discharged to the user upon contact with the touch screen, causing a decrease in the charge of the capacitive layer. The decrease is measured, and the contacted location coordinates determined. In a surface acoustic wave touch screen, an acoustic wave is transmitted through the screen, and the acoustic wave is disturbed by user contact. A receiving transducer detects the user contact instance and determines the contacted location coordinates. The touch screen may or may not include a proximity sensor to sense a nearness of object, such as a user digit, to the screen.

This Summary is neither intended nor should it be construed as being representative of the full extent and scope of the present disclosure. The present disclosure is set forth in various levels of detail in the Summary as well as in the attached drawings and the Detailed Description of the Invention, and no limitation as to the scope of the present disclosure is intended by either the inclusion or non-inclusion of elements, components, etc. in this Summary of the Invention. Additional aspects of the present disclosure will become more readily apparent from the Detailed Description, particularly when taken together with the drawings.

The above-described benefits, embodiments, and/or characterizations are not necessarily complete or exhaustive, and in particular, as to the patentable subject matter disclosed herein. Other benefits, embodiments, and/or characterizations of the present disclosure are possible utilizing, alone or in combination, as set forth above and/or described in the accompanying figures and/or in the description herein below. However, the Detailed Description of the Invention, the drawing figures, and the exemplary claim set forth herein, taken in conjunction with this Summary of the Invention, define the invention.

BRIEF DESCRIPTION OF THE DRAWINGS

The accompanying drawings, which are incorporated in and constitute a part of the specification, illustrate embodiments of the invention and together with the general description of the invention given above, and the detailed description of the drawings given below, serve to explain the principals of this invention.

FIG. 1 depicts a flow diagram of a conventional oil and condensate processing system according to the prior art;

FIGS. 3A-1 and 3A-2 depict a more detailed flow diagram of an oil and condensate processing system in accordance with the embodiment of FIG. 2A;

FIGS. 3B-1 and 3B-2 depict a more detailed flow diagram of an oil and condensate processing system in accordance with the embodiment of FIG. 2B;

FIGS. 8A-8B provide details regarding volatile organic compound emission calculations as used to generate data contained in Tables 1-3 of FIGS. 10-13;

FIG. 10 provides Table 1 which describes the reduction of volatile organic compounds (VOC) flash below 6 tons per year (TPY);

FIG. 11 includes Table 2 which illustrates the reduction of VOC flash by 95%;

FIG. 12 provides assumptions associated with Tables 1-2 of FIGS. 10-11;

FIG. 13 includes Table 3 and provides the entrained gas capture gain over the cited prior art of Ward;

FIG. 14 provides Table 4 which describes horsepower requirements regarding vapor recovery and/or sales compressor;

FIG. 15 includes Table 5 and provides fuel gas consumption regarding vapor recovery and/or sales compressor;

FIG. 16 provides Table 6 which is related to horsepower requirements regarding an oil pump and Table 7 which describes horsepower requirements regarding a water pump;

FIG. 17 provides total horsepower required regarding an oil distillation unit (i.e. compressor/oil pump/water pump) in Table 8;

FIG. 18 provides Table 9 which describes total fuel gas required regarding an oil processing unit (i.e. compressor/oil pump/water pump);

Figure 2A:
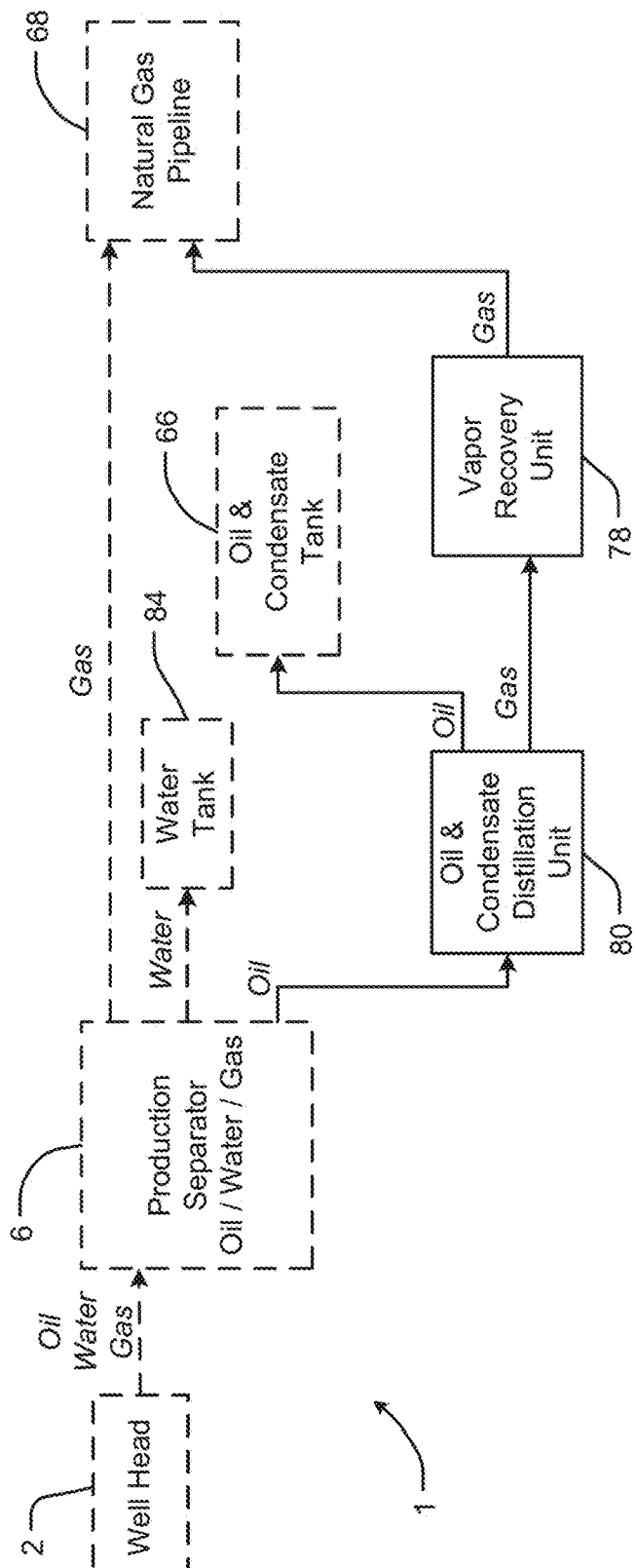
FIG. 2A depicts a flow diagram of an oil and condensate processing system according to one embodiment of the present invention.

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein. Further, the devices and features shown and described herein are not limited to the embodiment or embodiments with which they are described or shown in combination with. For example, it is contemplated that various features and devices shown and/or described with respect to one embodiment may be combined with or substituted for features or devices of other embodiments regardless of whether or not such a combination or substitution is specifically shown or described herein.

To assist in the understanding of the present invention the following list of components and associated numbering found in the drawings is provided herein:

| Number | Component |
|---|---|
| 1 | Oil and condensate processing system |
| 2 | Well head |
| 3 | Plunger |
| 4 | Conduit |
| 6 | Production (three-phase) separator |
| 7 | Separator |
| 8 | Control valve |
| 10 | Combined separator and distillation unit |
| 12 | Control valve |
| 14 | Heat exchanger |
| 16 | Heat exchanger |
| 18 | Temperature instrument |
| 20 | Heat exchanger |
| 22 | Conduit |
| 24 | Pump |
| 25 | Recirculation pump |
| 26 | Control valve |
| 28 | Control valve |
| 30 | Control valve |
| 32 | Conduit |
| 36 | Inlet suction scrubber |
| 38 | Compressor |
| 40 | Compressor driver |
| 42 | Forced draft cooler |
| 44 | Discharge scrubber |
| 48 | Sales line compressor |
| 50 | Distillation column |
| 52 | Conduit |
| 54 | Combustion flare |
| 60 | Custody transfer line |
| 62 | First entity control |
| 64 | Second entity control |
| 66 | Oil and condensate (storage) tank |
| 68 | Natural gas pipeline |
| 70 | Oil pipeline |
| 74 | Oil pump driver |
| 76 | Programmable logic controllers |
| 78 | Vapor recovery unit |
| 80 | Oil and condensate distillation unit |
| 82 | Sales valve |
| 84 | Water storage tank |
| 85 | Control valve |
| 86 | Control valve |
| 88 | Control valve |
| 90 | Engine water coolant auxiliary pump |
| 92 | Conduit |
| 94 | Level instrument |
| 96 | Pressure instrument |
| 98 | Oil gathering pipeline |
| 100 | Conduit |
| 102 | Conduit |
| 104 | Conduit |
| 106 | Conduit |
| 108 | Conduit |
| 110 | Conduit |
| 112 | Control valve |
| 114 | Control valve |
| 116 | Control valve |
| 117 | Blow case |
| 118 | Control valve |
| 120 | Valve |
| 122 | Pneumatic level float |
| 124 | Valve |
| 125 | Pneumatic vent gas capture vessel |
| 126 | Valve |
| 128 | Valve |
| 130 | Valve |
| 131 | Pressure instrument |
| 132 | Valve |
| 134 | Conduit |
| 136 | Relief valve |
| 140 | Relief valve |
| 142 | Programmable logic controller |
| 144 | Control valve |
| 146 | Control valve |
| 148 | Control valve |
| 150 | Conduit |
| 152 | Conduit |
| 154 | Relief valve |

| Number | Component |
|---|---|
| 156 | Valve |
| 160 | Conduit |
| 170 | Generator |
| 172 | Data center |
| 200 | Method |
| 201 | Start operation |
| 202 | Receive oil and condensate |
| 203 | Reduce pressure |
| 204 | Distill the oil and condensate |
| 206 | Pump oil and condensate |
| 208 | Compress natural gas vapor |
| 210 | Flow compressed natural gas vapor |
| 212 | End operation |
| 214 | Conduit |
| 216 | Water Pump |
| 218 | Control valve |
| 220 | Conduit |
| 222 | Driver |
| 224 | Pneumatic LVL Float/Instrument |
| 226 | Conduit |
| 228 | Conduit |
| 230 | Control Valve |
| 231 | LACT unit or flow meter |
| 232 | Conduit |
| 235 | Conduit |
| 236 | Valve |
| 238 | Tanker truck |
| 239 | Conduit |
| 240 | Valve |
| 241 | 3-way valve |
| 242 | Valve |
| 243 | Reflux drum |
| 244 | Conduit |
| 245 | Valve |
| 246 | Valve |
| 248 | Vessel |
| 249 | Valve |
| 300 | Plunger start cycle |
| 302 | Plunger fall |
| 304 | Gas pressure builds |
| 308 | Plunger lift |
| 310 | Plunger arrives at surface |
| 312 | Alternate Fuel Source |
| 314 | Generator |
| 316 | Uninterruptable Power Supply (UPS) |
| 318 | Computer Servers |
| 320 | Communication Equipment |
| 322 | Automatic Transfer Switch |
| 324 | Alternative Electricity Source |
| 326 | Server |
| 328 | Computer or smart device (Mobile Phone/Tablet) |
| 330 | Internet of Things (IoT) Device |
| 332 | Internet Crypto Currency Nodes |
| 334 | Remote Camera |
| 336 | Results Server |

DETAILED DESCRIPTION

Figures 1, 3A:
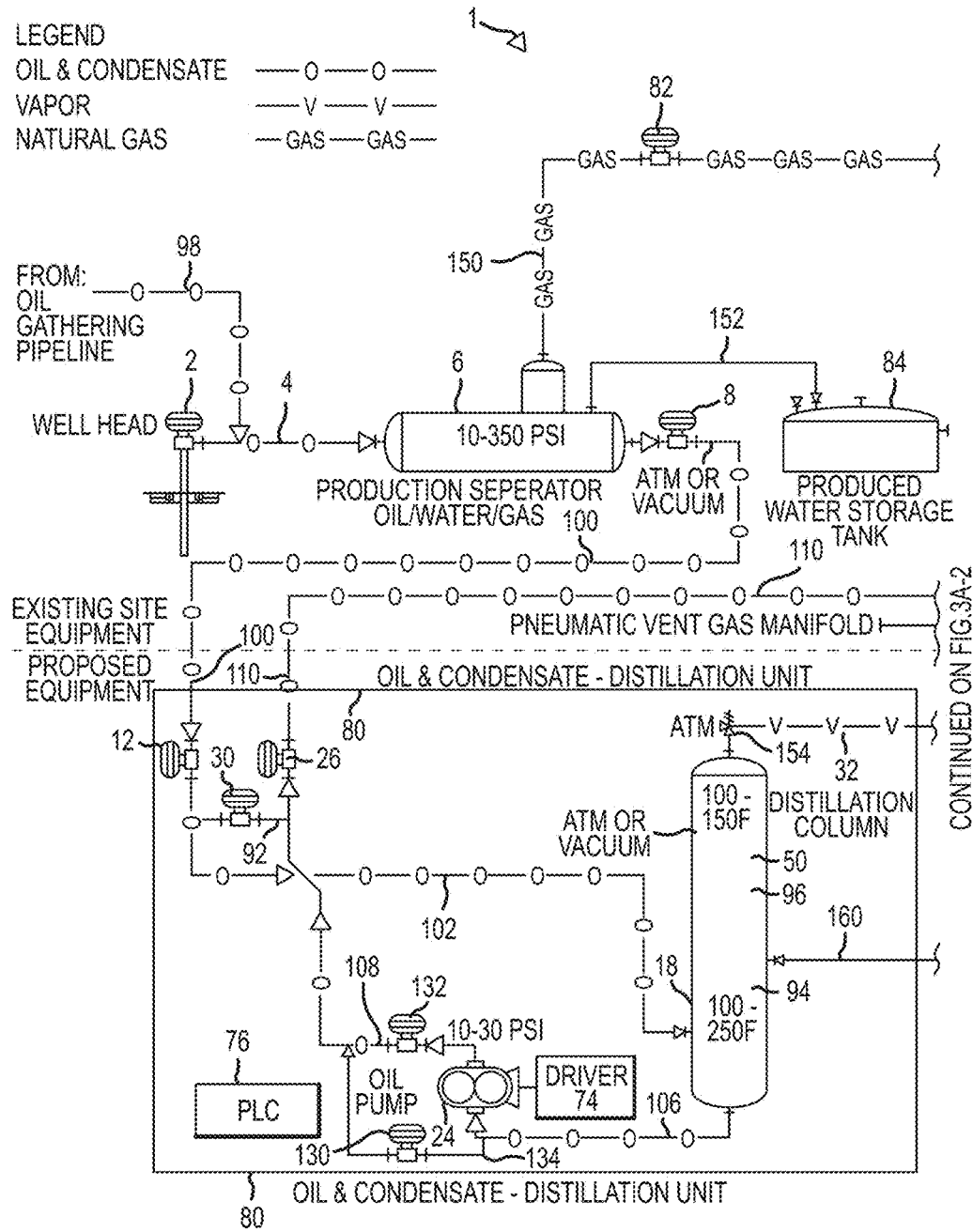

FIG. 1 depicts a flow diagram of a conventional oil and condensate processing system according to the prior art. Generally, a mixture of oil, water and natural gas, as recovered from a well head 2, are received by a production separator (a.k.a. "three-phase separator") 6. Suitable production separators are known to those of skill in the art at may be obtained from LEED Fabrication of Brighton, Co. Separators are described in U.S. Pat. Nos. 3,971,719, 4,948, 393, 5,064,448, and 7,147,788 which are incorporated herein by reference in their entireties. The production separator 6 outputs oil to oil and a condensate tank 66, water to a water tank 84, and natural gas to a natural gas pipeline 68.

FIG. 2A depicts a flow diagram of an on-site oil and condensate processing system 1 at an oil and gas production site according to one embodiment of the present invention. After leaving the three-phase separator 6, but before the oil goes to the storage tank 66, the oil enters the distillation column 50 of an oil and the condensate distillation unit 80 where the pressure is reduced to atmospheric or vacuum conditions. The unique step of bringing the oil to a very low or slightly negative pressure allows all the remaining natural gas entrained in the oil to "flash vaporize" within the distillation column 50. Once liberated, the natural gas flash vapors rise and exit the distillation column 50. The natural gas flash vapors exiting the distillation column 50 flow to the natural gas sales line 68 while the oil flows from the distillation column 50 to the storage tank 66 now free of any remaining natural gas vapor. This method eliminates direct venting, fugitive emissions (gas leaks) from storage tanks, and the need to burn flash vapors at combustion flares, while delivering valuable natural gas to the sales pipeline that is wasted at a conventional oil and gas production site.

Figure 2B:
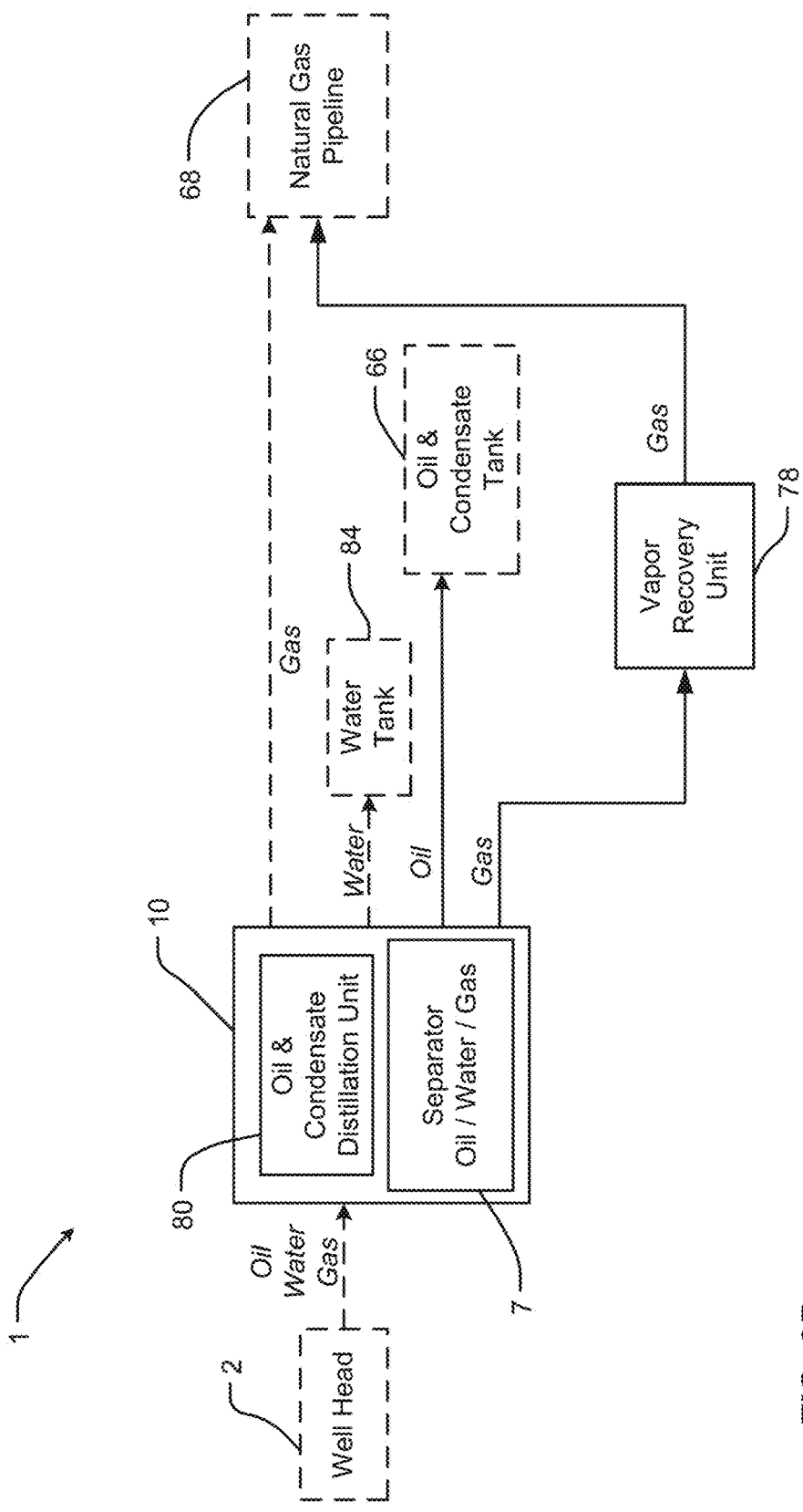
FIG. 2B depicts a flow diagram of an oil and condensate processing system according to another embodiment of the present invention.

FIG. 2B depicts a flow diagram of an on-site oil and condensate processing system 1 at an oil and gas production site according to one embodiment of the present invention. After leaving the well head 2, but before going to the oil tank 66, oil enters the distillation column 50 of an oil and condensate distillation unit 80 where the pressure is reduced to atmospheric or vacuum conditions, and oil, water, and natural gas are separated. The unique step of reducing the vapor pressure above the column of oil increases oil and condensate production, by increasing plunger lift rates and allows all the remaining natural gas entrained in the oil to "flash vaporize" within the distillation column 50. Once liberated, the natural gas flash vapors rise and exit the distillation column 50. The natural gas flash vapors exiting the distillation column 50 flow to the natural gas sales line 68 while the oil flows from the distillation column 50 to the storage tank 66 now free of any remaining natural gas vapor, with separated water flowing to water tank 84. This method eliminates direct venting, fugitive emissions (gas leaks) from storage tanks, and the need to burn flash vapors at combustion flares, while increasing oil and condensate production rates and delivering valuable natural gas to the sales pipeline that is wasted at a conventional oil and gas production site.

Figures 2, 3A:
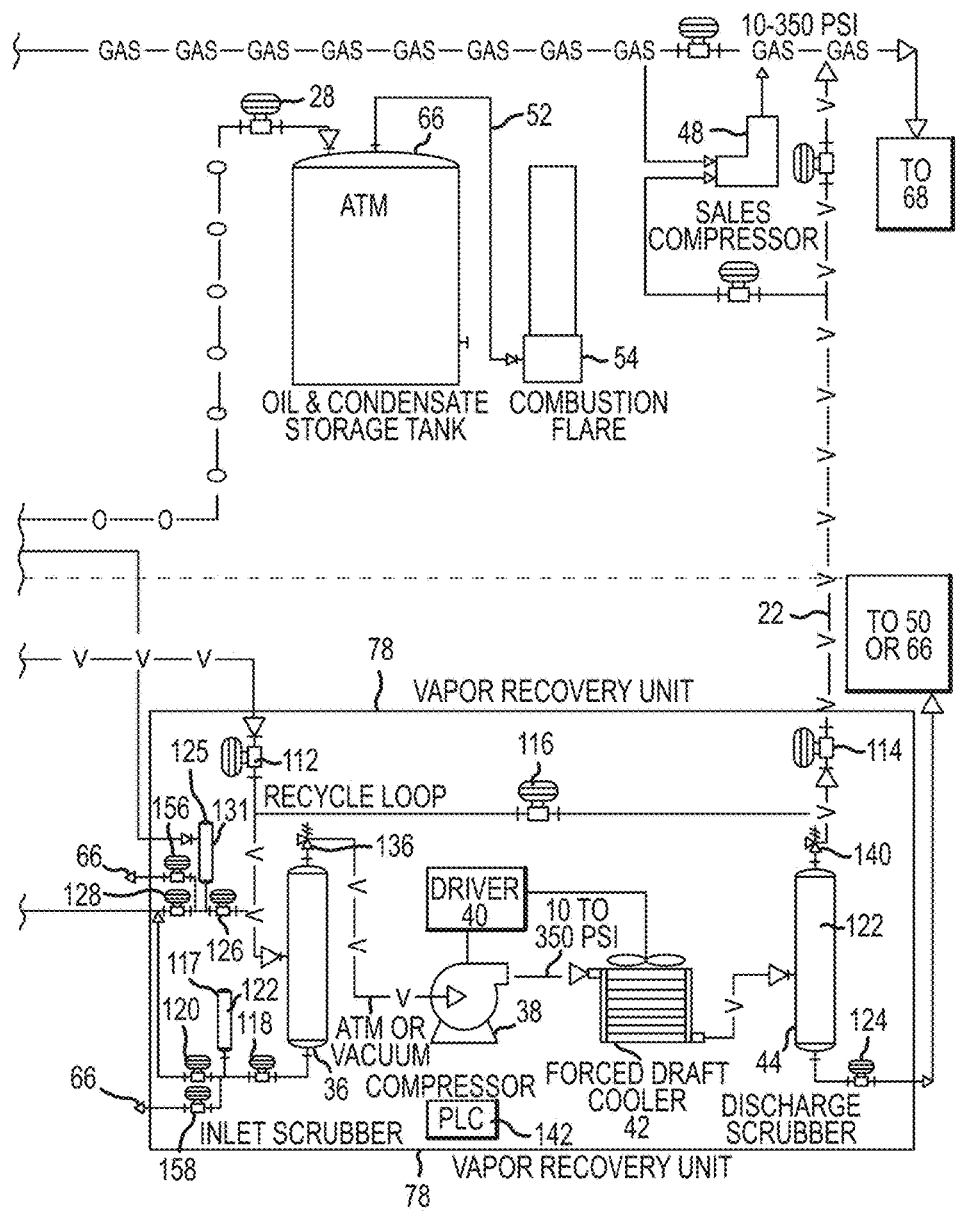

FIGS. 3A-1 and 3A-2 depict a more detailed flow diagram of an oil and condensate processing system 1 in accordance with the embodiment of FIG. 2A. The system 1 generally includes an oil and gas well head 2 or oil gathering pipeline 98, a production separator 6, a produced water storage tank 84, an oil and condensate distillation unit 80, a vapor recovery unit 78, a sales line compressor 48, oil and condensate storage tank(s) 66, and a combustion flare 54.

An oil and condensate mixture that includes oil, condensate, water and natural gas is transmitted from an oil and condensate source 2, 98 to a production separator 6 of the type known in the art for initial separation of the hydrocarbon mixture. The production separator 6 removes natural gas from the hydrocarbon mixture and transmits the removed natural gas through a conduit 150 and through a sales valve 82 to a sales line compressor 48 or natural gas pipeline 68. Water is removed from the hydrocarbon mixture by the separator 6 through a conduit 152 to produced water tank storage tanks 84. Oil and condensate are transmitted from the separator 6 through a control valve 8 through conduit 100 to the oil and condensate distillation unit 80.

Figures 1, 3B:
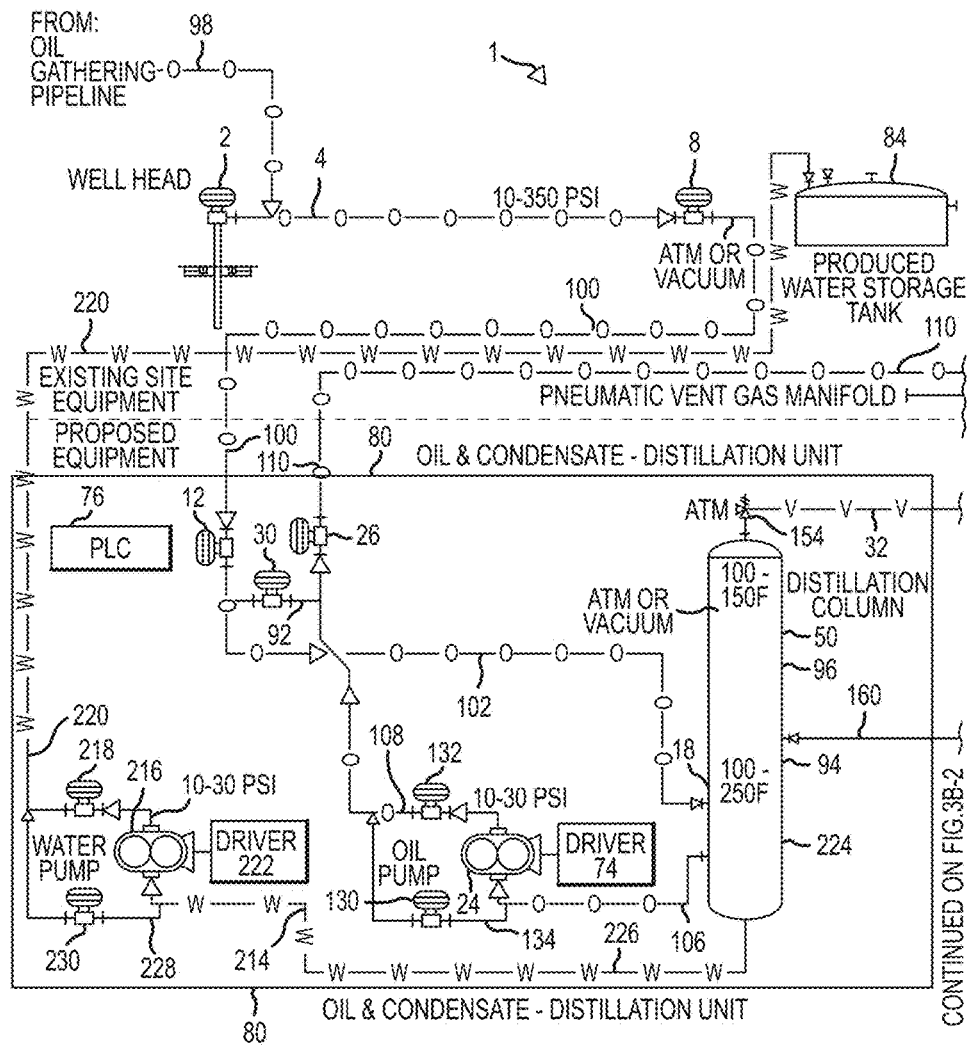
Figures 2, 3B:
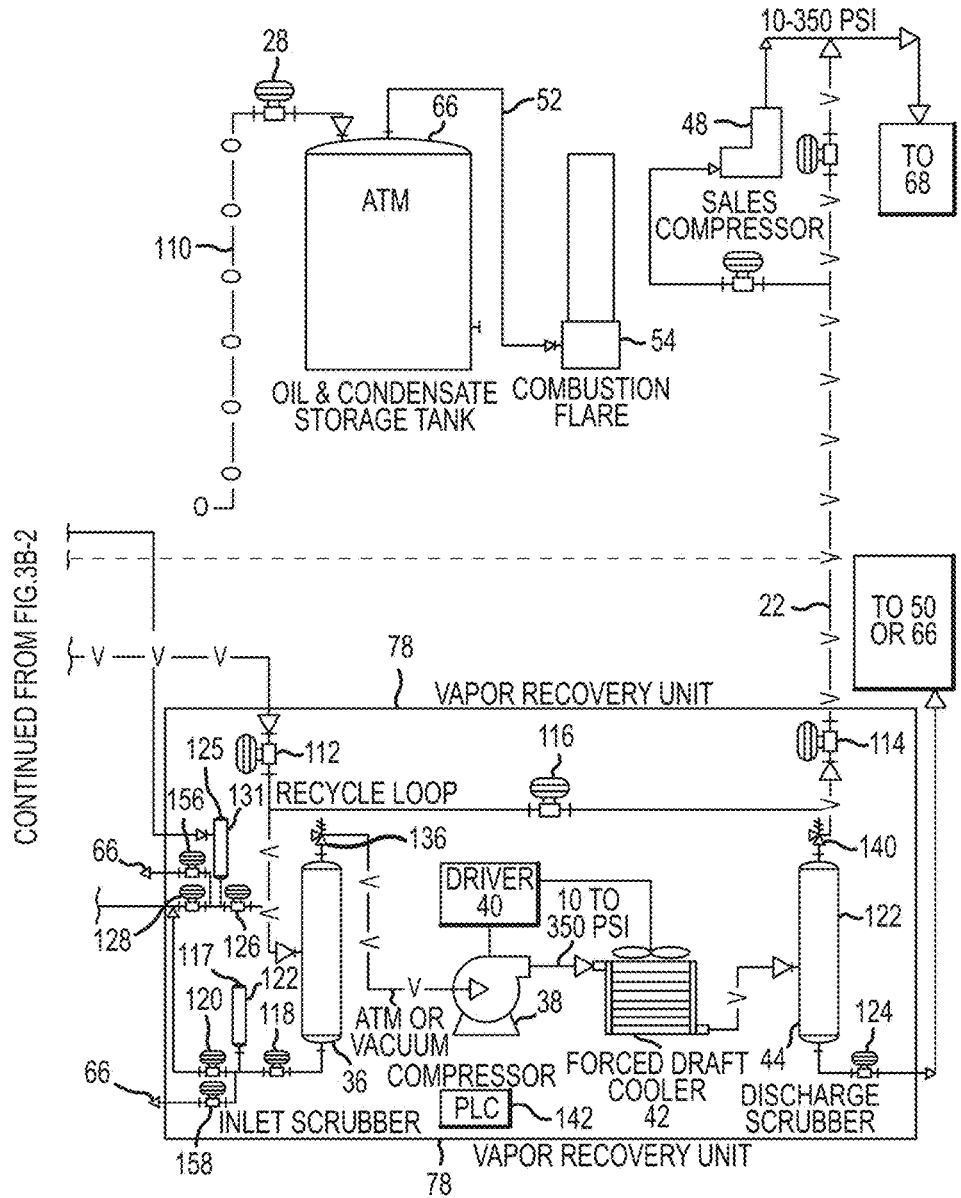

FIGS. 3B-1 and 3B-2 depict a more detailed flow diagram of an oil and condensate processing system 1 in accordance with the embodiment of FIG. 2B. The system 1 generally includes an oil and gas well head 2 or oil gathering pipeline 98, a produced water storage tank 84, an oil and condensate distillation unit 80, a vapor recovery unit 78, a sales line compressor 48, oil and condensate storage tank(s) 66, and a combustion flare 54, and may or may not be used in conjunction with a production separator 6.

An oil and condensate mixture that includes oil, condensate, water and natural gas is transmitted from an oil and condensate source 2, 98 to an oil and condensate distillation unit 80 for separation of the hydrocarbon mixture. The oil and condensate distillation unit 80 removes natural gas from the hydrocarbon mixture and transmits the removed natural gas through a conduit 32 to the vapor recovery unit 78. The natural gas then leaves vapor recovery unit 78 by conduit 22 to a sales line compressor 48 or natural gas pipeline 68. Water is removed from the hydrocarbon mixture through conduits 214, 220 to produced water tank storage tank(s) 84. Oil and condensate are transmitted from the oil and condensate distillation unit 80 through a control valve 26 to conduit 110 and to the oil and condensate storage tank(s) 66.

Figure 4A:
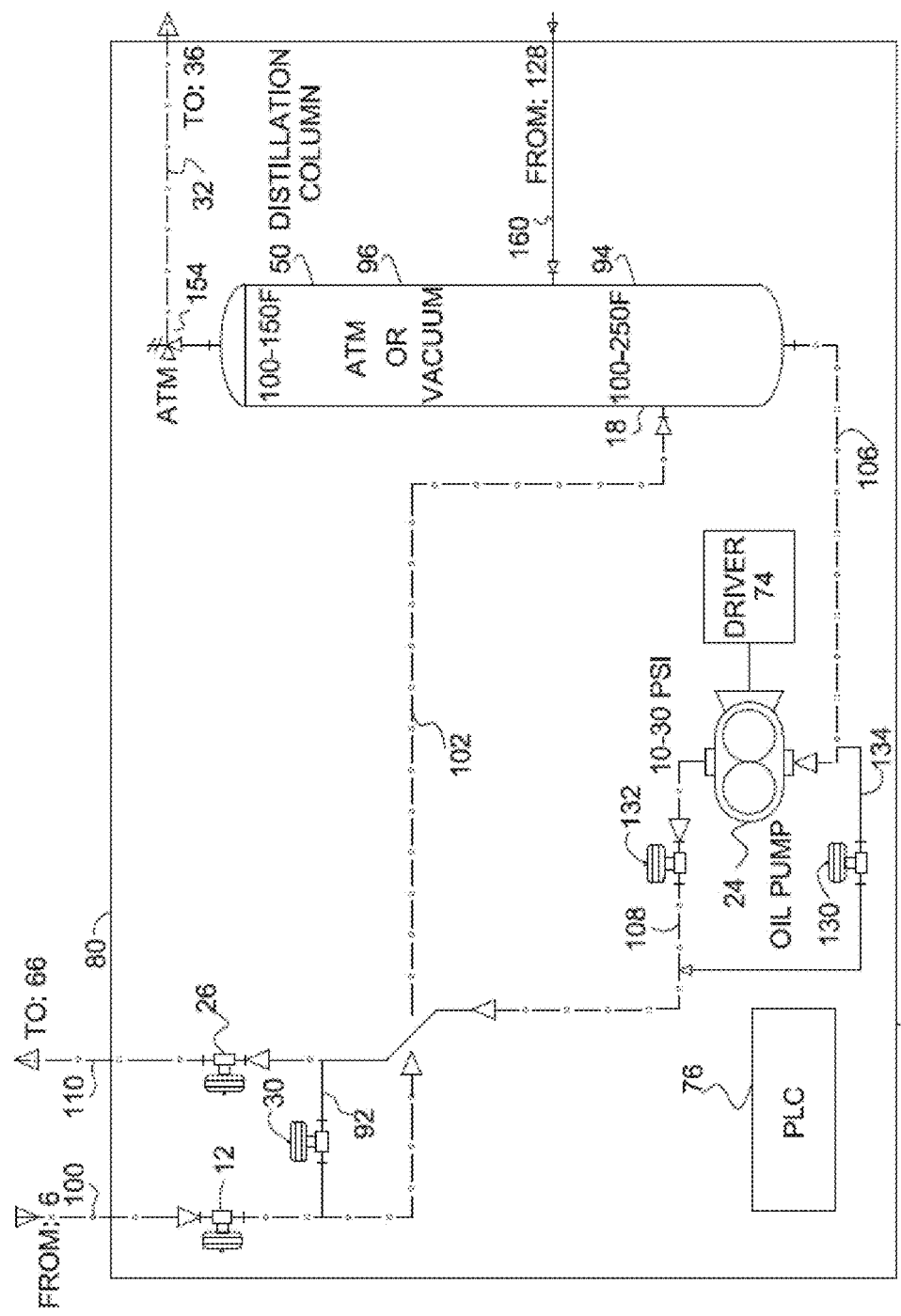
FIG. 4A depicts a flow diagram of an embodiment of the oil and condensation distillation unit of the oil and condensate processing system in accordance with the embodiment of FIG. 2A.
Figure 4B:
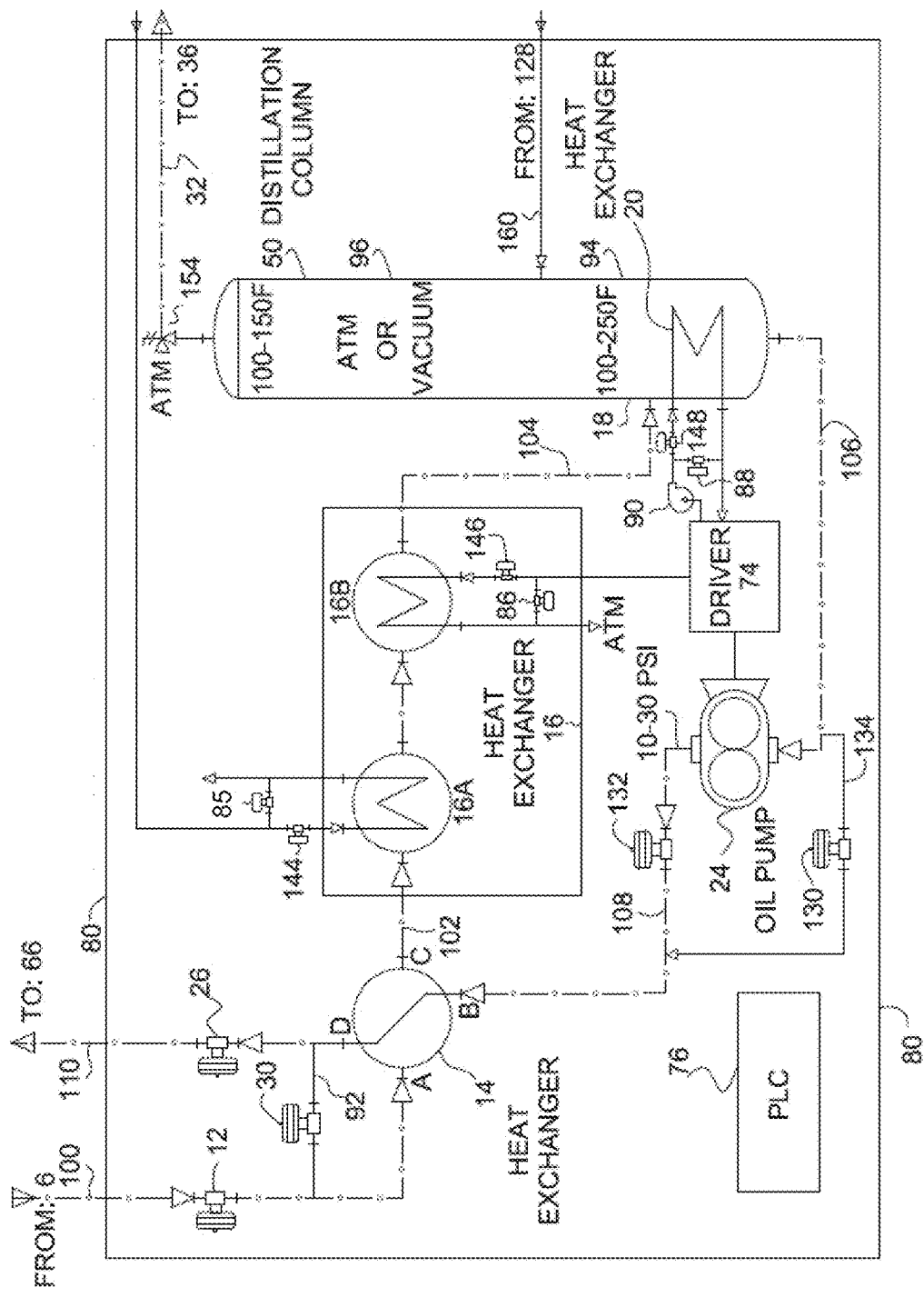
FIG. 4B depicts a flow diagram of another embodiment of the oil and condensation distillation unit of the oil and condensate processing system in accordance with the embodiment of FIG. 2A.
Figure 4C:
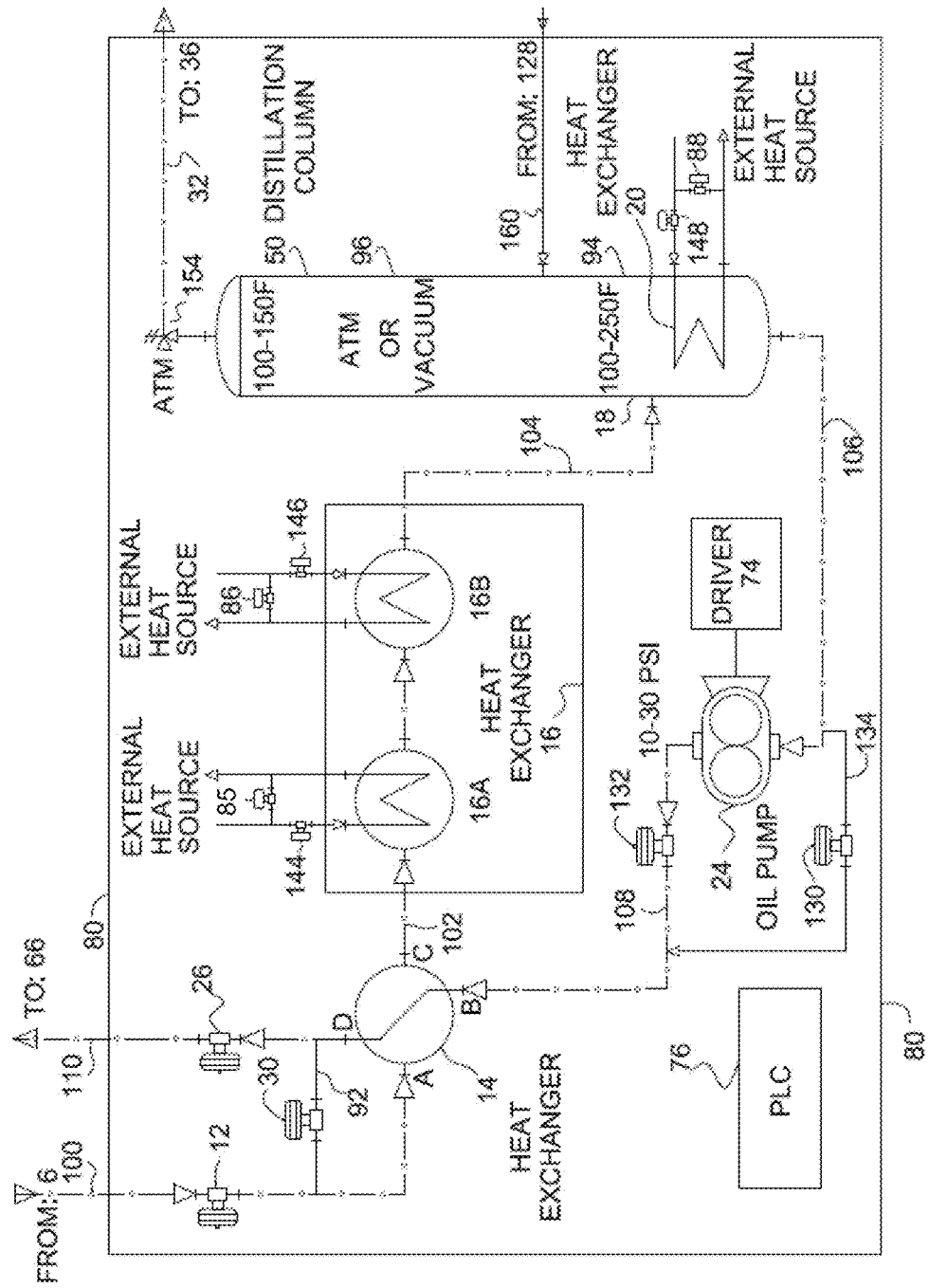
FIG. 4C depicts a flow diagram of yet another embodiment of the oil and condensation distillation unit of the oil and condensate processing system in accordance with the embodiment of FIG. 2A.
Figure 4D:
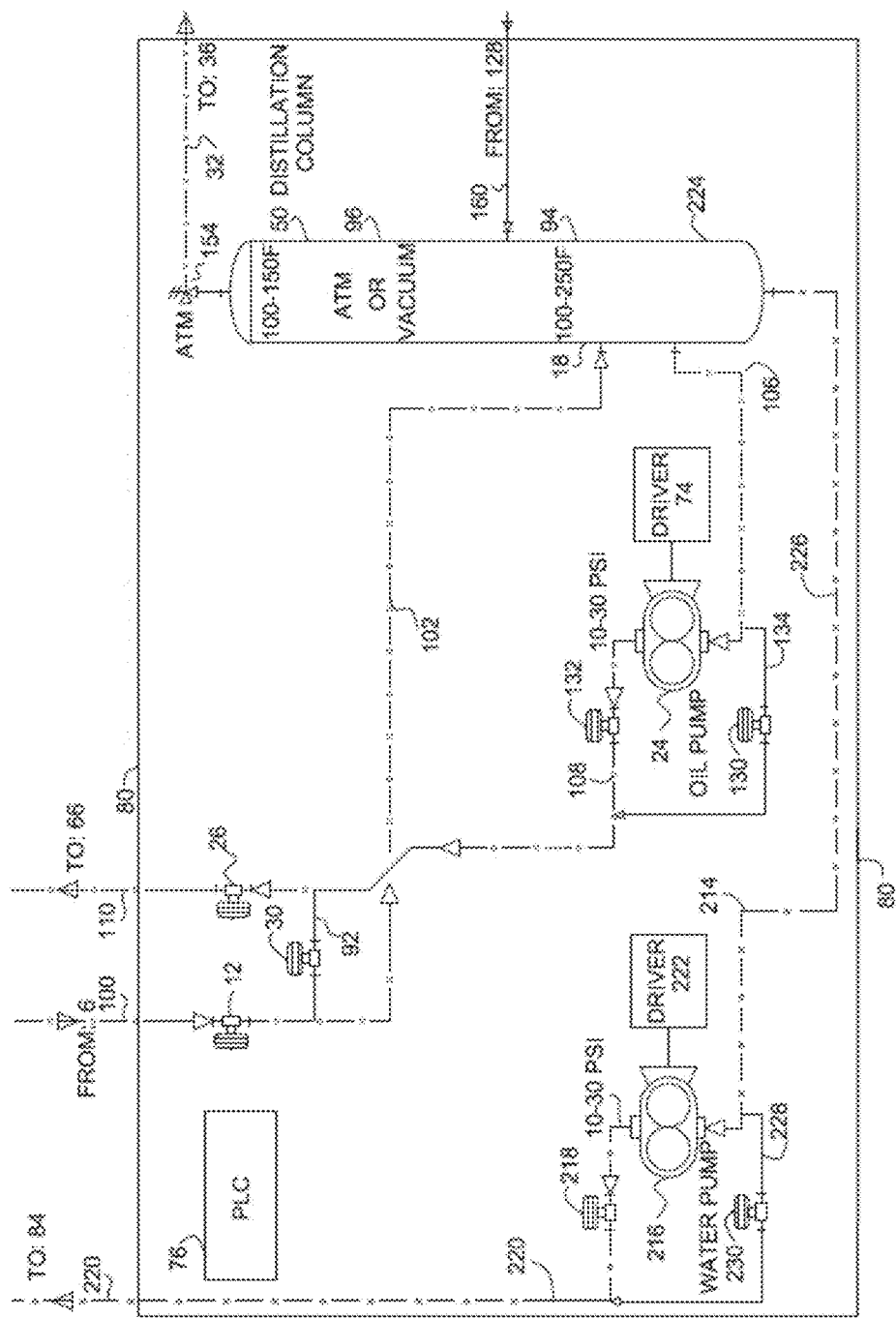
FIG. 4D depicts a flow diagram of yet another embodiment of the oil and condensation distillation unit of the oil and condensate processing system in accordance with the embodiment of FIG. 2B.

FIGS. 4A-C depict flow diagrams of three embodiments (embodiments A, B, C, respectively) of the oil and condensation distillation unit 80 of the oil and condensate processing system 1 in accordance with the embodiment of FIG. 2A. FIG. 4D depicts a flow diagram of yet another embodiment (embodiment D) of the oil and condensation distillation unit of the oil and condensate processing system 1 in accordance with the embodiment of FIG. 2B.

Generally, embodiments A, B and C illustrated in FIGS. 4A, 4B, and 4C, respectively, share the fundamental low pressure/vacuum conditions necessary for the recovery process described above, but differ slightly in the precise amounts of vapor that are captured. Embodiments B and C slightly increase the overall capture rate by adding heat to the oil entering the distillation column 50 which further aids the liberation of natural gas from oil. Embodiment B uses waste heat within the system 1 as a heating medium for the oil entering the column 50, while embodiment C introduces heat from an external source (such as a boiler) in order to heat the oil entering the distillation column 50.

FIG. 4A (embodiment A) is a preferred and exemplary embodiment of the system 1 as it requires no additional energy in the system to heat the oil entering the distillation column 50. Without heat, embodiment A captures approximately 98% flash vapor or 9.3% to 41.6% more captured vapors than existing technology/approaches. Depending on the size and location of the production facility, for example, it may be economical to utilize embodiment B or C, using energy to heat the oil in the system 1 but improving overall capture to 99%, or 7.1% to 34.6% more vapor captured than existing technology/approaches.

Turning to FIG. 4A (embodiment A), simulation and modeling have shown that at 150° F. and approximately ATM conditions in the distillation column 50, up to approximately 98% of vapor is captured, representing an improvement of approximately 9.3% to 41.6% over conventional processes. The oil and condensate distillation unit 80 includes a distillation column 50 and an oil pump 24. Oil and condensate removed from the production separator 6 is transmitted to the distillation column 50 where vapor is collected at approximately atmospheric or vacuum pressure conditions. The oil pump 24 transmits the oil and condensate to the oil and condensate storage tanks 66 (See FIGS. 3B-1, 3B-2). The oil pump driver 74 may be in the form of an engine or motor of types known in the art.

Turning to FIG. 4B (embodiment B), simulation and modeling have shown that at 250° F. and ATM conditions in the distillation column 50, up to approximately 98.6% vapor is captured, representing a slight improvement over embodiment A. The oil and condensate distillation unit 80 includes a first heat exchanger 14, a second heat exchanger 16, and a third heat exchanger 20. The heat exchanger 16 may have multiple stages; here, there are two stages, 16A and 16B.

Oil and condensate that is removed from the production separator 6 (See FIGS. 2A, 3A-1) is transmitted through a conduit 100 to the heat exchanger 14 and is heated by the processed oil and condensate exiting the oil pump 24. The heated oil and condensate exits the heat exchanger 14 via an exit C and through a conduit 102 flowing into the heat exchanger 16 where it is further heated. In one embodiment, the heat exchanger stage 16A is heated by engine exhaust from a compressor driver 40 (See FIG. 3A-2) and a heat exchanger stage 16B is heated by engine exhaust from the oil pump driver 74. The heated oil exits the heat exchanger 16 through a conduit 104 and flows to the distillation column 50, where an optimal temperature may be maintained by the heat exchanger 20. The heat exchanger 20 may, in one embodiment, be heated by engine jacket water from either the pump driver 74 or a compressor driver 40 (See FIG. 3A-2).

Oil and condensate then exit the distillation column 50 through a conduit 106 to an oil pump 24. The oil pump 24 transmits the heated oil and condensate through a valve 132 through a conduit 108 into the heat exchanger 14 via an entrance B, where the oil and condensate is cooled, then transmitted via an exit D through a conduit 110 to the oil and condensate storage tanks 66 (See FIG. 2A). The oil pump 24, the oil pump driver 74 and/or the compressor driver 40 as shown in FIGS. 3A-1, 3A-2 may be in the form of an engine or motor of types known in the art.

Turning to FIG. 4C (embodiment C), simulation and modeling have shown that at 250° F. and ATM conditions in the distillation column 50, up to approximately 99% vapor is captured, representing an improvement of approximately 7.1% to 34.6% improvement over conventional processes. The oil and condensate distillation unit 80 includes the heat exchanger 14, the heat exchanger 16, and the heat exchanger 20. The heat exchanger 16 may have multiple stages; here there are two stages, 16A and 16B. Oil and condensate that is removed from the production separator 6 (See FIG. 2A) is transmitted through a conduit 100 to the heat exchanger 14 via an entrance A wherein the oil is heated. The heat exchanger 14 is heated by the processed oil and condensate exiting the oil pump 24. The oil and condensate exits heat exchanger 14 via an exit C through the conduit 102 flowing into the heat exchanger 16 where it is further heated. The heat exchanger 16A and 16B stages are heated by an external heat source. The heated oil exits the heat exchanger 16 through the conduit 104 and flows to the distillation column 50 wherein optimal temperature is maintained by the heat exchanger 20. The heat exchanger 20 is heated by an external heat source.

Oil and condensate then exit the distillation column 50 through the conduit 106 to the oil pump 24. The oil pump 24 transmits the heated oil and condensate through a valve 132 through a conduit 108 into the heat exchanger 14 via the entrance B, wherein the oil and condensate is cooled and is then transmitted via an exit D through the conduit 110 to the oil and condensate storage tank(s) 66 (See FIG. 2A). The oil pump 24 and the oil pump driver 74 may be in the form of types known in the art.

FIG. 4D depicts a flow diagram of yet another embodiment (embodiment D) of the oil and condensation distillation unit 80 of the oil and condensate processing system 1 in accordance with the embodiment of FIG. 2B. Generally, embodiments A-D share the fundamental low pressure/ vacuum conditions necessary for the recovery process described above, but differ slightly in the precise amounts of vapor that are captured. Embodiment D increases oil and condensate production rates at the well 2 in addition to delivering the vapor recovery benefits of any of the embodiments A, B, or C. Embodiment D slightly improves oil and condensate production by decreasing plunger lift time intervals which is achieved by reducing the vapor pressure above the oil in the well head 2. Embodiment D may also use waste heat within the system 1, or from an external source as a heating medium for the oil, water and natural gas entering the distillation column 50.

FIG. 4D (embodiment D) is another exemplary embodiment of the system 1 as it requires no additional energy in the system to heat the oil, water and natural gas entering the distillation column 50. Embodiment D captures approximately 98% flash vapor or 9.3% to 41.6% more captured vapors than existing technology/approaches. Depending on the size and location of the production facility, for example, it may be economical to utilize embodiment B or C, using energy to heat the oil in the system 1 but improving overall capture to 99%, or 7.1% to 34.6% more vapor captured than existing technology/approaches. Additionally, Embodiment D improves oil and condensate production rates by 1-3% by applying low pressure or a vacuum directly at the well head 2. Applying low pressure or vacuum at the well head 2 increases the speed and frequency at which plunger lift systems operate.

Turning to FIG. 4D (embodiment D), simulation and modeling have shown that at 150° F. and approximately ATM conditions in the distillation column 50, up to approximately 98% vapor is captured, representing an improvement of approximately 9.3% to 41.6% improvement over conventional processes. The oil and condensate distillation unit 80 includes a distillation column 50, an oil pump 24, and a water pump 216. Oil and condensate removed from the well head 2 is transmitted to the distillation column 50 where vapor is collected at approximately atmospheric or vacuum pressure conditions. An oil pump 24 transmits the oil and condensate to the oil and condensate storage tank(s) 66 (See FIG. 2A or 2B). A water pump 216 transmits the water to the water storage tanks 84 through control valve 218 and conduit 220. The oil pump driver 74 and water pump driver 222 may be in the form of an engine or motor or other technology to transfer oil and water of types known in the art.

Figure 5:
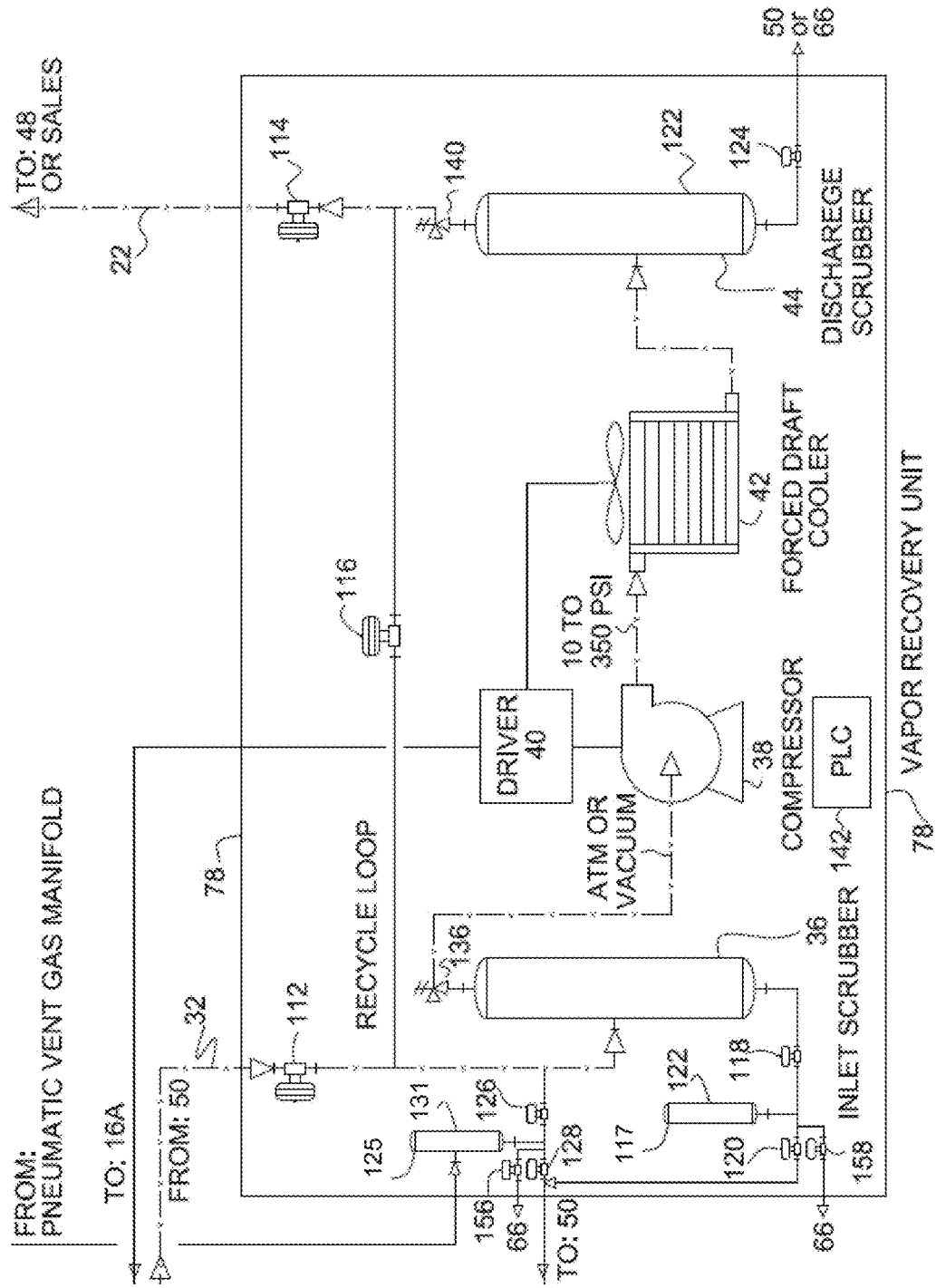
FIG. 5 depicts a flow diagram of the vapor recovery unit of the oil and condensate processing system in accordance with the embodiments of either FIG. 2A or 2B.

FIG. 5 depicts a flow diagram of the vapor recovery unit 78 of the oil and condensate processing system 1 in accordance with the embodiment of either of FIG. 2A or 2B. The vapor recovery unit 78 comprises an inlet suction scrubber 36, a compressor 38 of a type known in the art, a compressor driver 40, a forced draft cooler 42, and a discharge scrubber 44. Vapor is removed from the distillation column 50 through the conduit 32 to the inlet suction scrubber 36 where excess liquids are scrubbed prior to compression. The vapor then flows into the compressor 38 where it is compressed. Thereafter the vapor flows to the forced draft cooler 42 where it is cooled. The vapor then flows through the discharge scrubber 44 where liquids are scrubbed post compression. Optionally, the compressor 38 operates at a variable rate. Specifically, the driver 40 is configured to operate the compressor 38 at a variable rate. In one embodiment, the compressor 38 is operable to control pressure within the vapor recovery unit 78.

Vapor is compressed by the compressor 38, cooled by the forced draft cooler 42, the exits the discharge scrubber 44 flowing through conduit 22 to sales compressor 48 (FIGS. 3A-2, 3B-2) as depicted. In particular embodiments the vapor exits the discharge scrubber 44 and flows directly into the natural gas sales pipeline 68 (See FIGS. 3A-2, 3B-2). The compressor driver 40 may be in the form of an engine or motor of types known in the art.

As shown in FIG. 5, an inlet suction scrubber 36 is used to remove liquids that form within the conduit 32 and after the control valve 112. The liquids flow into a blow case 117 through a control valve 118. A pneumatic level float 122 controls the opening of a valve 120 and closing of a valve 118 to transmit the liquids out of the blow case 117. The liquids flow to the distillation column 50 or to the storage tanks 66. In particular embodiments a liquid removal apparatus of a type known in the art may be used to remove liquids from the inlet suction scrubber 36. In particular embodiments the liquid removal apparatus may be controlled by a PLC 142 of a type known in the art.

An outlet scrubber 44 is used to remove liquids that form after the compressor 38 and the forced draft cooler 42 due to compression and cooling of natural gas vapors. A pneumatic level float 122 controls the opening of the valve 124 to transmit the liquids to the distillation column 50 or the storage tanks 66. In particular embodiments the level float 122 and the control valve 124 may be controlled by a PLC 142 of a type known in the art.

Also, a pneumatic vent gas capture vessel 125 may be used to collect vented gas from the existing pneumatic equipment on production sites and from the pneumatic equipment within the present invention. Vented gas from existing pneumatic equipment onsite and pneumatic equipment within the present invention flows into the capture vessel 125. A pressure instrument 131 monitors the vessel pressure and a PLC 142 controls the opening of valves 126, 128, and 156, i.e. the control valve 128 closes, the valve 156 closes, the valve 126 opens and then captured vent gas flows to the inlet scrubber 36. In the event of malfunction or non-operation of compressor 38, the captured vent gas flows through the valve 128 to the distillation column 50 (See FIGS. 3A-1, 3B-1) or through the valve 156 to the storage tanks 66.

In particular embodiments, a liquid removal apparatus of a type known in the art may be used to remove liquids from the vessel 125. In particular embodiments the liquid removal apparatus may be controlled by the PLC 142. In particular embodiments the pressure instrument 131, the control valve 126, the valve 128, and the valve 156 may be controlled by pneumatics or a PLC of a type known in the art.

Figure 6:
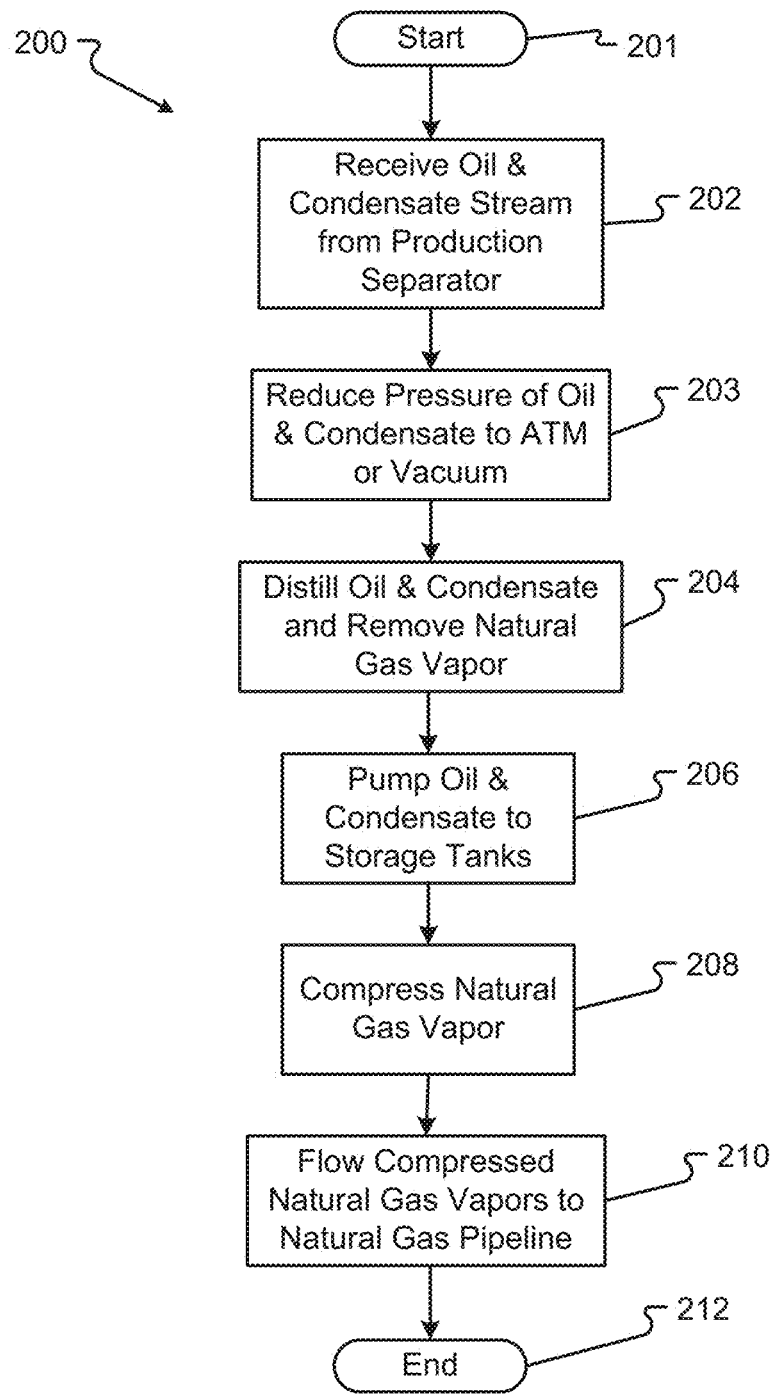
FIG. 6 depicts a method for the oil and condensate processing system in accordance with the embodiment of FIGS. 2A and 2B.

An embodiment of a method 200 for oil and condensate processing is shown in FIG. 6. While a general order for the steps of the method 200 is shown in FIG. 6, the method 200 can include more or fewer steps or can arrange the order of the steps differently than those shown in FIG. 6. For example, in embodiment D (i.e. FIGS. 2B, 4D and 7), the method 200 starts with the operation 203, then moves to operation 202, then on to operation 204. Generally, the method 200 starts with a start operation 202 and ends with an end operation 212. The method 200 can be executed as a set of computer-executable instructions executed by a computer system and encoded or stored on a computer readable medium. Hereinafter, the method 200 shall be explained with reference to the systems, components, modules, etc. described in conjunction with FIGS. 1-5 and 7.

At step 202, an oil and condensate mixture (which contains oil, natural gas and condensate at typical production separator pressure) stream is received from a production separator 6. At step 203, the pressure of the received stream of oil and condensate from step 202 is reduced to ATM or vacuum pressure. In Embodiment D (i.e. FIGS. 2B, 4D and 7) beginning with step 203, the vapor pressure above the oil and condensate is reduced at well head 2 then moving to step 202 the oil and condensate mixture (which contains oil, natural gas and condensate at low pressure to vacuum conditions) stream is received from well head 2. At step 204, at atmospheric or vacuum pressure the oil and condensate mixture is distilled and the natural gas vapors are removed. This step involves use of distillation column 50. At step 206, an oil pump (and water pump in embodiment D) transfers processed oil and condensate and water to oil and condensate storage tanks 66 and water storage tanks 84. At step 208, a compressor removes and compresses the natural gas vapors from the distillation column 50. At step 210, compressed natural gas vapors flow to the suction inlet of a sales line compressor or directly to a natural gas pipeline 68.

In particular, with embodiment D of method 200, oil and condensate containing oil, water, and gas is processed directly at an oil and gas well 2. The following steps involve processing the petroleum liquid in lieu of or in conjunction with typical three phase separators, vapor recovery towers, and storage tanks. The following steps are completed to process the oil and condensate at the well head 2: 1) reduce vapor pressure of well head 2 above oil and condensate column; 2) separate oil, water, and vapor from petroleum stream; 3) distill oil and condensate; 4) transfer oil to storage tanks; 5) transfer water to storage tanks; and 6) compress vapor and transfer to sales pipeline.

Figure 7:
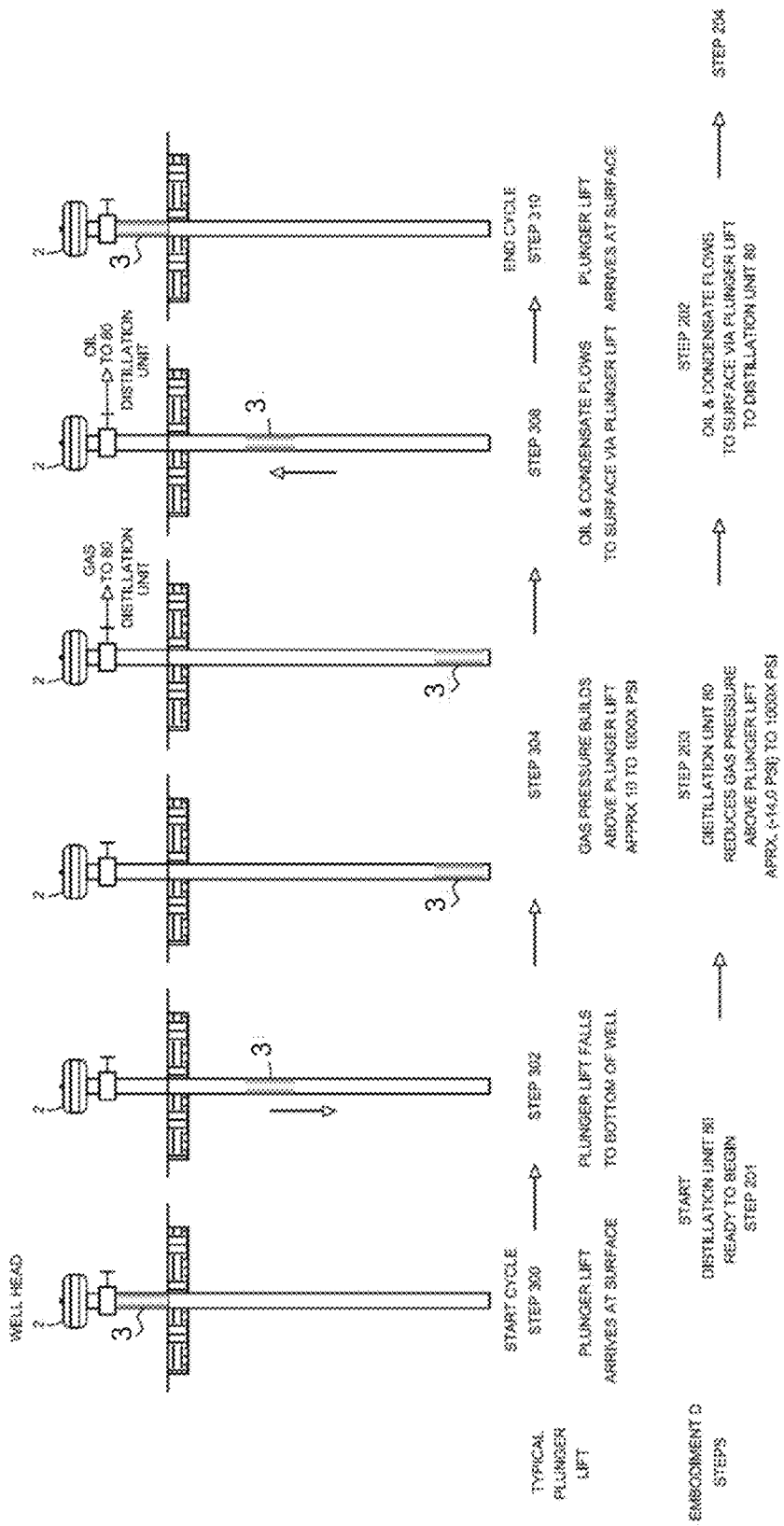
FIG. 7 depicts a method for the plunger lift system in accordance with the embodiment of FIG. 2B.

FIG. 7 depicts a method for the plunger lift system in accordance with embodiment D of FIGS. 2B, 4D and 7. The plunger lift system is used to aid in the recovery of oil and condensate from wellhead 2. Turning to FIG. 7, the steps of a typical plunger lift system are compared to the application of method 200. At step 300 the plunger 3 is held in the wellhead 2 until the plunger is released, step 302, and falls by force of gravity to the bottom of the well tubing. At step 304, the tubing pressure (vapor pressure above the oil and condensate) typically increases but during the application of method 200 the vapor pressure is reduced by the recovery unit until the optimal ratio of well casing to tubing pressure is reached (low pressure or vacuum conditions above the oil and condensate). At step 308, the plunger begins to move up the well tubing pushing the oil and condensate to the surface. At step 308, the oil and condensate flows to the three phase distillation unit for processing. At step 310, the plunger is captured in the wellhead and held until the released for another cycle starting at step 300.

With respect to FIGS. 1-7, additional details regarding elements, components and subsystems are now described.

Oil Pump Bypass

An Oil pump 24 or a compressor 38 may or may not be utilized in the current process. A PLC 76 enters into an oil pump bypass mode and closes the valve 132. The oil pump bypass mode allows the distillation column 50 to operate between atmospheric pressure and optimal inlet pressure for the sales compressor 48 so as to maintain natural gas vapor recovery without an operational oil pump 24 or a compressor 38. An oil and condensate mixture flows from the conduit 104 into the distillation column 50. Natural gas vapor is removed from the oil and condensate mixture in the distillation column 50. The processed oil and condensate mixture then flows from the distillation column 50 through the conduit 106 to the conduit 134 then to the valve 130. The processed mixture bypasses the oil pump 24 flowing through the conduit 134 and the valve 130 to the conduit 108. The level of oil and condensate in the distillation column 50 is measured by a level instrument 94. The level instrument 94 may include pneumatic controls or be operably associated with programmable logic controllers of a type known in the art. The PLC 76 opens the valve 130 when oil and condensate mixture reaches a predetermined level in the distillation column 50. The oil and condensate mixture exits the distillation column 50 flowing through the conduit 106 to the conduit 134 through the valve 130, bypassing the oil pump 24, and flowing to the storage tanks 66. Suitable level instruments 94 are known to those of skill in the art and may be obtained from a variety of suppliers including, but not limited to, Magnetrol International, Inc. of Aurora, Ill., Gems Sensors & Controls of Plainville, Conn., Emerson Rosemount of Shakopee, Minn., and Endress Hauser of Reinach, Switzerland.

Water Pump Bypass

Turning to embodiment D and FIG. 4D, the processed water flows from the distillation column 50 through the conduit 226 to the conduit 228 then to the valve 230. The water bypasses the water pump 216 flowing through the conduit 226 to the conduit 228 through the valve 230 to conduit 220. The level of water in the distillation column 50 is measured by a level instrument 224. The level instrument 224 may include pneumatic controls or be operably associated with programmable logic controllers of a type known in the art. The PLC 76 opens the valve 230 when water reaches a predetermined level in the distillation column 50. The water exits the distillation column 50 flowing through the conduit 226 to the conduit 228 through the valve 230, bypassing the water pump 216, and flowing to the storage tanks 84 through conduit 220.

Pressure Safety Valves

The pressure relief valve 154 associated with the distillation column 50 exists for circumstances when the vapor recovery compressor 38 is not in operation to ensure the distillation column 50 does not exceed a safe pressure. The pressure relief valve 136 and the relief valve 140 exist for safety to vent gas to atmosphere if the inlet scrubber 36 or the outlet scrubber 44 over-pressurizes.

Hand Style Isolation Valves

All major equipment has isolation valves of hand type known in the art.

Distillation Column

With respect to embodiment A (FIG. 4A), oil and condensate pass through the conduit 102 and enters the distillation column 50. The distillation column 50 operates in the pressure ranges of approximately negative 14.0 psig (vacuum) up to atmospheric pressure. The oil and condensate temperature ranges from approximately ambient temperature to approximately 150° F. The distillation column 50 removes vapors from the oil and condensate which are liberated from the liquid phase to vapor phase by the process of applying a vacuum or atmospheric pressure within the distillation column. The vapors are removed through the conduit 32 to the inlet of the vapor recovery unit 78 (See FIG. 3A or 3B) as previously described. The vapor recovery unit can be of a type known in the art. In the particular embodiment D, the internals of the distillation column 50 may incorporate contours or structures to enhance the removal of vapors from the oil and condensate or for the purpose of separating the vapors into fundamental chemical components such as propane and butane.

With respect to embodiment B (FIG. 4B), oil and condensate exit the heat exchanger 16 via the conduit 104 and enters the distillation column 50. The distillation column 50 operates in the pressure ranges of approximately negative 14.0 psig (vacuum) up to atmospheric pressure and oil temperature ranges from approximately 150° F. to 170° F.

within the distillation column. The distillation column 50 liberates vapors from the liquid phase to vapor phase by the process of heating the oil and condensate by heat exchangers 14, 16, and 20, and by applying a vacuum or atmospheric pressure within the distillation column. The heated oil and condensate temperature at the bottom of the column 50 ranges from approximately 150° F. to 170° F. The vapor temperature at the top of the column is approximately 150° F. The vapors are removed through conduit 32 to the inlet of the vapor recovery unit 78 as previously described. The vapor recovery unit 78 can be of a type known in the art. In the particular embodiment of B, the internals of distillation column 50 may incorporate contours, structures, or additional heat exchangers to enhance the removal of vapors from the oil and condensate or for the purpose of separating the vapors into fundamental chemical components such as propane and butane.

With respect to embodiment C (FIG. 4C), the oil and condensate exit the heat exchanger 16 and enter a distillation column 50. The distillation column 50 operates in the pressure ranges of approximately negative 14.0 psig (vacuum) up to atmospheric pressure and oil temperature ranges from approximately 150° F. to 250° F. and up to the thermal cracking temperature of hydrocarbons within the distillation column. The distillation column 50 removes vapors liberated from the liquid phase to vapor phase by the process of heating the oil and condensate by the heat exchangers 14, 16, and 20, and by applying a vacuum or atmospheric pressure within the distillation column. The heated oil and condensate temperature at the bottom of the column is approximately 150 to 250° F. The vapor temperature at the top of the column is approximately 150° F. The vapors are removed through the conduit 32 to the inlet of the vapor recovery unit 78 as previously described. The vapor recovery unit can be of a type known in the art. In the particular embodiment of C, the internals of distillation column 50 may incorporate contours, structures, or additional heat exchangers to enhance the removal of vapors from the oil and condensate or for the purpose of separating the vapors into fundamental chemical components such as propane and butane.

With respect to FIG. 4D (Embodiment D) oil, condensate, and water pass through the conduit 102 and enters the distillation column 50. The distillation column 50 operates in the pressure ranges of approximately negative 14.0 psig (vacuum) up to atmospheric pressure. The oil, condensate and water temperature ranges from ambient temperature to approximately 150° F. The distillation column 50 removes vapors from the oil and condensate which are liberated from the liquid phase to vapor phase by the process of applying a vacuum or atmospheric pressure within the distillation column. The distillation column 50 separates the water from the oil and condensate and the water is transferred to water storage tanks 84 via water pump 216 through conduit 220 and control valve 218. The vapors are removed through the conduit 32 to the inlet of the vapor recovery unit 78 (See FIG. 3A or 3B) as previously described. The vapor recovery unit can be of a type known in the art. In the particular embodiment D the internals of the distillation column 50 may incorporate contours or structures to enhance the removal of vapors from the oil and condensate or for the purpose of separating the vapors into fundamental chemical components such as propane and butane. Embodiment D may or may not utilize any of the heat exchangers from embodiments A, B, or C to aid in vapor recovery.

Distillation Unit-Temp Control

With respect to embodiment A (FIG. 4A), no heat is generally used, i.e. the temperature of oil and condensate is not controlled above or below ambient conditions.

With respect to embodiments B and C (FIGS. 4B and 4C, respectively), the temperature of the heated oil and condensate entering the distillation column 50 is measured by a temperature instrument 18 of a type known in the art. The temperature instrument 18 includes or is operably associated with programmable logic controllers of a type known in the art. The programmable logic controllers 76 control the temperature via control valves 85, 86, 88, 144, 146, and 148. These six (6) control valves will be selectively actuated to allow the heat sources to bypass the heat exchangers 16 and 20 maintaining optimal heat exchanger temperatures. The programmable logic controllers will open the temperature bypass valve 85 first until it is fully open and the valve 144 is closed. Next, the temperature bypass valve 86 is opened until it is fully open and the valve 146 is closed. Thereafter, the temperature bypass valve 88 is opened until it is fully open and the valve 148 is closed. Optionally, in particular embodiment B (FIG. 4B), the engine water coolant auxiliary pump 90 may be used to help compensate for any pressure drop by circulating engine water coolant through the heat exchanger 20.

Distillation Unit—Level Control & Recycle

The level of oil and condensate in the distillation column 50 is measured by a level instrument 94. The level instrument 94 includes or is operably associated with a programmable logic controller of a type known in the art. The programmable logic controller 76 controls the heated oil and condensate level via a recycle loop using control valves. The control valves 12, 26, and 30 are used to control a recycle loop wherein processed oil and condensate exiting the heat exchanger 14 via exit D may be recycled via the conduit 92 back into the heat exchanger 14 via the entrance A flowing back through the distillation unit 80. The programmable logic controller 76 closes the valve 26 and closes the valve 12 and opens the valve 30. Thereafter, partial or complete flow of heated oil and condensate is recycled through the oil distillation unit 80 in a recycle loop to maintain optimal oil and condensate level in the distillation column 50. In particular embodiments of C, the programmable logic controller may monitor and/or control a variable frequency drive to vary the oil pump speed (oil flow) to control the oil level in the distillation column 50.

The water level in the distillation column 50 is measured by a level instrument 224. (FIGS. 3B and 4D) The level instrument 224 includes or is operably associated with a programmable logic controller of a type known in the art. The programmable logic controller 76 controls the water level using control valves 218 and 130.

Vapor Recovery Unit—Pressure Control & Recycle

The distillation column 50 pressure is measured by a pressure instrument 96 (See FIG. 3A or 3B). The pressure instrument 96 includes or is operably associated with programmable logic controllers of a type known in the art. FIG. 5 depicts a programmable logic controller 142 that controls the pressure via a control valve 112. The control valve 112 is used to control the vacuum applied to the distillation column 50 by the compressor 38. During periods of low or near zero vapor production, the programmable logic controller closes the control valve 112 and the control valve 114 while the control valve 116 is opened. The compressed vapor exiting a discharge scrubber 44 is recycled through the control valve 116 back to the inlet suction scrubber 36. Thereafter, partial flow or complete flow of compressed vapor is recycled through the vapor recovery unit 78 in a loop to maintain on-demand operational status. In a particular embodiment of the embodiment of C (FIG. 4C), the programmable logic controller 142 may control a variable frequency drive to vary the compressor speed (vapor flow) to control the vacuum applied to the distillation column 50 (See FIG. 3A).

Forced Draft Cooler

FIG. 5 depicts a forced draft cooler 42 used to reduce the temperature of the compressed vapor exiting the compressor 38 to ensure the compressed vapor is within the operating limits for flow measurement, gas quality measurement, and natural gas pipeline specifications. In a particular embodiment, the forced draft cooler 42 is used to reduce the temperature of the compressed vapor to ensure the compressed vapor remains within the acceptable operating limits for a sales compressor 48. In particular embodiments, the forced draft cooler may have louvers controlled by a PLC of a type known in the art.

Benefits

The disclosed system and method provides a superior method for processing oil and condensate by distilling hydrocarbon vapors from the oil and condensate mixture, and increases the speed and frequency at which plunger lift systems operate. Many benefits result from the disclosed system and method. For example, energy conservation and the removal of controlled and fugitive emissions from typical oil and gas production sites is achieved. A processing system constructed and operated in accordance with the present invention captures hydrocarbon gases that are typically released as fugitive emissions or otherwise burned off at flares and delivers them as usable energy to the natural gas sales pipeline. Distilling the oil and condensate mixture removes hydrocarbon gases that negatively affect air quality. Maintaining atmospheric or applying a vacuum maximizes the removal of natural gas vapors from the oil and condensate mixture in the distillation column. By distilling the oil and condensate mixture at atmospheric or vacuum pressure within the distillation column, nearly all of the natural gas vapors are captured.

Also, the processing of the oil and condensate mixture prior to the tanks as disclosed herein eliminates contamination by ambient air commonly observed in oil and condensate storage tanks. Reducing the pressure of the oil and condensate mixture to atmospheric or vacuum conditions improves capture of natural gas vapors by upwards of 40% over prior art. Reducing the pressure of the oil and condensate mixture to atmospheric or vacuum increases the capture of between 98-99% of entrained natural gas vapors in the oil and condensate mixture. The remaining 1-2% of remaining natural gas vapors can be removed by heating the mixture prior to entering the distillation column. Heating the oil and condensate mixture at 35-125 PSI (such as described by Ward, above) without reducing the pressure to atmospheric or vacuum pressure removes only 64.5% to 94.4% of the entrained natural gas vapors in a mixture. Based on simulation and modeling of prior art ("Ward"), even at maximum capture efficiency Ward is still below the 2012 EPA New Source Performance Standards. Using a natural gas compressor to maintain atmospheric or vacuum pressure along with an oil pump to maintain oil level within the distillation column captures 99%, or virtually all, of the entrained natural gas. The disclosed system and method captures upwards of 40% more of the natural gas vapors entrained in an oil and condensate mixture over systems that heat oil at typical production pressure.

Another benefit provided by the disclosed system and method is the increase in the speed and frequency at which plunger lift systems operate. Increasing the speed and frequency of plunger lifts improves the oil and condensate production rates at a well site significantly improving the financial benefits of the method over vapor recovery alone. Based on simulation and modeling an increase of 1-3% in crude oil production can be expected providing another revenue stream in addition to vapor recovery in the disclosed system and method. (See FIG. 7).

In yet another embodiment, the disclosed systems and methods may be partially implemented in software that can be stored on a storage medium to include a computer-readable medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

In one embodiment, the user interacts with the computer through any means known to those skilled in the art, such as a keyboard and/or display (including a touch-sensitive display). The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

In one embodiment, one or more components of the system or method are automatically controlled. For example, in embodiment D, the well head pressure may be automatically controlled, and/or the types of hydrocarbons gases distilled are controlled. In one embodiment, one or more components of the system or method are automatically controlled via an operator or user who selects desired parameters, conditions, metrics, inputs, and/or outputs via a display and/or screen. For example, a user may select, from a display menu, the hydrocarbons to capture, individually or, for example, by identification of the heaviest hydrocarbon to capture.

Figure 9A:
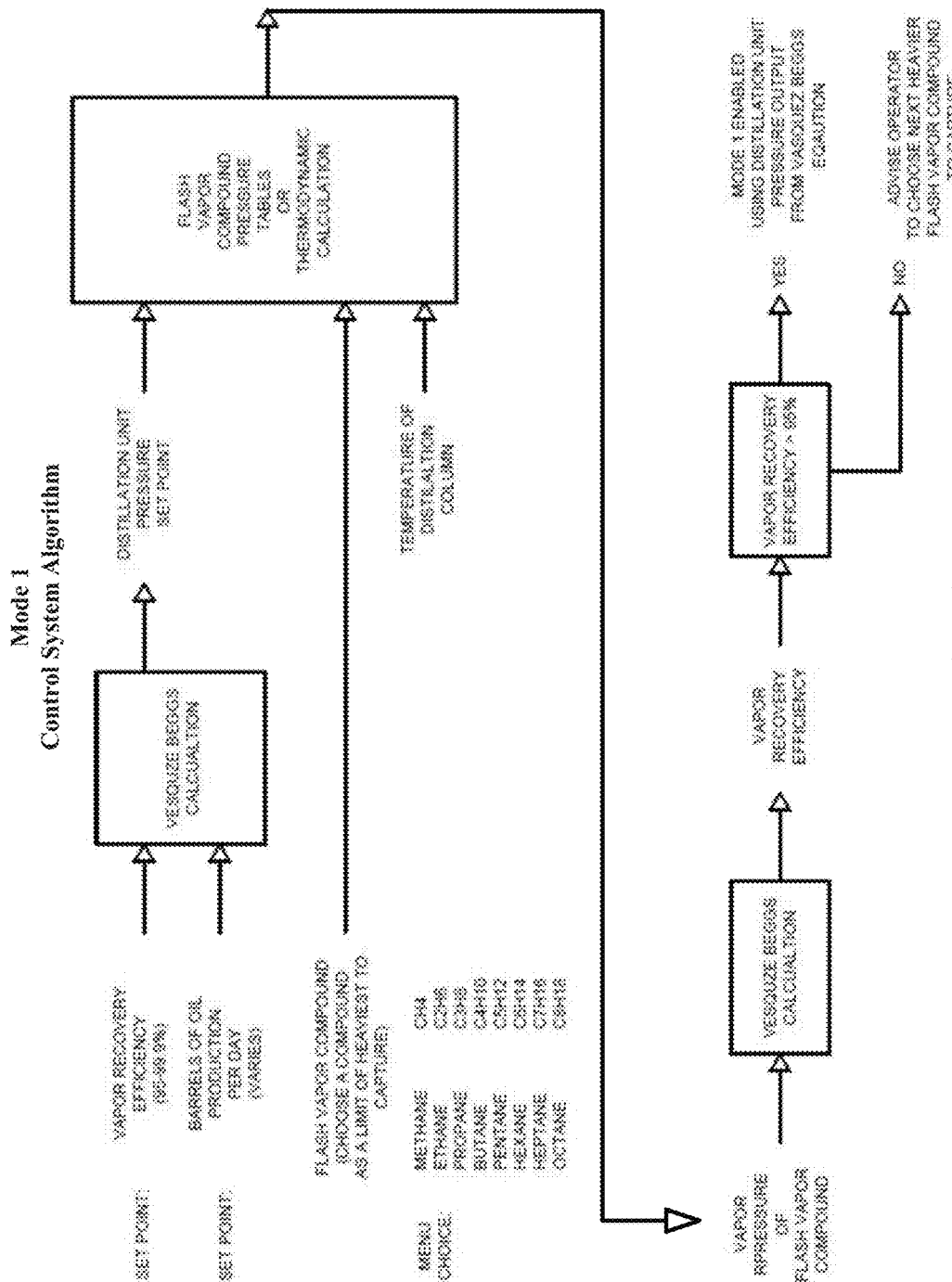
FIG. 9A depicts a flow diagram for an embodiment of a control system algorithm for Mode 1 of the oil and condensate processing system.
Figure 9B:
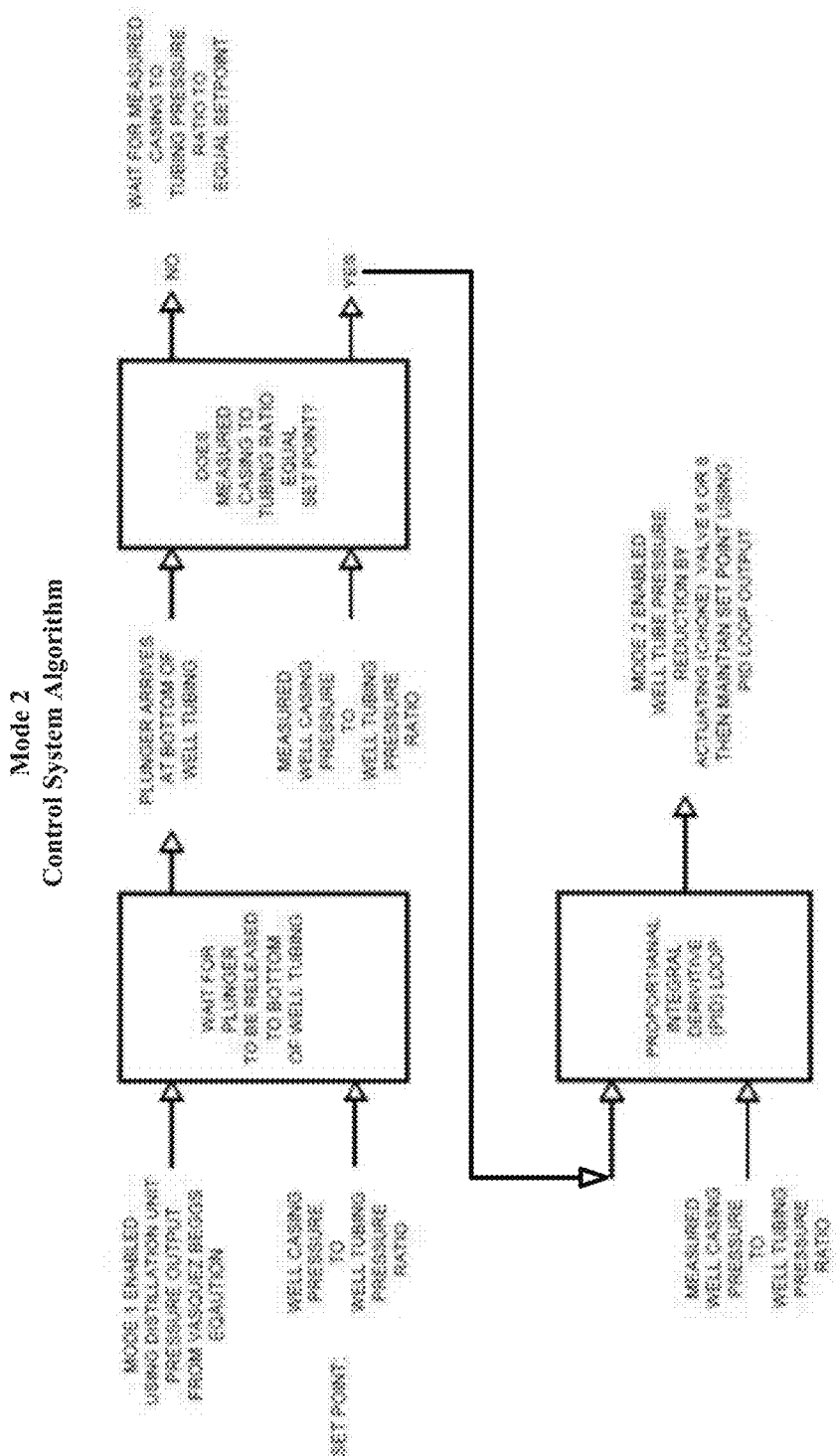
FIG. 9B depicts a flow diagram for an embodiment of a control system algorithm for Mode 2 of the oil and condensate processing system.
Figure 9C:
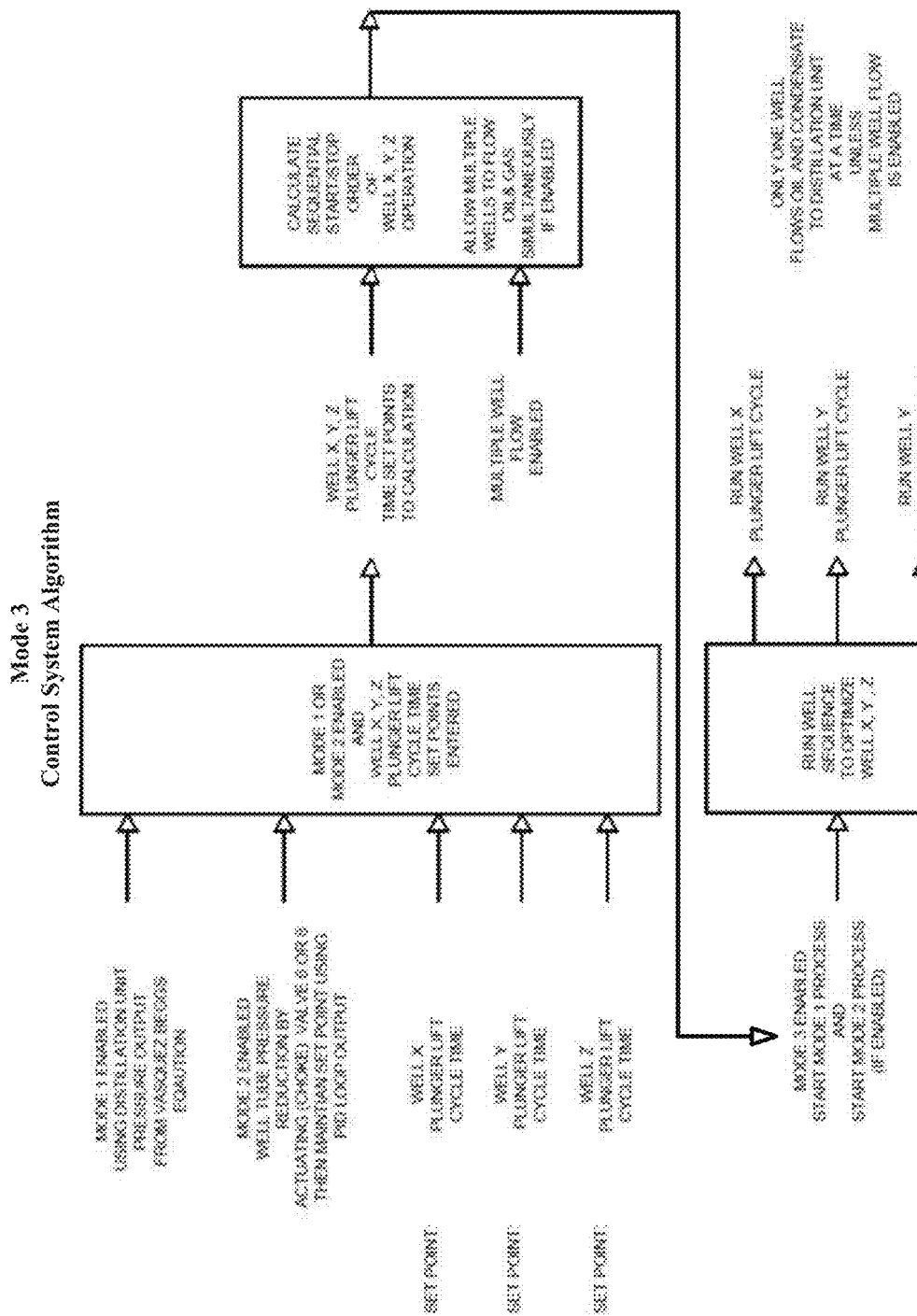
FIG. 9C depicts a flow diagram for an embodiment of a control system algorithm for Mode 3 of the oil and condensate processing system.

FIGS. 9A-C depict flow diagrams for embodiments of a control system algorithm for Modes 1-3, respectively, of the oil and condensate processing system.

Generally, the control system for each of embodiments A-D (FIGS. 4A-D) provide adjustable set points to tune at least the three (3) modes of operation: mode 1 vapor recovery (Embodiments A, B, C, D), mode 2 oil production enhancement (Embodiment D), and mode 3 multiple well optimization (Embodiments A, B, C, D). In any mode of operation, a user or operator may engage the control system through one or more of a display, a screen, and a computer. Also, in any mode of operation, the control algorithm may incorporate a mathematical function such as a proportional integral derivative (PID) feedback loop, or other control system algorithms or techniques know to those skilled in the art, to include stochastic control, adaptive control, etc.

FIG. 9A depicts the control system algorithm for mode 1. When Embodiments A, B, C, D are operating in mode 1 (vapor recovery mode) the critical set points comprise vapor recovery efficiency (95-99%), barrels of oil production per day (bbl/day), and a menu choice of desired flash vapor compounds (natural gas, propane, butane, pentane etc.) to capture. The Mode 1 control system algorithm will determine the optimal distillation column pressure to capture flash vapor at the desired vapor recovery efficiency and capture the desired flash vapor compounds. As a fail-safe, the algorithm may warn the operator if the choice of flash vapor compound will cause the vapor recovery efficiency to drop below 95% capture and may advise the operator to, for example, choose the next heavier flash vapor compound to capture. Capturing heavier flash vapor compounds will reduce the potential flash vapor emissions when the oil and condensate goes to the tanks. This is important since the EPA requires oil production sites to maintain minimum of 95% vapor recovery or combustion of flash vapors from storage tanks. However, improving efficiency of capture increases the use of horse power so a balance of vapor recovery efficiency and horse power use is desired to maximize economic return from capturing flash gas. After the set points are entered, the control system varies the distillation column pressure and flow of oil and condensate to maintain the vapor recovery efficiency set point and desired flash vapor compound set point.

FIG. 9B depicts the control system algorithm for mode 2. To operate in mode 2, mode 1 must be enabled. When Embodiments A, B, C, D are operating in mode 2 (oil well production enhancement) a critical set point is the ratio of well casing to well tubing pressure (determined by operational tuning at each well). The initial well casing to well tubing ratio is based on operational tuning. The control system algorithm for mode 2 monitors the pressure of the well casing and pressure of the well tubing and opens or closes control valve (choke valve) 6 or 8 to vary the well tubing pressure to match the entered set point for well tubing pressure (varies from sales line pressure to ATM to −14 psi). The control algorithm may incorporate a mathematical function such as a proportional integral derivative (PID) feedback loop (or other control system algorithms or techniques know to those skilled in the art, to include stochastic control, adaptive control, etc.) to maintain the optimal open or closed position of control valve (choke valve) 6 or 8 so that the well tubing pressure set point is maintained. The control algorithm continuously monitors the casing pressure then calculates and compares the measured well casing to well tubing pressure ratio to the entered set point (selected or entered by the operator). The PID control loop actuates control (choke) valve 6 or 8 to adjust the well tube pressure to maintain the set point value.

In mode three of FIG. 9C, the system monitors multiple wells and processes oil and gas from one well at a time in a sequential order. Here, mode 1 and/or mode 2 must be enabled, and a well plunger lift timer cycle set point entered for each well (time for a plunger to fall to the bottom of the well then return to the surface). The well casing pressure and well tubing pressure is monitored at each well as in mode 2. The algorithm for mode 3 may also monitor the typical plunger lift cycle time for each well, then calculate the sequential order in which the wells operate. In this mode 3, only one well at a time may flow oil and gas to the distillation unit at any one time. However, the well plunger lift cycles may overlap but only the rule applies that one well at a time is allowed to flow oil and gas to the distillation unit at a time. However, there is an exception such that more than one well can flow oil gas to the distillation column when multiple well flow control function is enabled by the operator. When multiple well flow is enabled, more than one well may flow oil and gas to the distillation unit as a combined flow.

For example, if the site has three wells (X, Y, and Z) and each well has a plunger lift cycle of one hour then the algorithm will operate one plunger lift cycle for well X, then operate one plunger lift cycle for well Y, then one plunger lift cycle for well Z. The total time to run one plunger lift cycle for all three wells in sequence is three hours. Over twenty-four hours each well will operate eight times (eight plunger lift cycles per well).

In another example, well X has a plunger lift cycle of two hours where the first hour of the cycle well X is building casing pressure to reach the entered casing to tubing ratio set point. Well Y and well Z have plunger lift cycles of one hour. The control algorithm will operate a plunger lift cycle for well Y which is one hour while well X is building casing pressure. After well Y plunger lift cycle is complete the control algorithm allows well X to flow oil and gas to the distillation column during the second hour of the respective plunger lift cycle. After well X plunger lift cycle is complete, the control algorithm operates well Z plunger lift cycle for one hour. In this example, the well run times have been optimized such that each well still completes eight plunger lift cycles in a twenty-four-hour period. This had been accomplished by allowing well X and well Y to overlap their well plunger lift cycle times.

In yet another example, consider two wells (X, and Y). Well X has a plunger lift cycle of two hours, the first hour building pressure in the well casing and the second hour flowing oil and gas to the surface. Well Y has a plunger lift cycle of one hour. The control algorithm begins well X plunger lift cycle and well Y plunger lift cycle at the same time. Well Y completes its plunger lift cycle in one hour then the control system allows well X to flow oil and gas to the distillation unit. The sequence repeats throughout the day. In this example, both wells complete 12 plunger lift cycles per day.

Generally, the system for oil and condensate processing provides unexpected results and benefits. In one initial embodiment, a Vapor Recovery Unit 78 that captures greater than 95% of specified flash vapor containing (natural gas, propane, butane, and natural gasolines) from oil and condensate was developed. This result was accomplished by processing oil and condensate at low pressures down to atmospheric pressure (ATM) to a vacuum of −14 psi within a distillation column. See FIG. 3A-1. It is possible to estimate the low pressure set point that will maximize the flash vapor recovery and/or choose the heaviest hydrocarbons desired to capture. For example, the lower the pressure in the distillation column, the heavier the hydrocarbon chains that can be captured as a flash vapor. The captured flash vapor energy (BTU content) will increase when heavier hydrocarbon gasses are captured making a higher value gas product to sales pipelines. As a general rule, natural gasolines (octanes $C_8H_{18}$) are about the heaviest hydrocarbon desired to capture because these hydrocarbons are typically a liquid at sales pipeline pressures and are difficult to measure at gas custody meters. The sales stream should be in a gas state to accurately and precisely measure gas flow and gas quality for sales to pipelines.

One unexpected benefit of low pressure vapor recovery and distillation, as disclosed, is that the system can be used to lower the pressure of the well head (to include the well tubing to the bottom of the well) to pressures lower than the sales line. The system can vary the well tubing pressure from sales line pressure (approx. 300 psi) in this example to atmospheric pressure (ATM) and even down to a maximum vacuum of −14 psi. This reveals that the vapor recovery system has a novel benefit to increase oil production by lowering the well head pressure, thereby assisting existing technologies such as plunger lift systems. One way to describe this effect is that a plunger lifting oil and condensate to the surface must fight the resistance of sales line pressure, if the resistance is removed by lowering the pressure in the well tubing the plunger can push oil and condensate up the tubing faster. This can be accomplished in addition to the initial embodiment which served to, among other things, capture specified flash vapor compounds from the oil and condensate stream from the 3-phase separator.

To extend and leverage the initial embodiment, the system, in other embodiments, operates in three different modes of operation: Mode (1) vapor recovery at low pressure or a vacuum; mode (2) oil well production enhancement at low pressure or a vacuum; and mode (3) as a multiple well oil production enhancement tool. Embodiments A, B, C, D (described in conjunction with FIGS. 4A-D) can operate in mode 1, Embodiment D, can operate in mode 2, and Embodiments A, B, C, D can operate in mode 3.

As an example, in one embodiment, the system may be placed on a new well site just after drill completion and may operate in mode (1) as a vapor recovery system, then as the well ages and oil and gas flows decrease, the system may operate in mode (2) as an oil production aid at a low pressure or a vacuum while still performing the benefit of vapor recovery of mode (1). If the system is placed on a site with multiple wells, it can operate in mode (3) where he system is used the system can be used to enhance oil production and optimize the production of multiple wells at a site while performing the benefits of mode (1) vapor recovery and oil production enhancement mode (2). In mode (3), the system monitors each well head and processes oil and gas from one well at a time in a sequential order.

In a further application, the system is placed on an existing well that is aging. The system will operate in mode 2, enhancing oil production with the normal gains of mode 1 vapor recovery. In another application the system may be placed on a well and operate only in mode 1 only (Embodiment A, B, C). In another application, the system may be placed on a site with multiple wells and operate in mode 1 (vapor recovery), and mode 3 (multiple well optimization). In another application the system may be placed on a site with just one well and operate in mode 1, and mode 2. In another application the system may be applied to a site and operate in junction with the 3-phase separator in mode 1, mode 2, and mode 3 or in mode 1 and mode 2 only. In another application the system may operate in tandem with another like system in any of the modes described herein. In another application the system may work with in tandem or assist other oil well production systems such as pump jacks, gas lift systems, downhole compression systems, vapor recovery systems, and combustion flares. It is assumed combustion flares will be on all sites due to state and federal regulations requiring combustion flares and back up equipment if vapor recovery systems suffer mechanical failures.

In one embodiment, a control or choke valve is disposed or operates after or downstream of the well head. In one embodiment, the distillation column operates between (inclusive) about ATM to −14 psi. In one embodiment, any or all oil pumps is any mode of transferring oil to storage tanks or receiving device or entity. In one embodiment, any or all water pumps may be any mode of transferring water to the storage tanks or the receiving device or entity. In one embodiment, a manifold for pneumatic gas is employed which allows the capture of gas vented from pneumatic vales onsite. In one embodiment, the Vapor Recovery Unit 78 controls pressure within the distillation column 50.

Although much of this disclosure references oil and condensate processing with respect to oil and gas production sites, the systems and method may be applied in other applications, to include any application where recovery of gas vapors is of interest. As will be appreciated, it would be possible to provide for some features of the inventions without providing others.

Design and Performance Data

Any oil and natural gas production site with the potential to emit more than 6 tons of volatile organic compounds (VOC's) per year must meet the 2012 EPA New Source Performance Standards. If an oil storage tank's potential emissions are 6 or more tons of VOCs per year, the owner/operator has to control VOC emissions by Apr. 15, 2015. Storage tanks with potential emissions of 6 or more tons per year must reduce total VOC's by 95%.

The above identified design values of the described invention ensure potential emissions are reduced below 6 tons per year or 95% VOC capture at a minimum and have an optimal range of 0-6 tons per year lost, or 95% to 99.9% total VOC capture as standardized by the EPA. Conventional vapor recovery technology in use on normal sites, as well as the Ward patent that has been referenced cannot meet the new EPA standards.

Using the Vasquez Beggs equation gives an optimal set point range for pressure in the distillation column of this design. The exact distillation column pressure varies with external factors including oil viscosity, oil temperature, altitude, and equipment selection, for example. For example, embodiment C (FIG. 4C) only slightly increases the vapor capture over embodiments A and B (i.e. FIGS. 4A and 4B, respectively). A benefit of embodiment C may include reduced design costs; e.g. heating the oil may allow for a smaller distillation column for example, and therefore a more affordable design. Furthermore, a temperature of 250° F. has been chosen for simulation and modeling to ensure the management of natural gas vapor temperature.

FIG. 8 provides details regarding volatile organic compound emission calculations as used to generate data contained in Tables 1-3. Table 1 of FIG. 10 provides reduction of volatile organic compounds (VOC) flash below 6 tons per year (TPY). Table 2 of FIG. 11 provides reduction of VOC flash by 95%. Table 3 of FIG. 13 provides capture gain over the cited prior art of Ward.

For Embodiment A

In Colorado, a typical oil production site producing an average of 1,000 bbl/day the operating range for pressure in the distillation column is modeled to be between about −6.1 psi to −10.4 psi with an optimal set point of approximately −9.1 psi to reduce potential VOC emissions to less than 6 tons per year, 2.8 tons per year at the optimal set point, and less than 1 ton per year at the maximum vacuum. Alternatively, operating range for pressure in the distillation column is modeled to be between ATM to −3.6 psi with an optimal set point of −1.8 psi to reduce potential VOC emissions to the minimum of 95% potential VOC emissions per year in the 1,000 bbl/day scenario.

For Embodiment B

The optimal distillation pressure is determined by the Vasquez Beggs equation by increasing the oil temperature by an available process waste heat source with only minimal gains in vapor capture.

For Embodiment C

In Colorado, a typical oil production site producing an average of 1,000 bbl/day the Embodiment C operating range for pressure in the distillation column is modeled to be between about −2.8 psig to −8.4 psig and at 250° F. with an optimal set point of −5.5 psi. These ranges reduce potential VOC emissions to less than 6 tons per year. Alternatively, the operating range for pressure in the distillation column is modeled to be ATM at 250° F. to reduce potential VOC emissions to well below the minimum of 95% potential VOC emissions per year.

For Embodiment D

The following example engineering analysis describes the horsepower requirements for the oil and gas processing unit (distillation unit), and the increase in oil accumulation due to reducing the vapor pressure above a column of oil in a well tube. The discussion in the result section is based on a 100 bbl/day site producing 1,000,000 cubic ft of gas.

Plunger Lift Operation

A natural gas well consists of a cement lined (casing) created by drilling into rock to the depth of rock containing oil, condensate, and natural gas. Within the casing is a pipe (tubing) running from the well head at the surface to the bottom of the well. Many of these wells produce oil and condensate via a plunger lift system which operates by dropping a plunger to the bottom of the natural gas well. As the plunger falls to the bottom of the well oil and condensate accumulates within the well tubing. Over time, gas pressure builds in the casing from gasses liberated within the geologic formation providing the pressure (force) to push the plunger and the oil and condensate to the surface where the gas goes to a sales line and oil and condensate goes to their respective storage tanks.

Ratio of Casing Pressure to Tubing Pressure

Gas pressure in the tubing is typically the same as the sales line pressure which may be 300 psi for example. To operate the plunger lift, the casing pressure must be greater than the tubing pressure of 300 psi to push the oil to the surface. This is called the ratio of casing pressure to tubing pressure. Every natural gas well has an optimal ratio of casing to tubing pressure that is tuned during the life of the well to maximize oil and condensate production. The time to reach the optimal ratio of casing to tubing pressure also varies according to well characteristics such as depth, oil quality, gas quantity, surface equipment operating pressures, and sales line pressure.

Increasing Plunger Lift Frequency

In embodiment D (FIG. 4D) the operating pressures of the surface equipment and well tubing pressure may be varied from sales line pressure (300 psi) to low pressure, atmospheric pressure (ATM) or to a vacuum (−14 psi). In this particular embodiment the tubing pressure may be reduced to ATM while the plunger is falling or after it has reached the bottom of the well tubing. This reduction of tubing pressure from 300 psi to ATM reduces the time to build the optimal ratio of casing to tubing pressure because the casing pressure does need to build up to 300 psi to equal with the tubing pressure. Instead, the casing pressure immediately increases above ATM tubing pressure and towards the optimal ratio of casing to tubing pressure. The result is the length of time the plunger sits at the bottom of the well is reduced. The less time the plunger sits at the bottom of the well tubing the more trips it can makes to the surface. Thus, the overall frequency of plunger lift in ascents per day increases and oil and condensate production increases. The increase of plunger lift frequency is dependent on characteristics such as: well depth, surface site equipment, oil production, gas production, well age, and operational tuning.

Increasing Oil Column Head

Figure 19:
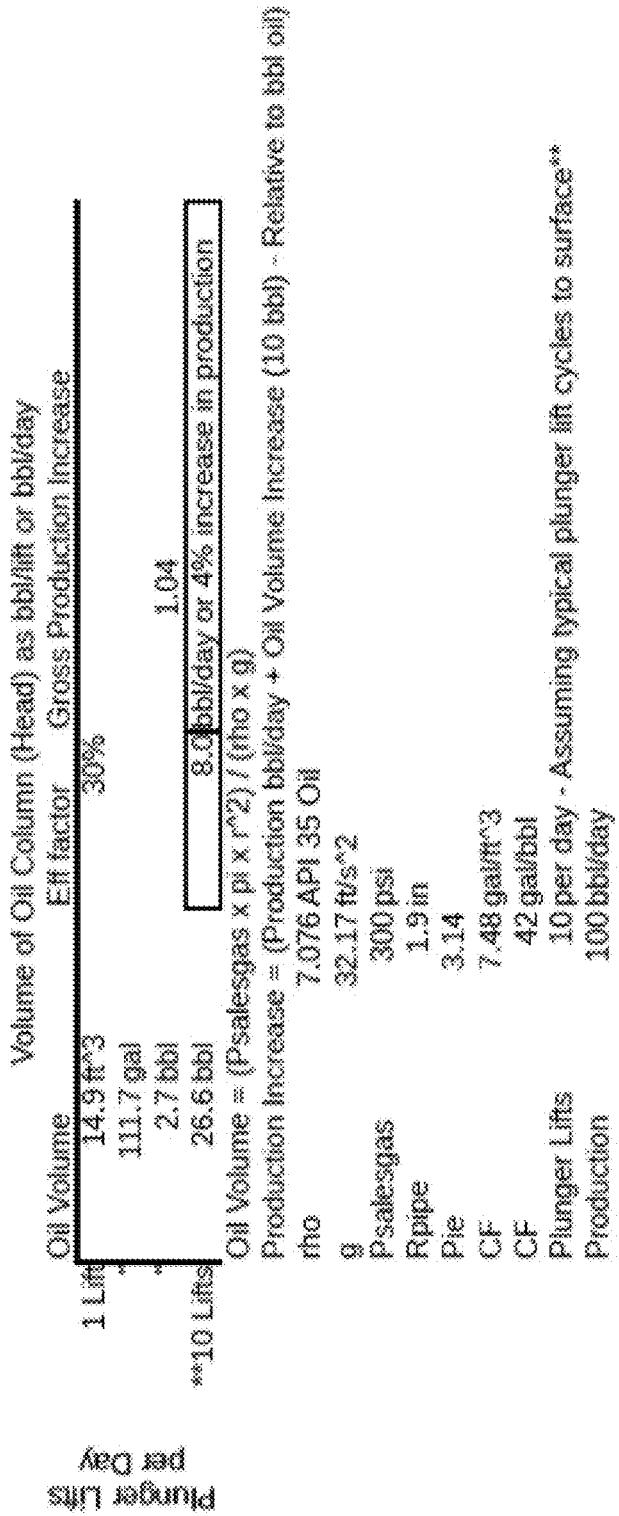
FIG. 19 includes Table 10 related to increasing oil column head after reduction of vapor pressure above the oil column.

The gas pressure above a column of oil and condensate in well tubing is typically at sales line pressure. Tubing gas pressure may be 300 psi for example. In particular embodiment D (FIG. 4D) the well tubing pressure may be reduced from 300 psi to low pressure, atmospheric pressure (ATM), or to a vacuum (−14 psi). Under low pressure conditions, the plunger may naturally begin to rise pushing oil to the surface because the pressure above the oil column was holding the system in equilibrium. However, if the pressure in the tubing is reduced in a controlled manor oil and condensate will gradually collect above the plunger and the weight of the oil and condensate (oil column head) will maintain the equilibrium of the system and the plunger will not travel to the surface. Over time, gas pressure in the casing will continue increase and the ratio of casing to tubing pressure will increase until the point that the plunger will travel to the surface. In this model, the plunger will carry an increased weight of oil proportional to the decrease in tubing pressure. Based on the engineering estimate in Table 10 (FIG. 19), a tubing pressure of 300 psi is approximately equivalent to 2.7 barrels (42 gallons) of oil in a well tube of 2 inches diameter. If a plunger lift system travels to the surface ten times per day then gross oil and condensate production may increase by approximately 27 barrels per day, Table 10. Due to inefficiencies in site equipment, oil production, gas production, well age, and plunger lift cycle frequency, a 30% efficiency factor has been applied to the increase of oil production by embodiment D (FIG. 4D). After applying the efficiency factor, the estimated gross increase in oil production yields approximately 8 barrels per day, Table 10.

Based on an engineering estimate in Table 9 (FIG. 18), embodiment D (FIG. 4D) may require fuel gas energy equivalent up to 4.3 barrels of oil per day. After subtracting the energy requirement to operate the compression and pumping systems the estimated net gain in production of oil and condensate is 4 barrels per day or a 4% increase in oil production over typical plunger lift operation. On a well site producing 100 barrels of oil per day the net increase of oil production annually is about 1,460 barrels of oil or approximately $97,820 of additional revenue per year using May 16, 2015 crude oil pricing.

Benefit of Aiding Well Unloading

An additional benefit of particular embodiment D (FIG. 4D) is in the aid of the operational practice of well unloading. Under certain conditions the ratio of casing to tubing pressure becomes unbalanced such that the well has become unproductive, this is known as a loaded well. To resolve the problem of a loaded well the well tubing is opened directly into the oil storage tanks by bypassing the surface equipment such as the separator, and all natural gas and oil and condensate in the well tubing is unloaded into the storage tanks where the natural gas is simply vented to the atmosphere or burned at the combustion flare. This practice reduces "unloads" the pressure in the well tubing to the low-pressure conditions of the storage tanks (ATM). After unloading the well tubing the plunger lift system is set back into normal operation where the plunger falls to the bottom of the well tubing and pressure builds in the casing to the optimal ratio of casing to tubing pressure. This procedure of unloading the well tubing releases excessive amounts of greenhouse gasses and carcinogens to the atmosphere and wastes an otherwise sales-quality gas stream. In particular, in embodiment D (FIG. 4D), the well tubing pressure is varied to optimize the ratio of casing to tubing pressure thereby eliminating the need to unload the well tubing to the storage tanks. In the event of an upset or unbalanced casing to tubing ratio the system of embodiment D (FIG. 4D) will reduce the tubing pressure to low pressure conditions to unload the well tubing, but in this case the system will capture all the natural gas from the well tubing and send it to the sales pipeline as well as process the oil to remove flash vapor prior to transferring the oil to the storage tanks. This benefit eliminates venting of sales quality natural gas (greenhouse gasses and carcinogens) to the atmosphere and increases safety at the well site.

Lease Automatic Custody Transfer System

Figure 20:
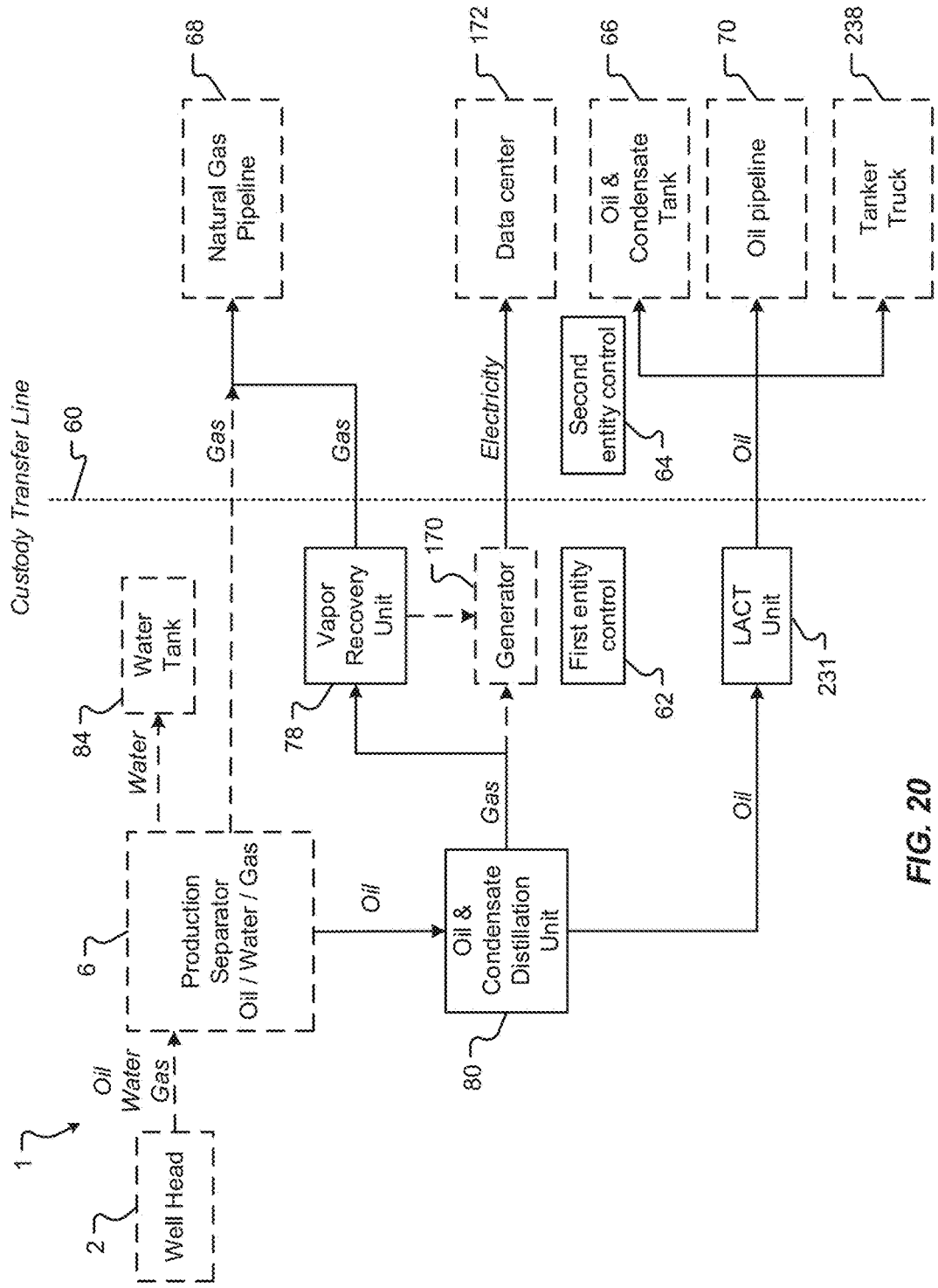
FIG. 20 depicts a flow diagram of an oil and condensate processing system of the present invention which includes a Lease Automatic Custody Transfer system.

Referring now to FIG. 20, in some embodiments, the oil and condensate processing system 1 includes a flow meter or LACT unit 231 to measure oil that flows out of the oil and condensate distillation unit 80. In this manner, the oil and condensate processing system 1 can perform as a Lease Automatic Custody Transfer (LACT) system in addition to processing oil and condensate. Oil can be transferred from the oil and condensate distillation unit 80 through the LACT unit 231 which records the volume of oil which subsequently is transferred to one or more of an oil storage tank 66, an oil pipeline 70, and a tanker truck 238. The LACT unit 231 enables custody of oil, gas, and water produced by the well 2 to be transferred (generally illustrated by line 60) from control by a first entity 62, such as the operator of the oil and condensate processing system 1, to control by a second entity 64, such as a pipeline operator or a purchaser.

In one embodiment, the LACT unit 231 generally includes a pump, a flow meter configured to monitor the flow of a fluid (such as oil or water) through the LACT unit, and a meter. One example of a flow meter suitable for use with the LACT unit 231 is a "coriolis meter" known to those of skill in the art. Coriolis meters may be obtained from Emerson Electric Co. of St. Louis Mo. and are described at http://www.emerson.com/en-us/automation/measurement-instrumentation/flow-measurement/coriolis-flow-meters which is incorporated herein by reference in its entirety.

The pump of the LACT unit 231 can be connected to conduit 108. LACT units 231 suitable for use with the oil and condensate processing system 1 of the present disclosure are known to those of skill in the art and are available from Power Service, Inc. of Casper, Wyo. and S&S Technical, Inc. of Alpharetta, Ga. Other LACT units are described in U.S. Pat. Nos. 3,031,105, 3,295,371, and U.S. Patent Pub. 2018/0059692, which are each incorporated herein by reference in their entirety.

In one embodiment, gas recovered by the oil and condensate distillation unit 80 can be used to power a generator 170. Additionally, or alternatively, the generator 170 can be powered with gas from the vapor recover unit 78.

Electricity from the generator 170 can optionally be provided to a data center 172. The data center 172 can include computer systems and associated components, such as telecommunications and storage systems, which operate using the electricity provided by the generator. The data center 172 can optionally be mobile. Additionally, the data center may transmit data to a network, such as the internet, by a wired or wireless communication link. In another embodiment, electricity from the generator 170 can be transferred to a utility line of a utility company. In this manner, the oil and condensate processing system 1 of the present invention may generate additional revenue for an operator by generating electricity that can be used to run a data center or which can be sold to a utility company.

Figure 21:
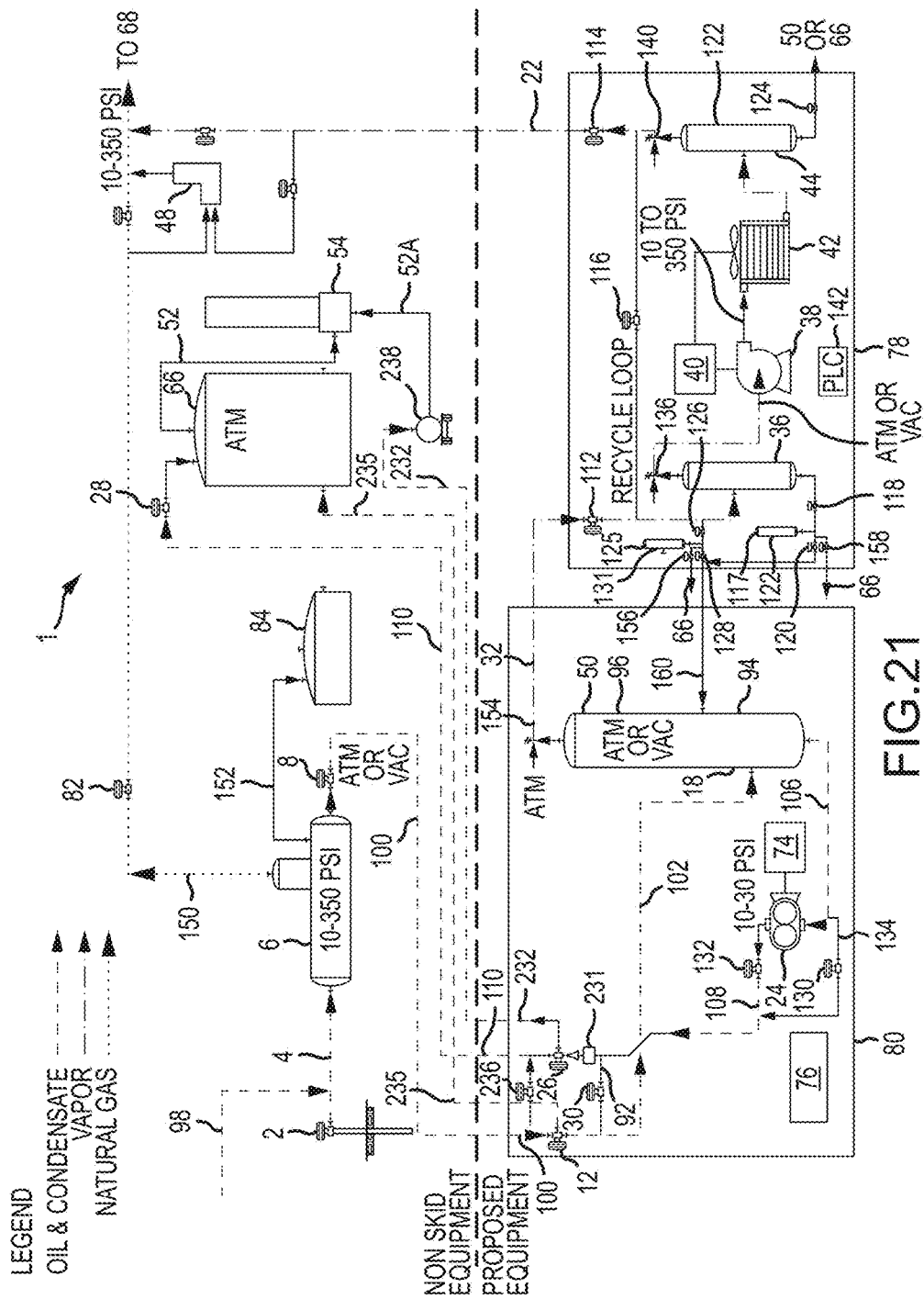
FIG. 21 is a more detailed flow diagram of an oil and condensate processing system including a Lease Automatic Custody Transfer system according to one embodiment of the present invention.
Figure 22:
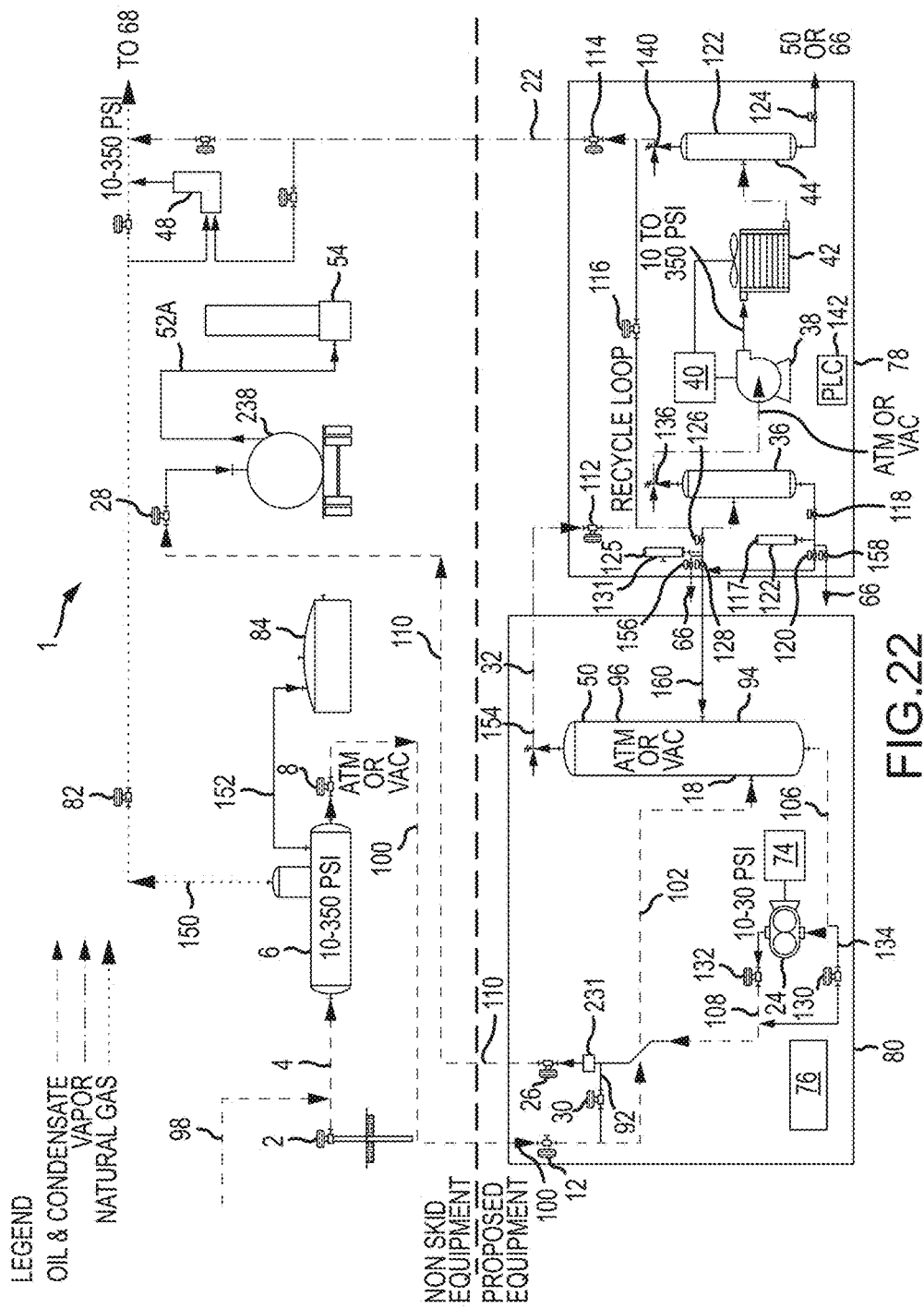
FIG. 22 is another detailed flow diagram depicting an oil and condensate processing system with a Lease Automatic Custody Transfer system according to another embodiment of the present invention.
Figure 23:
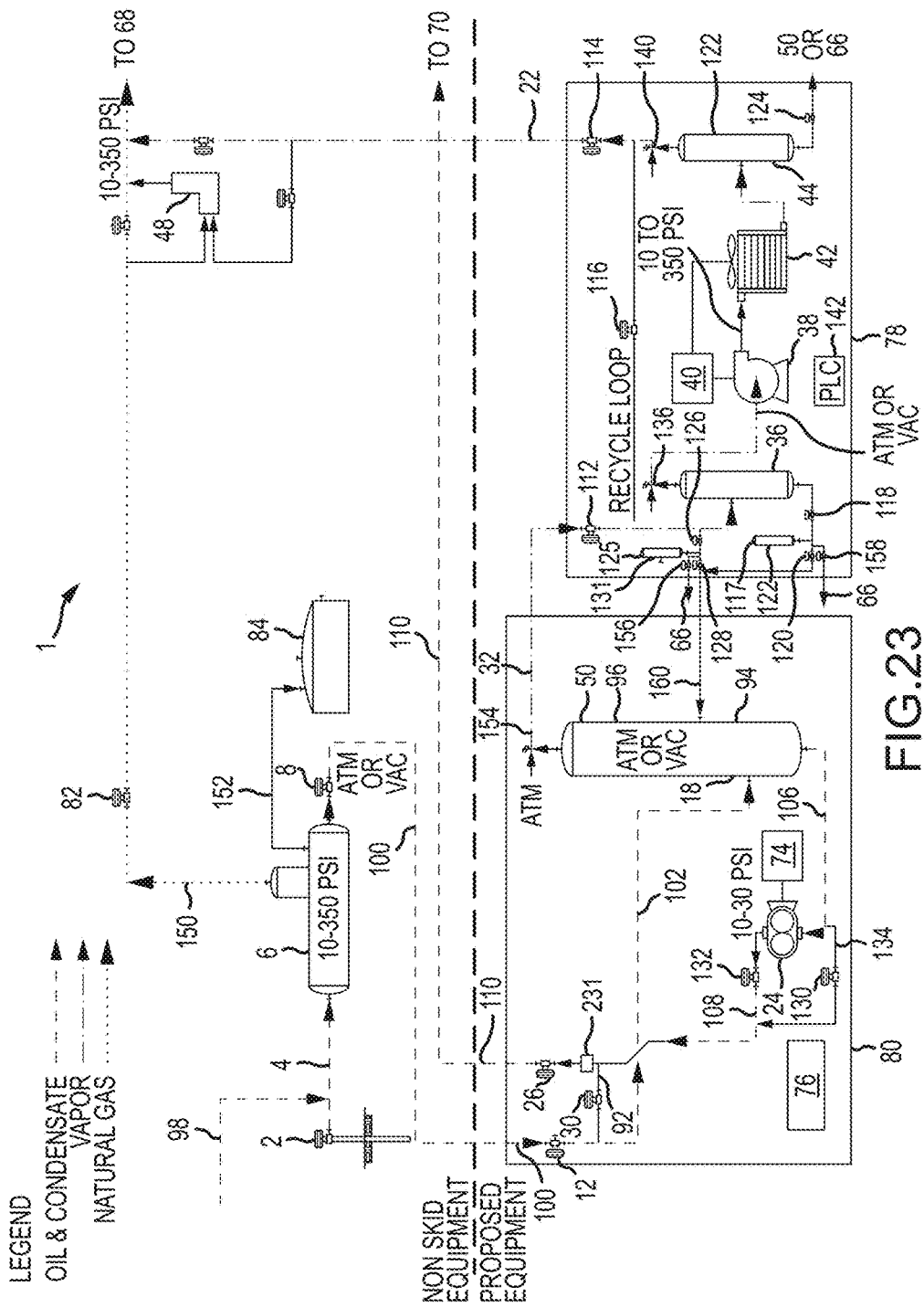
FIG. 23 depicts another embodiment of a flow diagram of an oil and condensate processing system with a Lease Automatic Custody Transfer system.

By operating the oil and condensate processing system 1 as a LACT system, the number of oil storage tanks 66 can be reduced or, in some embodiments, completely eliminated, at the production site. This reduces the size of the production site, real estate lease costs, and equipment costs. Additionally, the production site is safer because the amount of oil stored at the site is reduced. FIGS. 21-23 are detailed views of embodiments of LACT systems of the present invention.

Referring now to FIG. 21, embodiment E of the oil and condensate processing system 1 configured to perform as a LACT system is illustrated. In addition to processing oil and condensate, embodiment E of the oil and condensate process system can transfer oil from the oil and condensate distillation unit to either an oil and condensate storage tank 66 or to mobile tank, such as a tanker truck 238.

While in LACT mode, valve 236 opens such that oil can flow from the production separator 6 through valve 8 and conduit 100 through valve 236 and conduit 110 and into the oil and condensate storage tank 66. Oil and condensate may simultaneously be transferred from storage tank 66 via conduit 235 through valve 12 and into the distillation column 50 via conduit 102.

When in LACT mode, the distillation column 50 may be at approximately atmospheric (ATM) pressure or a vacuum. Once in the distillation column 50, oil and condensate is then drawn through conduit 106 by the oil pump 24 then pumped through valve 132 and conduit 108 to the LACT unit 231. LACT unit 231 measures the flow of the oil and condensate for custody transfer and is a type known in the art. The oil and condensate is then redirected by valve 26 to conduit 232 and transferred to the oil tanker 238 where it is delivered for final transportation off site. Optionally, conduit 52A may connect the oil tanker 238 to combustion flare 54. In one embodiment, conduit 52A is a flexible hose.

Alternatively, the oil and condensate processing system 1 can process oil and condensate with valve 236 closed while valve 12 and valve 26 are in flow through position. Oil and condensate flows through valve 12 into conduit 102 then through distillation column 50 where it processed at approximately atmospheric (ATM) pressure or a vacuum (such as approximately negative 14.0 psig) as described herein. Oil and condensate is then drawn through conduit 106 by the oil pump 24 then pumped through valve 132 and conduit 108 to the LACT unit 231. The oil and condensate then flows through valve 26 and conduit 110 to the oil storage tank 66.

There are many benefits provided by the oil and condensate processing system 1 operating as a LACT unit including the consolidation of a third party vendor (LACT system) into the oil and condensate processing system 1 of the present invention. The cost savings can be significant as a typical LACT system operable to process 2,000 bbl per day can cost $45,000. The oil and condensate distillation unit 80 of the present invention includes the majority of the equipment needed to transfer oil from storage tanks 66 to an oil tanker 238. The addition of a LACT unit 231 at a cost of approximately $7,000 to $10,000 provides a cost savings of approximately $35,000. Instead of purchasing two separate vendor packages (such as a vapor recovery unit 78 and a LACT unit) an operator can purchase one oil and condensate processing system 1 that can remove entrained vapor and custody transfer from the oil tanks 66 to a tanker truck 238 as described in Embodiment E (FIG. 21).

Additionally, the number or volume of storage tanks 66 may be reduced compared to the prior art system illustrated in FIG. 1. Accordingly, embodiment E of the present invention can reduce real estate and equipment expenses and increase safety at the production site.

Referring now to FIG. 22, embodiment F of the oil and condensate processing system 1 of the present invention is generally illustrated. In embodiment F, the oil and condensate processing system performs as a Lease Automatic Custody Transfer (LACT) system in addition to processing oil and condensate while transferring oil directly to an oil tanker 238.

Oil and condensate is transferred from the production separator 6 though valve 8 via conduit 100. The oil and condensate flow through valve 12 then to the distillation column 50 via conduit 102. The oil and condensate is processed in the distillation column at approximately atmospheric (ATM) pressure or a vacuum (such as approximately negative 14.0 psig) and then drawn through conduit 106 into pump 24. Pump 24 transfers the oil and condensate through valve 132 and conduit 108 to the LACT unit 231 where the flow rate is measured for custody transfer. After flow measurement, the oil and condensate flows through valve 26 and through conduit 110 to oil tanker 238. Any fugitive vapors from the oil tanker 238 are captured and transferred via conduit 52A to an optional combustion flare 54. Conduit 52A may optionally be a flexible hose.

Embodiment F of the oil and condensate processing system 1 provides many benefits. Specifically, less space is required at the production site because, in one embodiment, oil storage tanks (for example, tank 66 illustrated in FIG. 1) are not required for operation. Oil and condensate can be processed and transferred directly to an oil tanker 238 instead of an oil storage tank or series of oil storage tanks or a tank battery. Alternatively, fewer storage tanks may be provided at the production site, such as one or two storage tanks. Oil storage tanks have the largest footprint at production sites, so any reduction in the number of oil storage tanks can significantly reduce the size of a production site.

As one of skill in the art will appreciate, reducing the size of the production site reduces costs for the operator. For example, oil and gas production companies have to lease real estate for production site from land owners. Current lease rates range from $500 per acre/month to a record high of over $5,000 per acre/month set in 2017 in Colorado. When oil and gas production companies purchase or lease thousands of acres, even a small reduction in production site footprint can significantly reduce the cost of lease rates to land owners.

Another benefit of embodiment F is that by reducing the number of storage tanks 66 (or completely eliminating storage tanks) the amount of equipment needed at the production site (and associated costs) are decreased. A significant amount of equipment is associated with each oil storage tank, including liners required to be under the tanks and combustion burners needed to burn flash vapor escaping from the tanks. Reducing the amount of equipment also decreases maintenance and inspection expenses for the production site.

In addition to the lower operating costs, sites are safer because less crude oil is stored onsite at any one time. This reduces the risk of fires, explosions, oil spills, and fugitive emissions from tank hatches. Accordingly, embodiment F reduces the footprint of the site, captures flash vapor from the oil and condensate, measures the flow of oil and condensate for custody transfer, reduces equipment and real estate expenses for oil production companies, and provides a safer site compared to a production site with a large number of storage tanks.

Referring now to FIG. 23, embodiment G of the oil and condensate processing system 1 of the present invention is illustrated which is configured to perform as LACT system in which the oil and condensate distillation unit 80 transfers processed oil and condensate to an oil pipeline 70.

More specifically, in embodiment G, the oil and condensate processing system 1 performs as a LACT system in addition to processing oil and condensate while transferring oil directly to a crude oil pipeline 70. Oil and condensate is transferred from the production separator 6 though valve 8 via conduit 100. Thereafter the oil and condensate flow through valve 12 to the distillation column 50 via conduit 102. The oil and condensate is processed in the distillation column at approximately atmospheric (ATM) pressure or a vacuum (such as approximately negative 14.0 psig) and then drawn through conduit 106 into pump 24. Pump 24 transfers the oil and condensate through valve 132 and conduit 108 to LACT unit 231 where the flow rate is measured for custody transfer. After flow measurement, the oil and condensate flows through valve 26 and through conduit 110 to the crude oil pipeline 70.

Embodiment G (FIG. 23) of the oil and condensate processing system 1 shares the benefits of embodiment F (FIG. 22) associated with a reduced production site footprint because, in one embodiment, the oil storage tanks 66 (such as illustrated in FIG. 1) are not required for operation. Oil and condensate can be processed by the oil and condensate distillation unit 80 and, optionally, the vapor recovery unit 78, and transferred directly to a crude oil pipeline 70 instead of an oil storage tank or series of oil storage tanks (such as a tank battery). Embodiment G reduces the footprint of site while capturing flash vapor from the oil and condensate and measuring the flow of oil for custody transfer. Optionally, in one embodiment, the oil and condensate processing system 1 may include at least one oil storage tank to store at least some oil at the production site.

An additional benefit of transferring oil and condensate directly to an oil pipeline 70 is that truck traffic is reduced at the site. This means less tanker trucks on local roads and lower transportation costs for the operator. In addition to the lower operating and transportation costs, sites are safer because, in one embodiment, crude oil is not stored onsite. Alternatively, when the oil and condensate processing system 1 includes at least one oil storage tank 66, the amount of crude oil stored onsite is reduced compared to a prior art production site such as illustrated in FIG. 1. Reducing the volume of oil stored, or eliminating oil storage on site, reduces the risk of fires, explosions, oil spills, and fugitive emissions from tank hatches even lower than embodiment F described in conjunction with FIG. 22.

Processing of Produced Water

Figure 24:
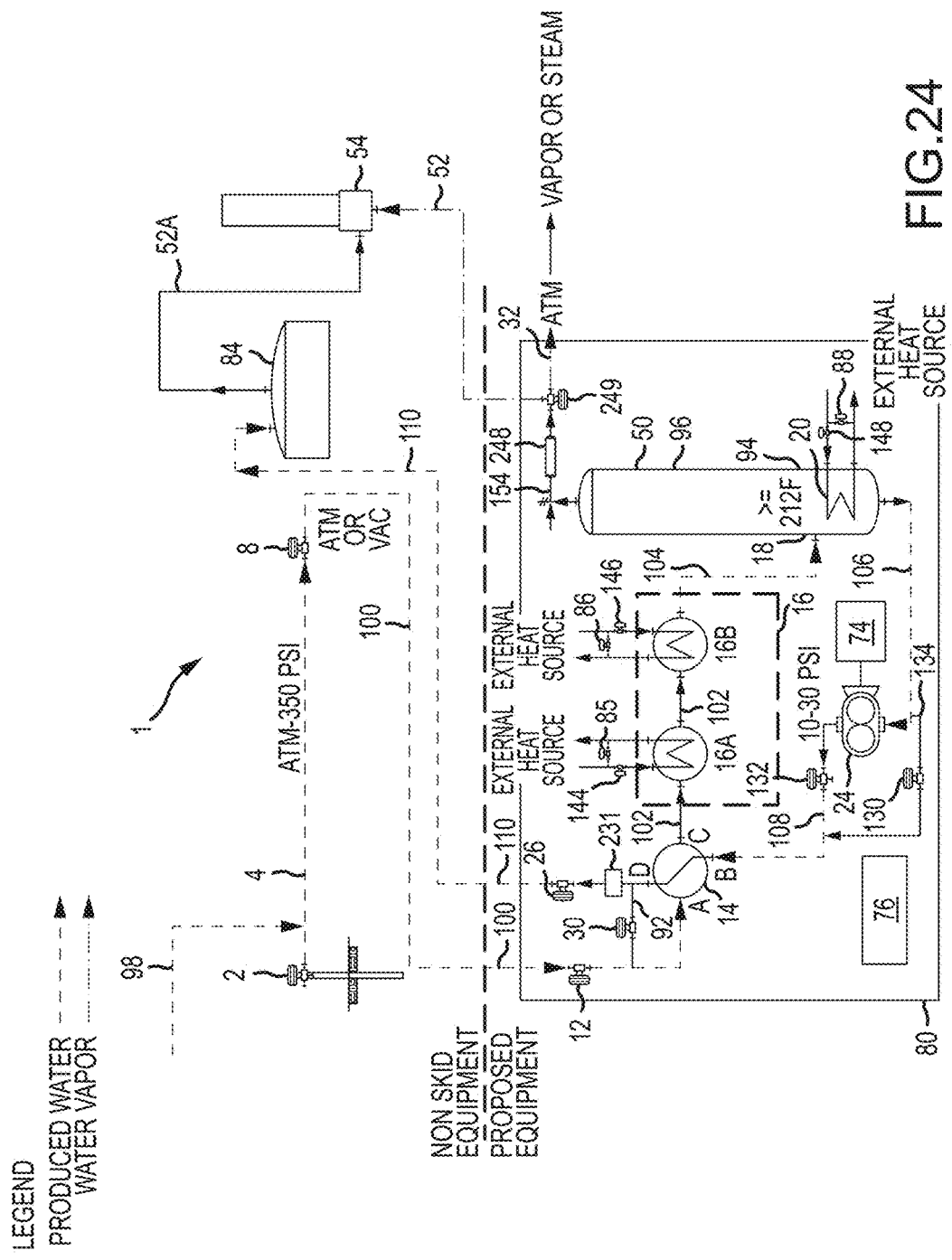
FIG. 24 is a flow diagram of an oil and condensate processing system of an embodiment of the present invention configured to process produced water from a well head.
Figure 25:
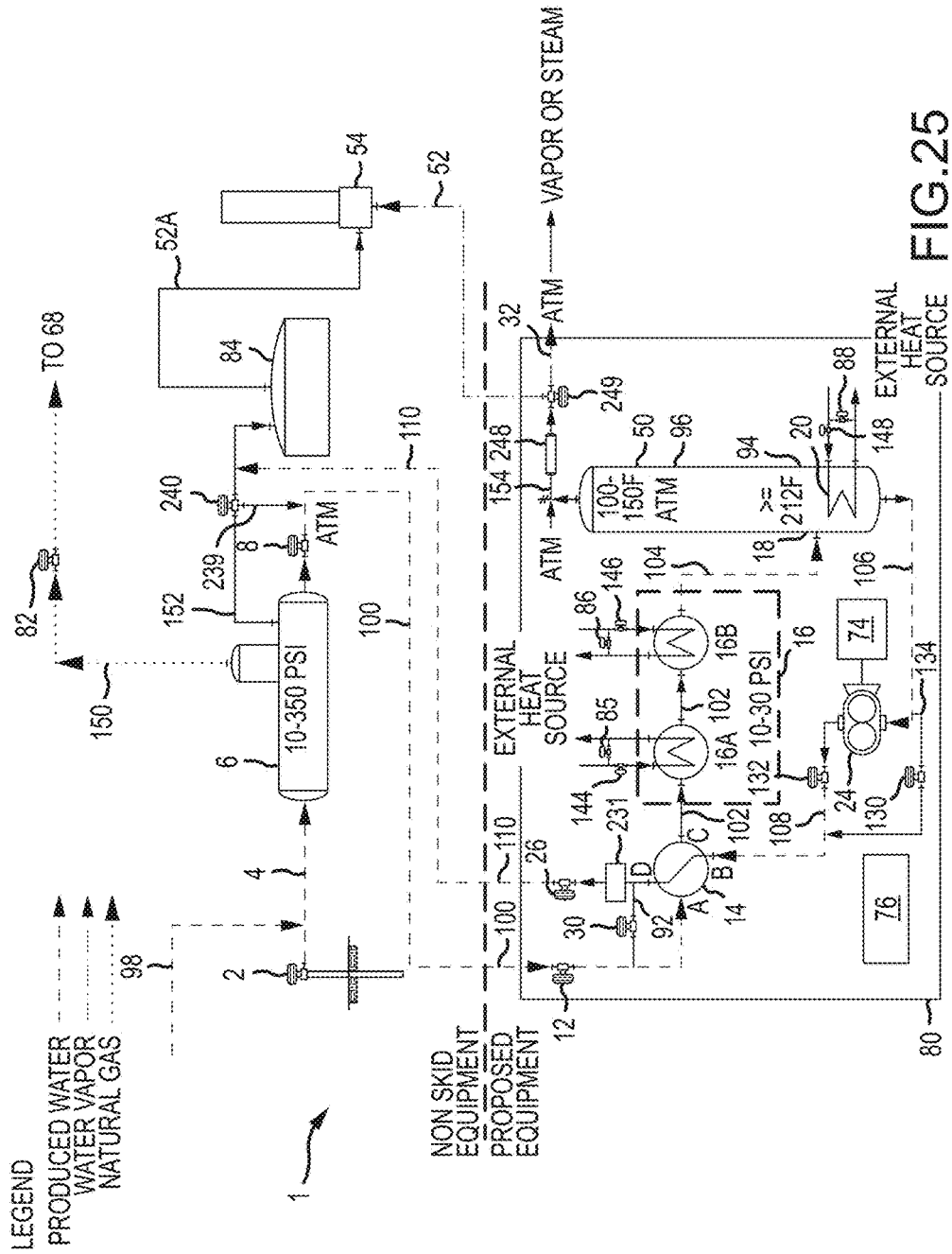
FIG. 25 illustrates another embodiment of an oil and condensate processing system configured to process produced water from a well head.
Figure 26:
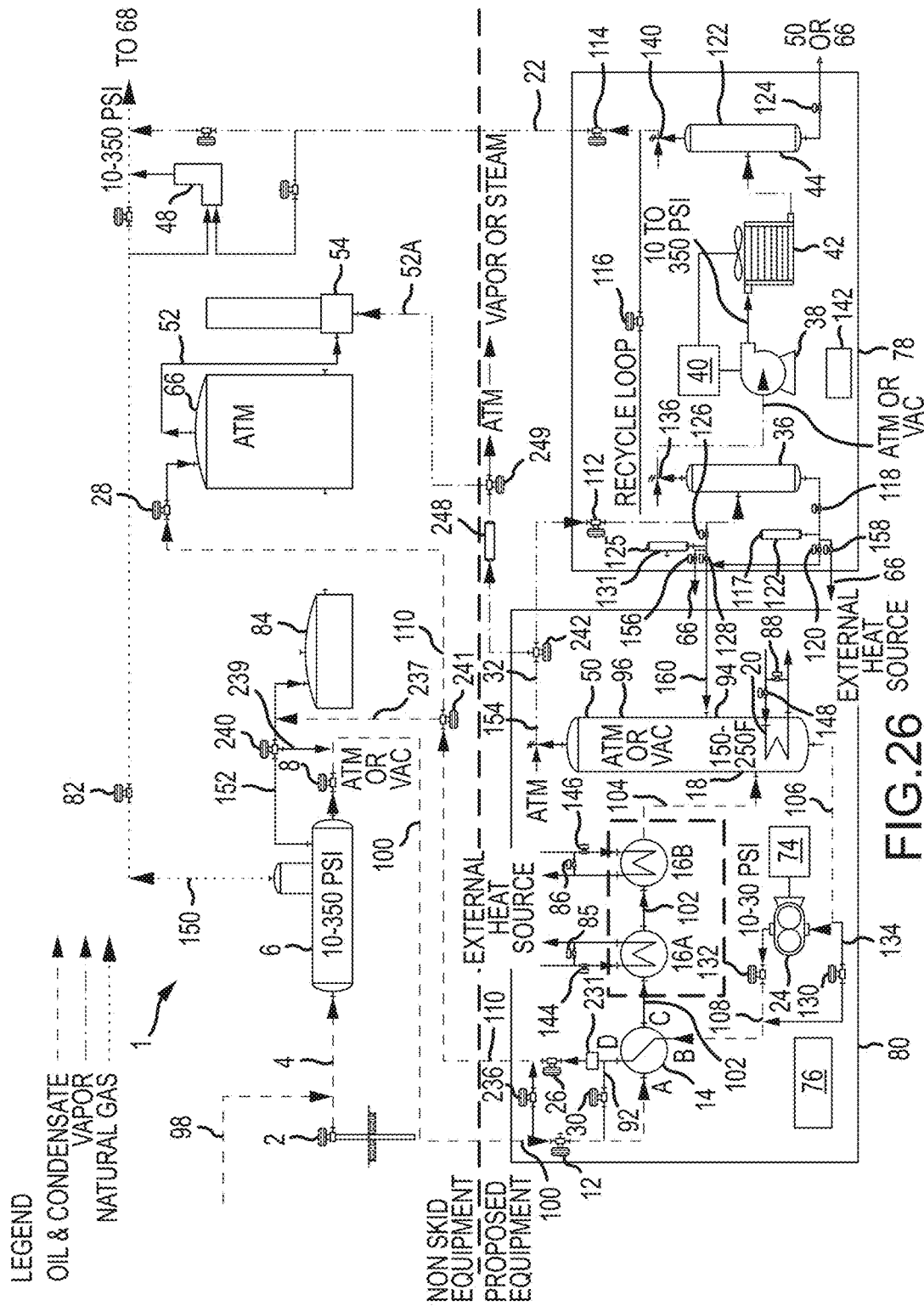
FIG. 26 is another flow diagram of an oil and condensate processing system configured to process produced water from a well head of one embodiment of the present invention.

Referring now to FIGS. 24-26, embodiments H, I, and J of the oil and condensate processing system 1 of the present invention are illustrated. Embodiments H, I, and J process flow back water from the well head 2 or from a flow back water storage tank.

Flow back water, also known as produced water, is a byproduct of fracking. When a well is fracked, large quantities of water are pumped into the well at high pressure to break up the rock formation. After fracking is complete, the water flows back up the well 2 and is captured in large storage tanks 84 (illustrated in FIG. 1). Generally, immediately following fracking, the well produces a large amount of water a produces little or no oil. This flow back (produced water) has a high salt content and cannot be discharged into local waterways. Other substances may also be included in the produced water.

Typically, produced water is collected by tanker trucks from above ground storage tanks 84. The tanker trucks transport the produced water to disposal sites, such as to be pumped into injection wells. The disposal sites may be a significant distance from the well. The cost of transportation and disposal (including injection) of produced water can be from $1.00 to $4.00 per barrel. Further, operators of disposal sites typically charge a fee for each barrel of produced water that will be disposed. Accordingly, reducing the volume of produced water would save production companies expenses related to transporting and disposing of produced water.

Embodiments H, I, and J of the oil and condensate processing system 1 can reduce the volume of produced water by utilizing waste flash gas or other sources of energy at the production site to evaporate the water in the distillation column 50. Although conduits 100, 102, 104, 106, 108 and 110 normally transport oil and condensate, when the oil and condensate processing system 1 of embodiments H, I, and J are treating produced water, the produced water is directed through conduits 100-110 to and from the distillation column 50. In some embodiments, waste flash gas and other heat sources at the production site provide enough energy to heat the produced water in the distillation column 50 such that the volume of produced water that requires disposal is decreased. In this manner, embodiments H, I, and J reduce costs associated with storing, transporting, and disposing of produced water.

Referring now to FIG. 24 (embodiment H), produced water is transferred from the production well 2 or from a flow back water storage tank via conduit 98 to conduit 4. The produced water is transferred though valve 8 via conduit 100 and through valve 12. The water then flows through heat exchangers 14, 16A, and 16B via conduit 102 and into the distillation column 50 via conduit 104.

In the distillation column 50, the produced water is heated by heat exchanger 20 until reaching its boiling point. In one embodiment, the distillation column 50 operates at approximately atmospheric pressure (ATM) while evaporating the produced water. Accordingly, the boiling point of the water is approximately 212° F. Alternatively, in another embodiment, the distillation column 50 can operate at less than ATM. In this manner, the produced water will boil at a lower temperature, reducing the amount of energy required to heat the water in the distillation column. In one embodiment, the distillation column 50 operates at a vacuum (or about −14 psig) as described in FIGS. 4A-4D when treating the produced water. In still another embodiment, the distillation column 50 may have a positive pressure.

Water vapor rises up through the distillation column 50 and, in one embodiment, is discharged through valve 154 and conduit 32 to the atmosphere. In another embodiment, the vapor from the distillation column 50 is transferred by valve 249 to conduit 52 and to a combustion burner 54 to burn any VOCs that are in the vapor stream. Additionally, or alternatively, in another embodiment the vapor is transferred to a vessel 248. The vessel 248 may have a medium to remove VOCs from the water vapor prior to discharge to the atmosphere. Optionally, the vessel 248 is an absorption column. The vapor can optionally be discharged to one or more of the atmosphere and a combustion flare 54 after passing through the vessel 248.

A minimal amount of produced water is maintained or collected in the bottom of the distillation column 50 as a concentrated brine. In one embodiment, the concentrated brine is pumped to the produced water storage tanks 84. Pump 24 transfers the concentrated brine via conduit 106 and through valve 132 and conduit 108 to LACT unit 231 where the volume of water is measured. After measurement of the water volume by LACT unit 231, the concentrated brine flows through valve 26 and through conduit 110 to produced water tank 84. Alternatively, in another embodiment, one or more of the water vapor and brine is transferred to a filtration medium to remove salts. The filtered brine can then be transferred to produced water tank 84. The vapor may then be vented to the atmosphere, sent to the combustion burner 54 through conduit 52A, transferred to a vessel with a VOC removing medium, or transferred to an absorption column.

Heat exchangers 14, 16A, 16B and 20 are the same as, or similar to, the heat exchangers described in conjunction with FIGS. 4B-4C. The heat exchangers can derive their heat from any source available onsite such as natural gas engine exhaust, electric heating elements, heated water, or catalytic reactors. Accordingly, in one embodiment, the heat exchangers 14, 16, and 20 can heat the produced water without additional energy expense by using waste heat available at the production site. The waste heat may be from a generator, a compressor, and air conditioner, a pump, a blower, and other appliances and equipment at the production site.

The heat exchangers are not limited to plate or tube exchangers and may be direct fired gas burners or electric immersion heaters. Suitable heat exchangers 14, 16, and 20 are available from a variety of sources known to those of skill in the art, including Kelvion Inc. Thermal Solutions of Catoosa, Okla. Heat exchangers that may be used with embodiments of the present invention are described in U.S. Pat. Nos. 2,872,165, 4,002,201, 7,743,821, and U.S. Pat. Pub. 2016/0273840 which are each incorporated herein by reference in their entirety. Temperature control is achieved via the PLC 76 and or any other electronic controller available or known in the art.

Optionally, the oil and condensate processing system 1 of FIG. 24 can process produced water intermittently. For example, if there is insufficient heat available to operate heat exchangers 14, 16, and 20 to heat all of the produced water, some of the produced water can be treated in the distillation column as described above. When necessary, the valve 30 can be opened to direct the produced water through conduit 92 through the LACT unit 231 and to the storage tank 84 without processing in the distillation column.

The benefits of embodiment H of the present invention include reducing the cost associated with disposal of produced water. Specifically, the collection and disposal of produced water is a significant cost because of the large volumes of water used for fracking. On average, each oil well fracking operation consumes about 4 million gallons of water. Sixty percent (about 2.5 million gallons or more than 59,000 barrels) of that water will flow back as produced water which must subsequently be stored, transported, and disposed. If the costs to dispose the produced water is $4.00 barrel, then it will cost over $200,000 to dispose of the produced water.

The oil and condensate processing system 1 can be installed on a well head 2 immediately following the completion of fracking but prior to flow back of produced water. This means that the payback on the capital cost of the oil and condensate processing system 1 can begin immediately and prior to oil production. If the production site produces enough flash gas and other sources of heat for the heat exchangers 14, 16, 20 to process the produced water with the oil and condensate processing system 1 and reduce the volume of produced water by 50%, then $100,000 is saved and the capital costs of the oil and condensate processing system can be recovered before oil production even begins. Further, fewer storage tanks are required for storing produced water saving equipment and real estate expenses.

Embodiment H (FIG. 24) of the oil and condensate processing system 1 can also be used to reduce the volume of municipal waste-water or storm water. For example, embodiment H could be installed by a municipality to reduce the volume of storm run-off or other waste-water. Accordingly, waste water could be directed through conduits 98 and 100 to one or more heat exchangers 14, 16. The waste water could then be transported by conduit 104 for treatment in the distillation column 50 as described herein. In the distillation column, the waste water is heated to its boiling point. Water vapor is released through valve 154 and may be directed through conduit 32 for release to the atmosphere.

Concentrated waste water remaining in the distillation column 50 is then directed through conduit 106 to pump 24. The pump directs the waste water through conduit 108 to conduit 110 for disposal. Optionally, conduit 110 could be connected to a sewage treatment system or a storm drain. Regardless, the oil and condensate processing system 1 of embodiment H could reduce the volume of waste water requiring disposal or further treatment.

FIG. 25 illustrates embodiment I of the oil and condensate processing system 1 of the present invention which is operable to process produced water after installation of a 3-phase separator 6. When a well is accustomed to produce more water than normal, the oil and condensate processing system 1 can switch from normal mode (processing oil and condensate) to a produced water processing mode.

Produced water is transferred from the production separator 6 via conduit 152 and redirected through valve 240 through conduit 239 to conduit 100 where it is transferred to the oil and condensate distillation unit 80. The produced water is transferred through valve 12 then through heat exchangers 14, 16A, and 16B via conduit 102 and into the distillation column 50 via conduit 104.

In the distillation column, the produced water is processed in a manner similar to that described for embodiment H. Specifically, the produced water is again heated by heat exchanger 20 in the distillation column until reaching its boiling point. Water vapor then rises up through the column. Optionally, the distillation column can operate at atmospheric (ATM) pressure. Alternatively, the distillation column 50 can operate at less than ATM, such as at a vacuum. In one embodiment, the distillation column 50 operates at from approximately 0 psig to −14 psig when processing produced water.

In one embodiment, the water vapor is discharged through valve 154 and conduit 32 to the atmosphere. In another embodiment, the vapor is transferred to a combustion burner 54 through valve 249 and conduit 32 to burn any VOCs that are in the vapor stream. In still another embodiment, the water vapor from the distillation column 50 is transferred to a vessel 248 with a medium to remove VOCs from the water vapor prior to discharge to the atmosphere. Additionally, or alternatively, in one embodiment the vessel 248 is an absorption column to remove VOCs. After passing through the absorption column 248, the water vapor can be discharged to the atmosphere, sent to a combustion burner 54, or sent to a vessel including a VOC absorbing medium. Additionally, or alternatively, the water vapor can be transferred by conduit 32 into the vapor recovery unit 78, such as generally illustrated in FIG. 23.

Some of the produced water collects in the bottom of the distillation column 50 as a concentrated brine. In one embodiment, the concentrated brine is pumped to the produced water storage tanks 84. More specifically, pump 24 transfers the concentrated brine via conduit 106 and through valve 132 and conduit 108 to LACT unit 231 where the flow rate is measured to determine the volume of water transported past the LACT unit. After flow measurement, the concentrated brine flows through valve 26 and through conduit 110 to produced water tank 84. In another embodiment, one or more of the water vapor and the brine is transferred from the distillation column to a filtration medium to remove salts. The filtered water can then be sent to the produced water storage tanks 84. The water vapor can be discharged to the atmosphere, sent to a combustion burner 54, or sent to a vessel including a VOC absorbing medium.

Normally, embodiment I of the oil and condensate processing system 1 operates in accordance with embodiments A-D (FIGS. 4A-4D). However, the PLC 76 or an operator may switch the oil and condensate processing system 1 to process produced water in accordance with embodiment I. After the produced water has been processed, the oil and condensate processing system 1 can return to normal operation as illustrated and described in conjunction with FIGS. 4A-4D. The PLC 76 may determine when the water has been processed by the status of a level float or other instrument designed to float or sense the density of water but not oil. The level float may be a level instrument 94 associated with the distillation column 50. After processing water, the conduits and distillation column 50 can be flushed with water or oil before oil is processed.

The oil and condensate processing system 1 can be installed on a well immediately following the completion of fracking and process produced water after the three-phase separator 6 has been installed onsite and prior to the installation of a vapor recovery unit 78 of the present invention has been installed. Processing produced water in accordance with embodiment I (FIG. 25) provides many of the same benefits and cost savings as embodiment H described in conjunction with FIG. 24. More specifically, by processing produced water in accordance with embodiment I, the volume of processed water at the production site can be reduced. The volume of water tanks 84 at the production site can be reduced saving equipment costs and reducing the size of the production site.

Referring now to FIG. 26, Embodiment J of the oil and condensate processing system 1 of the present invention is generally illustrated which is operable to reduce the volume of produced water. The oil and condensate processing system 1 includes a three-phase separator 6 and a vapor recovery unit 78 and can process oil, condensate, and water after the vapor recovery unit 78 is installed.

The oil and condensate processing system can switch from normal mode (processing oil and condensate, such as illustrated in FIGS. 4A-4D) to processing produced water similar to embodiments H, I (FIGS. 24, 25). More specifically, produced water can be transferred from the production separator 6 via conduit 152 and redirected through valve 240 through conduit 239 to conduit 100. From conduit 100 the produced water is transferred to the oil and condensate distillation unit 80.

The produced water is transferred through valve 12 then through heat exchangers 14, 16A, and 16B via conduit 102 and into the distillation column 50 via conduit 104. The produced water is heated by heat exchanger 20 in the distillation column until reaching its boiling point. As previously described, in one embodiment, heat exchangers 14, 16, and 20 can operate with waste energy (or heat) available at the production site. The distillation column 50 may operate at atmospheric (ATM) pressure such that the boiling point of the water is approximately 212° F. Alternatively, the distillation column 50 can treat the produced water at less than ATM. In one embodiment, the distillation column 50 operates at a vacuum or between approximately 0 psig to −14 psig when processing produced water. Accordingly, the produced water may boil at less than 212° F. which reduces the amount of energy required to heat the produced water.

Water vapor rises up through the distillation column 50 and is discharged through valve 154 and conduit 32. In one embodiment, the water vapor is redirected through valve 242 to the atmosphere. Alternatively, the water vapor is treated further. For example, in one embodiment, vapor from the distillation column 50 is transferred to a combustion burner 54 via conduit 52A. In this manner, VOCs that are in the vapor stream are burned. Additionally, or alternatively, the vapor can be transferred to a vessel 248 with a medium to remove VOCs from the water vapor. The vapor may then be discharged to the atmosphere or receive more treatment. In another embodiment, the vessel 248 is an absorption column operable to remove VOCs prior to discharge to the atmosphere or to a combustion burner.

As described in conjunction with embodiments H, I, a minimal amount of produced water collects in the bottom of the distillation column 50 as a concentrated brine. In one embodiment, the concentrated brine is pumped to the produced water storage tanks 84. More specifically, pump 24 transfers the concentrated brine via conduit 106 and through valve 132 and conduit 108 to LACT unit 231 where the flow rate or volume of water is measured. After flow measurement the concentrated brine flows through valve 26 and through conduit 110 to valve 241 which directs the water to the produced water tank 84.

Alternatively, in another embodiment, one or more of the water vapor and the concentrated brine are transferred from the distillation column 50 to a filtration medium to remove salts. The water vapor may then be vented to the atmosphere, transferred to an absorption column, or sent to a combustion burner. The concentrated brine may be pumped to the water storage tank 84.

After the produced water has been processed, the oil and condensate processing system 1 can return from processing produced water according to embodiment J to normal operation processing oil and condensate, such as described in conjunction with FIGS. 4A-4D. After processing water, the conduits and distillation column 50 can be flushed before oil is processed. Specifically, the conduits and distillation column 50 may be flushed with one or more of (but not limited to) water and oil. The PLC 76 may determine when the water has been processed by the status of a level float or other instrument designed to float or sense the density of water but not oil. The level float may be a level instrument 94 associated with the distillation column 50. Alternatively, an operator can determine when the oil and condensate processing system 1 should be switched into, and out of, operation in the produced water processing mode accordance with Embodiment J.

Processing water with embodiment J (FIG. 26) of the oil and condensate processing system 1 provides the same or similar benefits as embodiments H and I. Specifically, the oil and condensate processing system 1 can be installed on a well immediately following the completion of fracking and process produced water after the three-phase separator 6 has been installed onsite. In embodiment J, the oil and condensate processing system 1 can also operate in the produced water processing mode after the installation of a vapor recovery unit 78. Embodiment J shares the same cost savings as embodiment H and can begin to operate before vapor recovery unit 78 has been installed onsite and continues to lower the cost of disposal of produced water. Additionally, similar to embodiments H and I, the volume of produced water can be reduced by up to approximately 55%, reducing equipment expenses and the space required for the production facility.

Reflux and Feed Recycle

Figure 27:
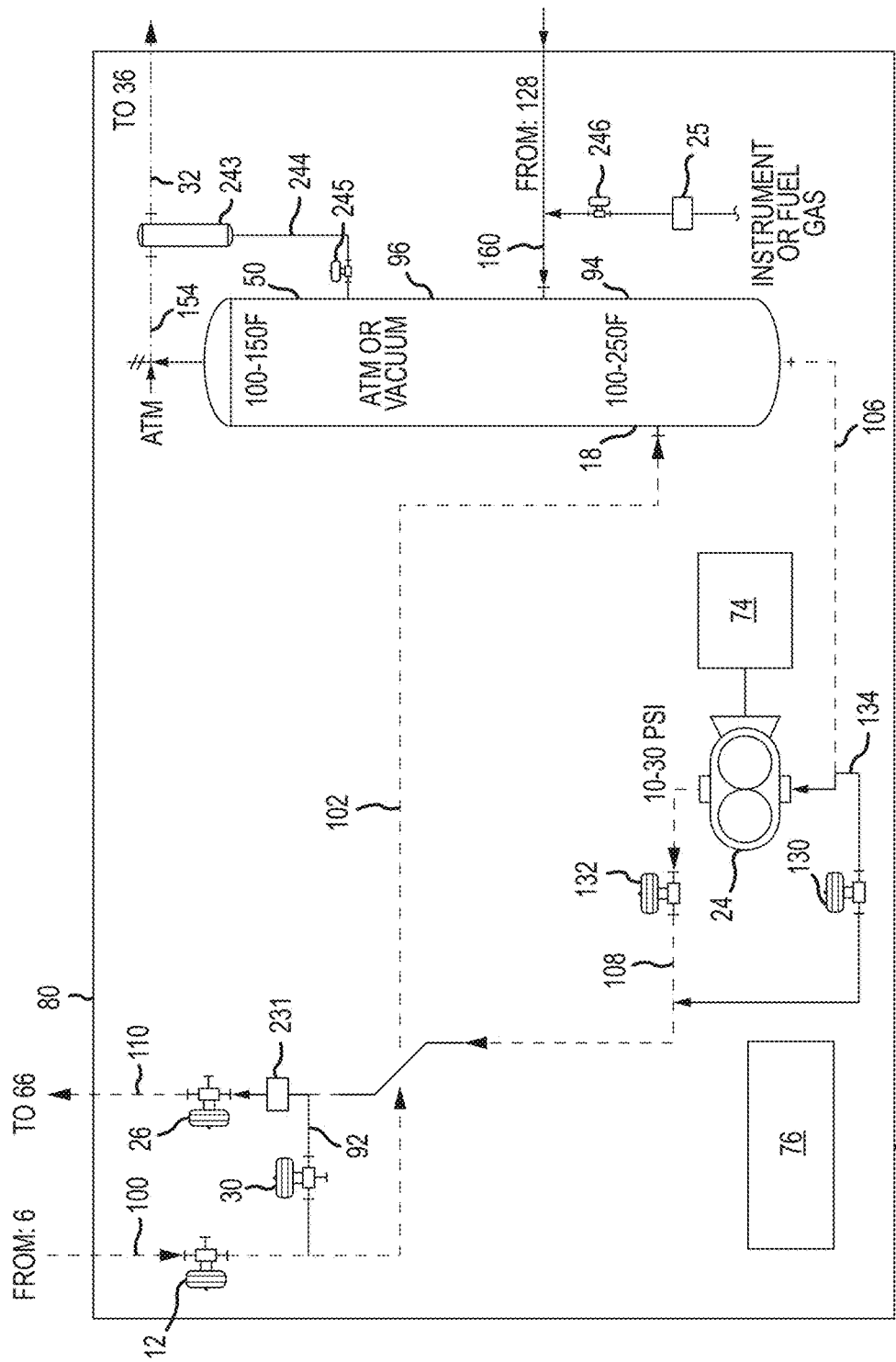
FIG. 27 is a flow diagram of another embodiment of an oil and condensate processing system of the present invention.

Referring now to FIG. 27, embodiment K of the oil and condensate processing system 1 is illustrated. More specifically, embodiment K of the oil and condensate processing system is configured to alter or adjust the proportion of reflux (returned condensed vapor) and feed recycle (returned feed liquid) within the distillation column 50 to improve the efficiency of the distillation column 50.

In embodiment K, oil and condensate are processed in the distillation column 50. Vapor exits the top of distillation column 50 though valve 154 and conduit 32 and then enters a reflux drum 243. Liquids that condense in the reflux drum 243 re-enter the distillation column 50 via conduit 244 and valve 245. In particular embodiments, the reflux drum 243 may have a demister pad or other structures within the reflux drum to promote liquid condensation and prevent liquids from flowing to the suction inlet of the vapor recovery unit 78 via conduit 32.

A measurement device, such as a level float or other level monitoring instrument known to those of skill in the art, may be used to monitor the level of liquid in reflux drum 243. The measurement device can send information on the level of liquid in the reflux drum 243 to the PLC 76. The PLC 76 then determines the rate to re-introduce reflux from the reflux drum 243 into the distillation column 50.

A liquid or vapor stream may also be injected at the bottom of the distillation column 50 to help aid in mass transfer of flash vapor from the oil and condensate. The liquid may include oil and condensate. The feed liquid can include natural gas from the production site pneumatic instrument lines, fuel gas, and or compressed vapor from the vapor recovery unit 78. The feed liquid can be injected through valve 246 and into the distillation column 50 via the conduit 160 or a dedicated injection port on the distillation column 50. The PLC 76 can control valve 246 and valve 128

(illustrated in FIGS. 3A-2, 3B-2) to control the rate of vapor injection into the distillation column.

Recirculation of the feed liquid (oil and condensate) may be introduced from the production separator 6 into the distillation column 50 via conduit 102 and the recirculation loop described in previous embodiments A-D (FIGS. 4A-4D). Specifically, in one embodiment, after processing by the distillation column 50, the oil and condensate move through conduit 106 to pump 24. Optionally, the oil and condensate then pass through conduit 108 and valve 26 to conduit 110 which transports the oil and condensate to oil storage tank 66. Optionally, conduit 108 may include a LACT unit 231 operable to measure the volume of oil and condensate passing through conduit 108.

In a particular embodiment, a recycle pump 25 is operable to recycle feed liquid through the distillation column 50. In another embodiment, the feed liquid may be heated by a heat exchanger or other means to maintain or increase the feed liquid temperature. In another embodiment a blow case may be used to collect and recycle feed liquid into the distillation column.

Reflux and feed liquid recycling in accordance with embodiment K increases the efficiency of the oil and condensate distillation unit 80. The distillation column 50 may operate in a standby mode with both reflux and feed recirculation in progress. When a slug of new oil and condensate enters the distillation column 50, the distillation process can proceed without a major upset (i.e. slug loading). The internal structures of the distillation column 50 will be wetted because of the reflux and feed recycle which helps the incoming oil and condensate adhere and flow along surface areas that are designed to maximize the liquid to gas surface area. Recycling of feed liquid also allows the oil pump 24 to run continuously which reduces the long term maintenance costs of the pump 24 and its engine or electric motor (driver 74).

As will be appreciated by one of skill in the art, Embodiments E-K (FIGS. 21-27 respectively) of the oil and condensate processing system 1 can be adapted to operate with Embodiment D (FIG. 4D) with minimal additional equipment. For example, conduits, valves, instrumentation, and changes to the instructions or logic of the PLC 76 may be required.

Data Center

Figure 28:
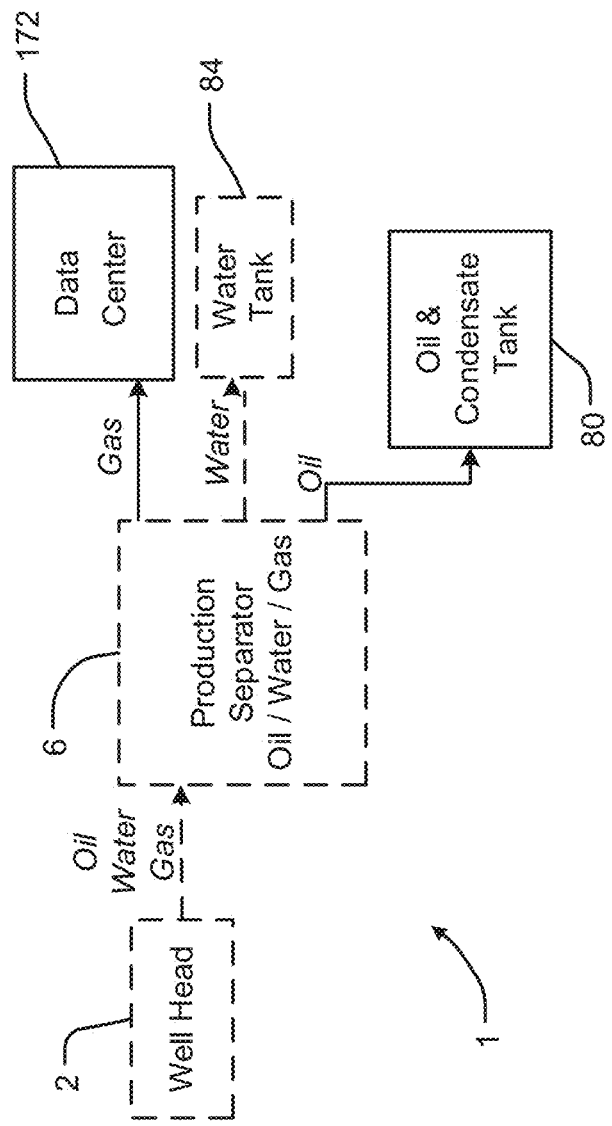
FIG. 28 is a schematic view of an embodiment of the present invention in which gas from a production separator is used to provide power to a data center.
Figure 30:
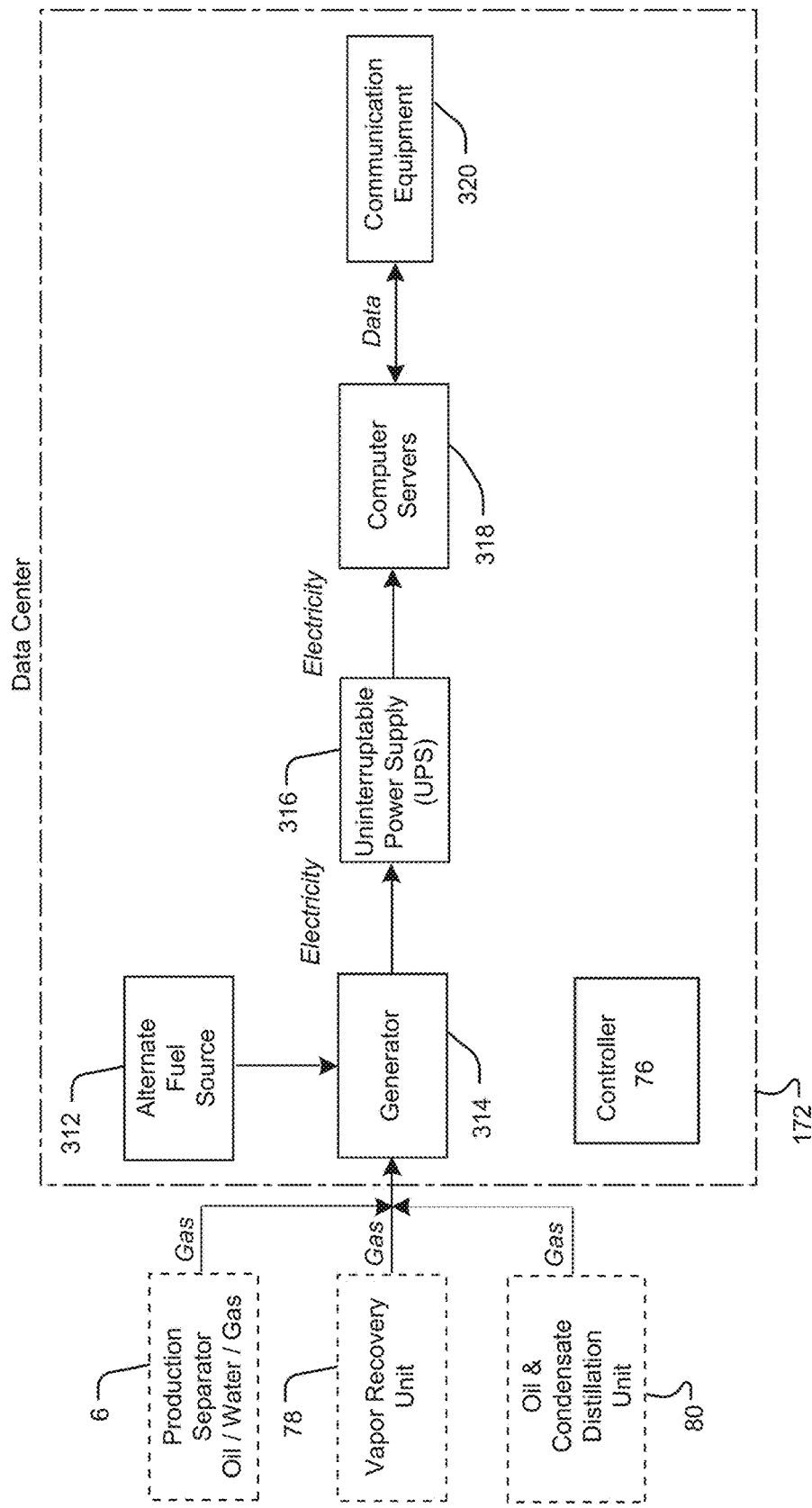
FIG. 30 illustrates an embodiment of a data center configured to receive power from the oil and condensate processing system or an alternative hydrocarbon fuel source.

Referring now to FIG. 28, in one embodiment of the present invention, a data center 172 can be positioned downstream from a production separator 6. Specifically, gas from the production separator 6 can be used to provide power to the data center 172. Optionally, a generator (such as generally illustrated in FIG. 20) positioned upstream from the data center 172 can convert the natural gas to electricity. In another embodiment, the data center 172 includes a generator to convert the natural gas to electricity (as generally illustrated in FIG. 30). Optionally, all embodiments of data centers 172 of the present invention may be portable or mobile. In this manner, a data center 172 may be relocated from a first production facility to be proximate to a second production facility. In one embodiment, the data center 172 is located within a shipping container or a wheeled trailer which is transportable by a tractor.

In one embodiment, the data center includes cooling systems, such as blowers and air conditions. Optionally, heat is removed from the data center 172 by a heat exchanger. Additionally, or alternatively, heat energy removed from the data center may be used in one or more of the heat exchangers 14, 16, 20 for use in conjunction with the all embodiments of the oil and condensate distillation units 80 of the present invention.

To provide additional background, context, and to further satisfy the written description requirements of 35 U.S.C. § 112, the following references which are generally related to data centers are incorporated herein by reference in their entireties: U.S. Pat. Nos. 7,020,586; 7,525,207; 7,551,971; 7,560,831; 7,724,513; 7,725,559; 7,742,830; 7,961,463; 7,990,710; 7,992,014; 8,001,403; 8,047,904; 8,160,063; 8,213,336; 8,285,681; 8,805,951; 9,565,783; U.S. Pat. App. Pub. 2003/0193777; U.S. Pat. App. Pub. 2006/0082263; U.S. Pat. App. Pub. 2009/0295167; U.S. Pat. App. Pub. 2010/0211810; U.S. Pat. App. Pub. 2010/0325199; U.S. Pat. App. Pub. 2012/0179874; U.S. Pat. App. Pub. 2012/0221789; U.S. Pat. App. Pub. 2013/0311597; and U.S. Pat. App. Pub. 2014/012286.

Figure 29:
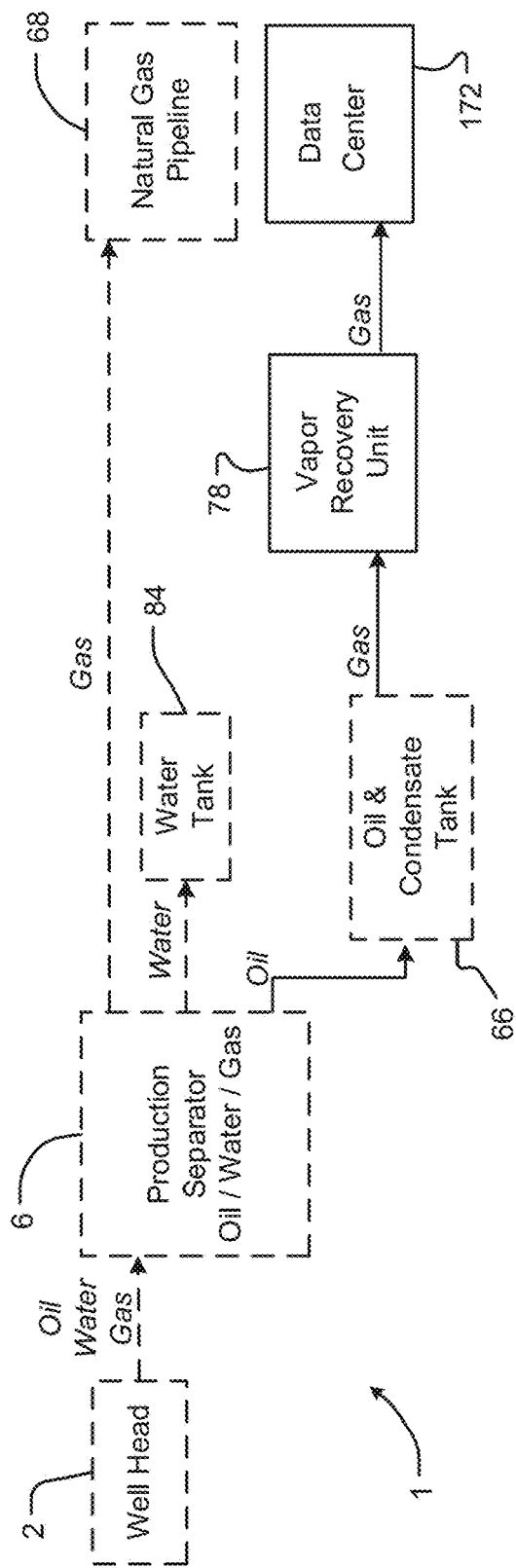
FIG. 29 is a flow diagram of an embodiment of an oil and condensate processing system with a vapor recovery unit configured to provide power to a data center.

FIG. 29 illustrates an embodiment in which the data center 172 receives power from natural gas received from a vapor recovery unit 78 of the present invention. Similar to the embodiment illustrated in FIG. 28, a generator 170 positioned upstream from the data center, or co-located with the data center, can convert the natural gas from the vapor recovery unity into electricity to power the data center 172.

Additionally, or alternatively, the data centers 172 illustrated in FIGS. 20, 28, and 29 can receive electricity generated from gas received from one or more of onshore or offshore oil and gas drilling rigs, fracking operations, coal bed methane facilities, anaerobic digesters, natural gas produced from landfills and waste water facilities. Regardless of the source, the gas can be converted into electricity by a generator 314 to provide power to the data center. In one embodiment, the data center may also electricity from another source. For example, the data center may receive electricity from one or more of an electric utility line, a photovoltaic system, a wind power generator, a hydro-power source, and a fuel cell that converts hydrocarbon gas from industrial sources into electricity.

FIG. 30 illustrates an embodiment in which the data center 172 receives power from natural gas received from a plurality of gas sources. The gas sources may include, but are not limited to, one or more of a production separator 6, a vapor recovery unity 78, and an oil and condensate distillation unit 80. Optionally, although not illustrated in FIG. 30 for clarity, natural gas vented from an oil storage tank 66 may be routed through conduit 52 to a generator instead of the combustion flare 54 illustrated in FIG. 21. Similar to the embodiment illustrated in FIG. 28, a generator 314 positioned upstream from the data center 172, or co-located with the data center, can convert the natural gas from the gas source into electricity to power the data center 172.

An alternate fuel source 312 such as liquid propane gas or diesel fuel can provide the generator 314 with fuel if fuel is not available from other sources, for example, due to planned or unplanned downtime or maintenance. The alternate fuel source 312 may include a programmable logic controller and all instrumentation and control valves required to provide an alternative fuel connection to the generator 314.

Additionally, or alternatively, the data center 172 may optionally include a controller 76. In one embodiment, the controller 76 can determine which source of gas provides fuel to the generator 314. For example, the controller may be interconnected to one or more valves. The controller 76 can then send signals to the valves such that gas is provided by one of the production separator 6, the VRU 78, the oil and condensate distillation unit 80, and the alternate fuel source 312. In one embodiment, the controller 76 may compare costs of the natural gas from the fuel sources when determine which fuel source will provide gas to the generator 314. Additionally, or alternatively, the controller 76 can consider other factors, such as the quality or type of gas provided by one of the fuel sources or the availability of the gas.

The generator 314 produces electricity in the most efficient voltage (208 vac, 240 vac, 277 vac, 480 vac) and current required by the uninterruptable power supply 316. The data center may include a gas flow meter associated with the generator 314 to measure the quantity of fuel gas received to produce electricity. Typical natural gas or liquid petroleum (LP) generators provided by Generac of Waukesha, Wis., or Caterpillar Inc. of Peoria, Ill. are suitable for this application. In one embodiment, the generator 314 is a type known in the art that may use natural gas, liquid propane, and high BTU hydrocarbon gas. Alternatively, the generator may be a proprietary or custom generator to reduce overall costs of the data center 172.

The uninterruptable power supply 316 provides an uninterrupted (conditioned) supply of power to the computer servers 318 during automatic transfer from one of the sources of fuel such as switching from the vapor recovery unit 78 to the alternate fuel source 312. In one embodiment, the uninterruptable power supply (UPS) is of a type known in the art with battery backup sufficient to provide electrical power for short durations of power loss or fluctuations. A typical UPS may be sourced from Eaton Corporation of Dublin, Ireland, or General Electric (GE) of Schenectady, N.Y. The UPS may also be a proprietary or custom generator to reduce overall costs of the data center 172.

The data center 172 may include any number of computer servers 318. The computer servers 318 may be configured for specific general and or specific applications such as file back up servers, data base back up storage, Internet of Things (IoT) database storage. The computer servers 318 may run any computer server operating system known in the art such as Linux, Unix, or Microsoft Server, (including merely by way of example Microsoft Corp.'s Windows® and/or Apple Corp.'s Macintosh® operating systems) and/or workstation computers running any of a variety of commercially-available UNIX® or UNIX-like operating systems including virtual operating systems such as Microsoft Hyper-V, VM WARE ESXi, and containers running via a Docker. Typical servers provided by Dell of Round Rock, Tex. or Hewlett Packard (HP) of Palo Alto, Calif. are suitable for this application. The servers 318 may have any of a variety of applications, including for example, database client and/or server applications, and web browser applications.

The computer server(s) 318 may be one or more general purpose computers capable of executing programs or scripts in response to signals received from computing devices. As one example, the computer server 318 may execute one or more web applications. The web application may be implemented as one or more scripts or programs written in any programming language, such as Java™, C, C#®, or C++, and/or any scripting language, such as Perl, Python, or TCL, as well as combinations of any programming/scripting languages. The computer server(s) 318 may also include database servers, including without limitation those commercially available from Oracle®, Microsoft®, Sybase®, IBM® and the like, which can process requests from database clients running on a computing device.

In addition to running applications, the computer servers 318 can communicate with devices outside of the local data center network by a communication system 320. The communication system 320 may include one or more firewall (virtual private network) VPN devices, fiber optic to Ethernet converters, Ethernet switches, ISM band (900 Mhz) Ethernet radios, licensed (450 Mhz) Ethernet radios, microwave (12-18 Mhz) radios, cellular LTE modems, satellite (C-band, Ku-band, L-band) modems, cable broadband/DSL modems, including equipment specific antennas, noise filters, and lightning protection. For example, typical cellular LTE modems with VPN capabilities provided by Cradlepoint of Boise, Id. are suitable for this application.

In one embodiment, the communication system 320 can be communicatively coupled with a communication network, such as the Internet or any other one or more wired or wireless, local or wide area networks. The communication network can include a local area communication capability and a wide area communication capability. For example, the communication network can include a Bluetooth® wireless system, an 802.11x (e.g., 802.11G/802.11N/802.11AC, or the like, wireless system), a CAN bus, an Ethernet network connecting systems the servers 318, or other types of communication networks that may function with or be associated with the modification system of the present invention. Further, the communication network can also include wide area communication capabilities, including one or more of, but not limited to, a cellular communication capability, satellite telephone communication capability, a wireless wide area network communication capability, or other types of communication capabilities that allow elements of the data center 172 to communicate with the communication system 320.

Figure 31:
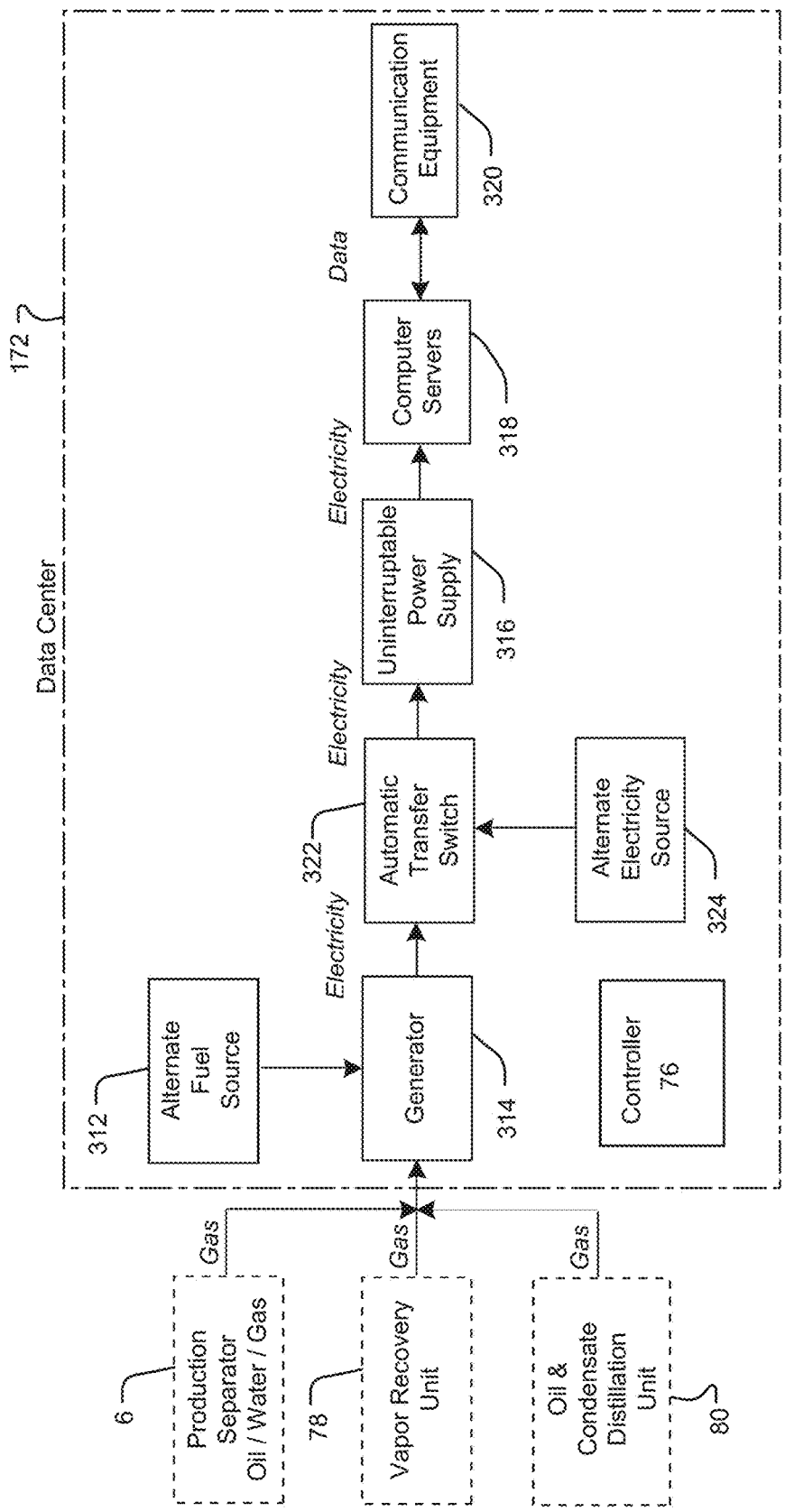
FIG. 31 illustrates another embodiment of a data center configured to receive power from the oil and condensate processing system or an alternative hydrocarbon fuel source, and or an alternative electrical power source.

FIG. 31 illustrates an embodiment in which the data center 172 may receive electrical power from an additional, or alternative, electrical power source 324 when natural gas or an alternate hydrocarbon fuel source is not available to power the generator 314. The alternative electrical power source 324 may be from any source, such as one or more of a local utility power grid, wind turbines, solar panels, a fuel cell, a battery, and the like.

An automatic transfer switch 322 provides the capability to automatically switch from electricity from the generator 314 to an alternate electrical source 324. This is beneficial when the generator 314 does not have an available hydrocarbon fuel gas or is shut down for maintenance purposes. Automatic Transfer switches provided by Generac of Waukeshaw, Wis. are suitable for this application.

The data center 31 may also include a controller 76. The controller may optionally controller the automatic transfer switch 322. In this manner, the controller 76 is operable to switch the data center 172 from electricity provided by an alternate electricity source 324 to electricity provided by the generator 314. Additionally, as described in conjunction with FIG. 30, the controller 76 can also determine one or more sources of gas 6, 76, 80 are used to fuel the generator 314. In one embodiment, the controller 76 can monitor electricity consumption by the data center 172 and determine which source of electricity (the generator 314 or the alternate electricity source 324) is most economical. For example, in one embodiment, the controller is configured to monitor power consumption of the data center 172. The controller can then determine the cost of the power consumed by the data center. The cost may be determined based on the value of gas from sources 6, 78, 80 needed to run the generator or the cost of electricity from one of the alternate electricity sources 324. Continuing this example, the controller 76 can then determine which source of power for the data center 172 to use. In one embodiment, the controller 76 may select the source of power based on cost. Additionally, or alternative, other factors may be considered by the controller, such as availability of the power source, whether the source of power would otherwise be wasted (such as by venting natural gas that cannot otherwise be stored), and other factors.

Figure 32:
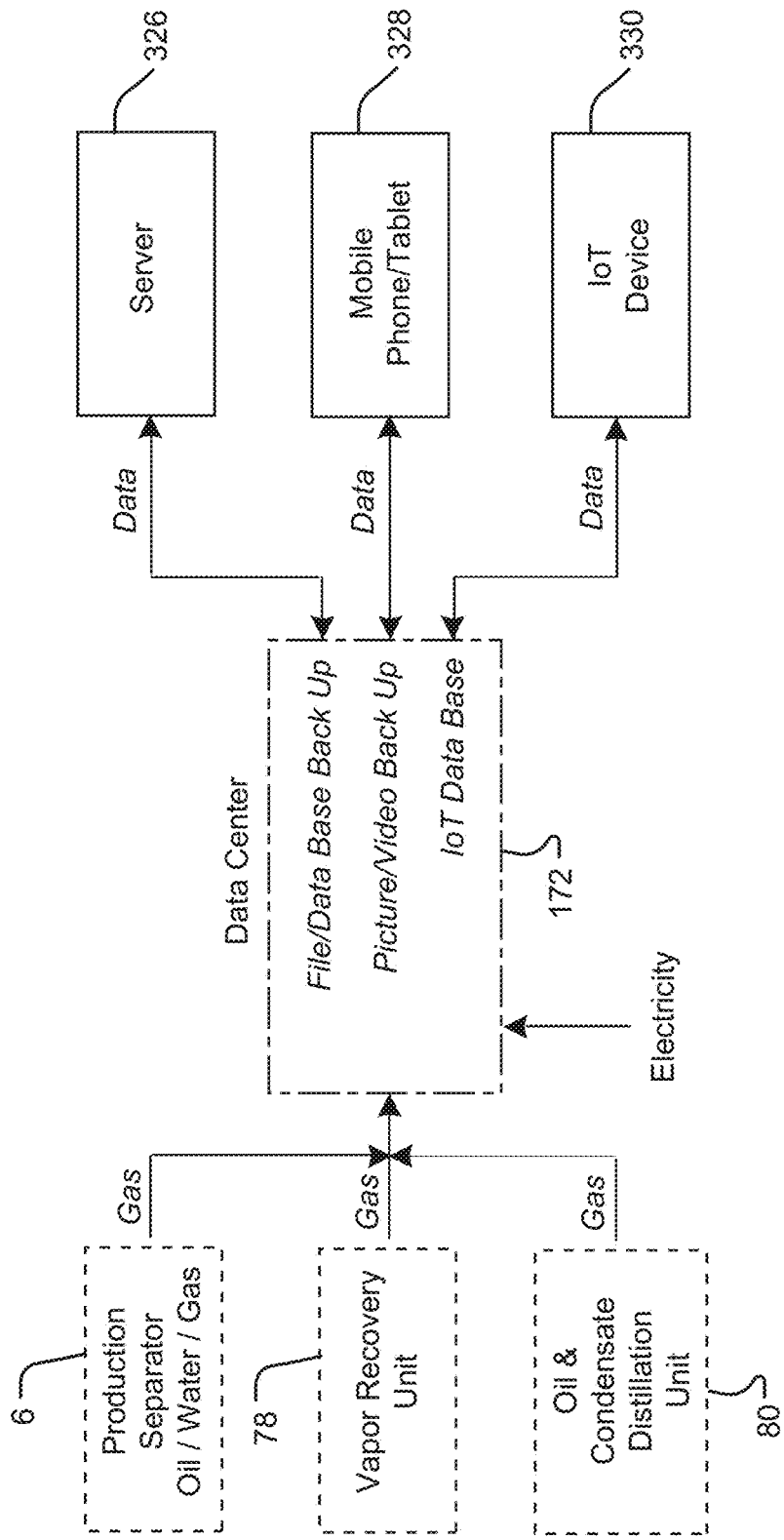
FIG. 32 illustrates an embodiment of a data center configured to transmit and receive data from three separate sources, such as, but not limited to, servers, mobile phones/tablets, Internet of Things (IoT) Devices.

FIG. 32 shows an embodiment where various sources of fuel gas are configured to provide natural gas fuel to power a data center 172. The data center 172 provides a service such as file/database back up for a remote data sources. The remote data sources may be one or more of a remote server 326 which not at the same geographical location as the data center 172. In one embodiment, the data center 172 may be used as a cloud storage location. Optionally, the remote data source is one or more of a mobile phone/tablet 328 and an IoT device 330. For example, the data center 172 may receive data from a remote server 326 by a network connection to communication equipment 320. In another embodiment, the data center 172 may receive and store picture, video, electronic files, database records, or other data from devices 328 such as mobile phones, personal computer, tablets and the like. In still another embodiment, the data center 172 can receive data from smart devices known as IoT devices. The data center may create an IoT database for IoT devices 330 such as household appliances, industrial or environmental process monitoring instruments, and or video surveillance cameras. The data center 172 can provide a vast array of services including but not limited to website hosting, virtual personal computer hosting, enterprise resource planning software hosting, crypto currency mining, machine learning, and artificial intelligence software.

Figure 33:
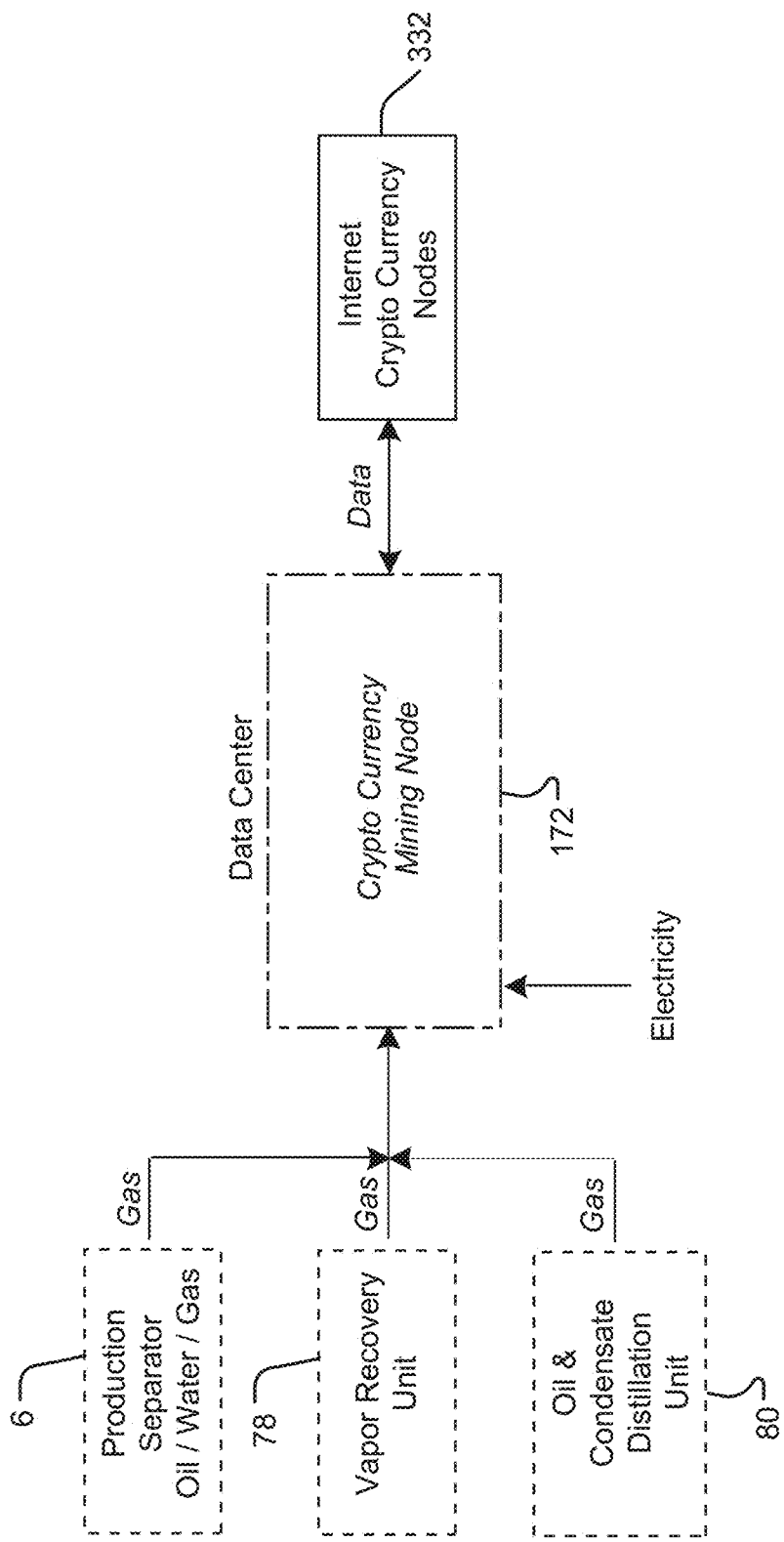
FIG. 33 illustrates an embodiment of a data center configured to perform crypto currency mining algorithms and transmit and receive data from the Internet wide crypto currency nodes.

FIG. 33 illustrates an embodiment where various sources of fuel gas are configured to provide natural gas fuel to power a data center 172. Alternatively, the data center may receive electricity from an alternative electricity source 324. The data center 172 is configured to solve mathematical calculations for a crypto currency mining software such as Bit Coin. Crypto currency mining algorithms use a low amount of bandwidth which minimizes the data load on the communication equipment 320 and in turn minimizes the overall cellular or satellite communication costs. This is a benefit at remote oil and gas well sites because the communications bandwidth may come in the form of cellular or satellite data plans with high data plan costs compared to fiber optic lines. A crypto currency is mined by solving complex algorithms then transmitting and receiving a small amounts of information to the broader network to determine if the mathematical problems have been solved correctly. Crypto currency mining requires large computational processing power but low communications band width. The availability of inexpensive hydrocarbon fuel source such as flash gas from oil storage tanks in turn provides inexpensive electricity production using electric generators. Typically, the flash gas is burned without generating revenue, however, using the flash gas to generate electricity and mine crypto currency provides revenue gain to the oil and gas producer as opposed to just burning the flash gas at a revenue loss.

Figure 34:
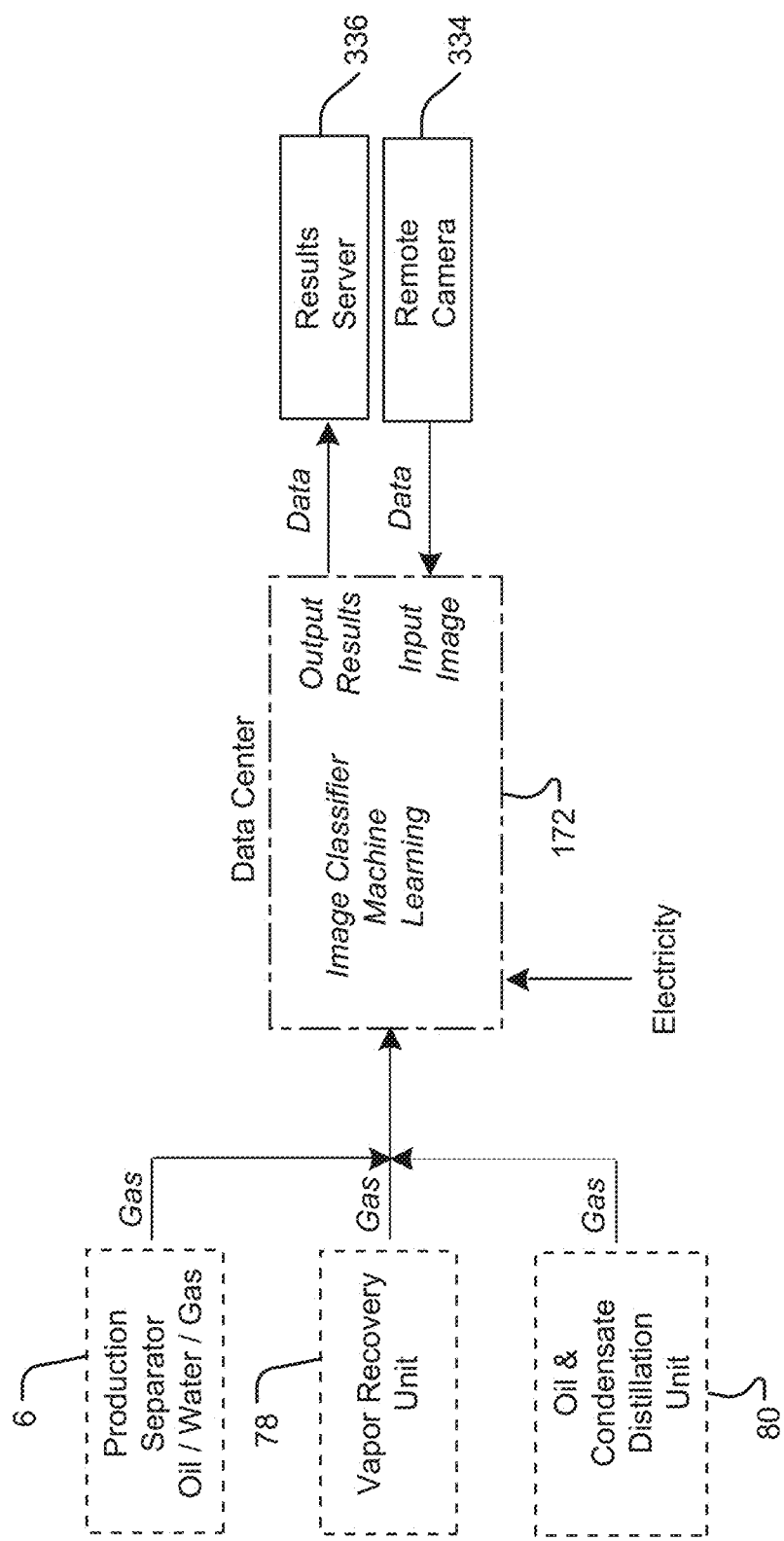
FIG. 34 illustrates an embodiment of a data center configured to perform machine learning such as classifying images from remote cameras and transmitting the results to a remote server.

FIG. 34 illustrates another embodiment where various sources of fuel gas are configured to provide natural gas fuel to power a data center 172. The data center 172 is configured to classify images from remote cameras using machine learning software. This is an advantage at a remote oil and gas well site because the classification of images by machine learning software requires a large amount of computational processing power (meaning machine learning requires a lot of electricity because of the required graphic processor units GPUs used to do the calculations) per image relative to the power required to receive images at the data center 172. It's important to note that the data center only needs to receive images not transmit them. The transmitted results use minimal bandwidth compared to receiving images, therefore the bandwidth of cellular devices are generally acceptable for remote applications. For example, a remote camera 334 transmits an image to the data center 172 and the image is classified for objects, features, text, colors, etc. which are the results of the image classification. The output results are logged locally on the data server 172 and or transmitted to a remote user's server 336.

The term "communication system" or "communication network" and variations thereof, as used herein, can refer to a collection of communication components capable of one or more of transmission, relay, interconnect, control, or otherwise manipulate information or data from at least one transmitter to at least one receiver. As such, the communication may include a range of systems supporting point-to-point or broadcasting of the information or data. A communication system may refer to the collection individual communication hardware as well as the interconnects associated with and connecting the individual communication hardware. Communication hardware may refer to dedicated communication hardware or may refer a processor coupled with a communication means (i.e., an antenna) and running software capable of using the communication means to send and/or receive a signal within the communication system. Interconnect refers some type of wired or wireless communication link that connects various components, such as communication hardware, within a communication system. A communication network may refer to a specific setup of a communication system with the collection of individual communication hardware and interconnects having some definable network topography. A communication network may include wired and/or wireless network having a pre-set to an ad hoc network structure.

What is claimed is:

1. A system for processing a produced fluid from a wellbore at an on-site production facility, the produced fluid including oil, natural gas and water, comprising:
   a separator to separate the oil, natural gas and water at a first pressure;
   a distillation unit configured to receive the oil downstream from the separator and reduce the pressure, the distillation unit configured to separate natural gas from the oil, wherein the distillation unit operates in a vacuum at between approximately 0 psig and 14 psig, and wherein the pressure in the distillation unit is controlled by a valve positioned downstream from the distillation unit;
   a first conduit to transfer oil from the distillation unit;
   a lease automatic custody transfer (LACT) unit interconnected to the first conduit to measure a volume of oil transferred through the first conduit and transfer title of the oil from a first entity to a second entity; and
   further comprising a reflux drum to receive vapor from the distillation unit, wherein liquid that condenses in the reflux drum flows through a second conduit to the distillation unit.

2. The system of claim 1, wherein the first pressure in the separator is controlled by a valve positioned between the separator and the distillation unit.

3. The system of claim 1, further comprising a third conduit to transfer natural gas separated from the oil from the distillation unit to a generator which converts the natural gas into electricity.

4. The system of claim 1, wherein the LACT unit includes a pump and a flow meter.

5. The system of claim 1, further comprising a vapor recovery unit positioned downstream from the distillation unit to receive natural gas separated from the oil.

6. The system of claim 5, further comprising a third conduit to transfer the separated natural gas from the distillation unit to the vapor recovery unit.

7. The system of claim 1, wherein the oil is transferred downstream from the LACT unit to a mobile tank.

8. The system of claim 1, wherein the oil is transferred downstream from the LACT unit to an oil pipeline.

9. The system of claim 1, wherein the oil is routed, downstream of the LACT unit, from the first conduit to an oil storage tank.

10. The system of claim 1, further comprising a heat exchanger to provide heat energy to the oil upstream from the distillation unit, wherein the heat exchanger recovers waste heat from sources at the on-site production facility.

11. The system of claim 1, further comprising a third conduit to inject one or more of natural gas, fuel gas, and compressed vapor into the distillation unit.

12. A system for processing a produced fluid from a wellbore at an on-site production facility, the produced fluid including oil, natural gas and water, comprising:
    a separator to separate the oil, natural gas and water at a first pressure;
    a distillation unit configured to receive the oil downstream from the separator and reduce the pressure, the distillation unit configured to separate natural gas from the oil, wherein the distillation unit operates in a vacuum at between approximately 0 psig and −14 psig, and wherein the pressure in the distillation unit is controlled by a valve positioned downstream from the distillation unit;
    a first conduit to transfer oil from the distillation unit;
    a lease automatic custody transfer (LACT) unit interconnected to the first conduit to measure a volume of oil transferred through the first conduit and transfer title of the oil from a first entity to a second entity; and
    a second conduit to inject one or more of natural gas, fuel gas, and compressed vapor into the distillation unit.

13. The system of claim 12, wherein the first pressure in the separator is controlled by a valve positioned between the separator and the distillation unit.

14. The system of claim 12, wherein the LACT unit includes a pump and a flow meter.

15. The system of claim 12, wherein the oil is transferred downstream from the LACT unit by the first conduit to one or more of a mobile tank, an oil storage tank, and an oil pipeline.

16. The system of claim 12, further comprising a reflux drum to receive vapor from the distillation unit, wherein liquid that condenses in the reflux drum flows through a third conduit to the distillation unit.

17. The system of claim 12, further comprising a heat exchanger to provide heat energy to the oil upstream from the distillation unit.

18. A system for processing a produced fluid from a wellbore at an on-site production facility, the produced fluid including oil, natural gas and water, comprising:
    a separator to separate the oil, natural gas and water at a first pressure;
    a heat exchanger to heat the oil from the separator, wherein the heat exchanger recovers waste heat from sources at the on-site production system;
    a distillation unit configured to receive the oil downstream from the separator and the heat exchanger and reduce the pressure, the distillation unit configured to separate natural gas from the oil, wherein the distillation unit operates in a vacuum at between approximately 0 psig and −14 psig, and wherein the pressure in the distillation unit is controlled by a valve positioned downstream from the distillation unit;
    a first conduit to transfer oil from the distillation unit; and
    a lease automatic custody transfer (LACT) unit interconnected to the first conduit to measure a volume of oil transferred through the first conduit and transfer title of the oil from a first entity to a second entity.

19. The system of claim 18, further comprising a reflux drum to receive vapor from the distillation unit, wherein liquid that condenses in the reflux drum flows through a second conduit to the distillation unit.

20. The system of claim 18, further comprising a second conduit to inject one or more of natural gas, fuel gas, and compressed vapor into the distillation unit.

* * * * *